United States Patent
Lundberg et al.

(10) Patent No.: US 9,651,782 B2
(45) Date of Patent: May 16, 2017

(54) WEARABLE TRACKING DEVICE

(71) Applicant: BRILLIANTSERVICE CO., LTD, Kita-ku, Osaka-shi, Osaka (JP)

(72) Inventors: Johannes Lundberg, Tokyo (JP); Yusuke Kajii, Tokyo (JP)

(73) Assignee: MIRAMA SERVICE INC., New Castle (DE)

( * ) Notice: Subject to any disclaimer, the term of this patent is extended or adjusted under 35 U.S.C. 154(b) by 0 days.

(21) Appl. No.: 14/768,482

(22) PCT Filed: Jun. 24, 2013

(86) PCT No.: PCT/JP2013/003946
§ 371 (c)(1),
(2) Date: Aug. 18, 2015

(87) PCT Pub. No.: WO2014/128787
PCT Pub. Date: Aug. 28, 2014

(65) Prior Publication Data
US 2016/0004320 A1     Jan. 7, 2016

(30) Foreign Application Priority Data

Feb. 19, 2013  (WO) .................. PCT/JP2013/000909
Apr. 12, 2013  (WO) .................. PCT/JP2013/002524

(51) Int. Cl.
*G06F 3/01* (2006.01)
*G02B 27/01* (2006.01)
(Continued)

(52) U.S. Cl.
CPC ............ *G02B 27/017* (2013.01); *G06F 3/011* (2013.01); *G06F 3/017* (2013.01); *G06F 3/03* (2013.01);
(Continued)

(58) Field of Classification Search
None
See application file for complete search history.

(56) References Cited

U.S. PATENT DOCUMENTS

| 2011/0012830 | A1 | 1/2011 | Yeh |
| 2011/0083106 | A1 | 4/2011 | Hamagishi |
| 2013/0328925 | A1* | 12/2013 | Latta ..................... G09G 3/003 345/633 |

FOREIGN PATENT DOCUMENTS

| JP | 10-207681 | 8/1998 |
| JP | 10-333817 | 12/1998 |

(Continued)

OTHER PUBLICATIONS

International Search Report for International Patent Application No. PCT/JP2013/003946 dated Aug. 20, 2013, 4 pages.
(Continued)

*Primary Examiner* — Edward Martello
(74) *Attorney, Agent, or Firm* — Amin, Turocy & Watson LLP

(57) ABSTRACT

Provided are a tracking display system, a tracking display program, a tracking display method, a wearable device using these, a tracking display program for the wearable device, and a manipulation method for the wearable device that enhance the manipulability of a program in a stereoscopic space. The tracking display system of the present invention includes: a display unit that displays a view object in a virtual space; a detection unit that detects an image of a target in a real space, the target being for selecting the view object; and a control unit that controls at least a position of the view object. Further, the control unit displays the view object such that the view object tracks a motion of the target, in a case where the control unit determines that the view object and the image of the target overlap with each other in the display unit.

12 Claims, 48 Drawing Sheets

(51) Int. Cl.
  *G06K 9/00* (2006.01)
  *G06K 9/48* (2006.01)
  *G06F 3/03* (2006.01)
  *G06F 3/048* (2013.01)
  *G06K 9/46* (2006.01)
  *G06F 3/0484* (2013.01)
  *G06T 19/00* (2011.01)
  *G06T 7/20* (2017.01)
  *G06F 3/0482* (2013.01)
  *H04N 13/04* (2006.01)

(52) U.S. Cl.
  CPC ............ *G06F 3/0304* (2013.01); *G06F 3/048* (2013.01); *G06F 3/0482* (2013.01); *G06F 3/04842* (2013.01); *G06F 3/04845* (2013.01); *G06K 9/00355* (2013.01); *G06K 9/00375* (2013.01); *G06K 9/00382* (2013.01); *G06K 9/00389* (2013.01); *G06K 9/4609* (2013.01); *G06K 9/48* (2013.01); *G06T 7/20* (2013.01); *G06T 19/006* (2013.01); *H04N 13/0495* (2013.01); *G02B 2027/0178* (2013.01); *G06T 2200/04* (2013.01); *G06T 2207/10004* (2013.01); *G06T 2207/20228* (2013.01); *G06T 2207/30196* (2013.01); *G06T 2210/56* (2013.01); *H04N 13/0429* (2013.01)

(56) References Cited

FOREIGN PATENT DOCUMENTS

| | | |
|---|---|---|
| JP | 2002-290529 | 10/2002 |
| JP | 2008-181541 | 8/2008 |
| JP | 2008-546101 | 12/2008 |
| JP | 2011-022984 | 2/2011 |
| JP | 2011-081480 | 4/2011 |
| JP | 2012-048659 | 3/2012 |
| JP | 2012-069148 | 4/2012 |
| JP | 2012-208705 | 10/2012 |
| WO | 9415286 | 7/1994 |
| WO | 2006-080858 | 8/2006 |
| WO | 2006-130750 | 12/2006 |
| WO | 2010-073928 | 7/2010 |

OTHER PUBLICATIONS

International Preliminary Report on Patentability for International Patent Application No. PCT/JP2013/003946 dated Aug. 25, 2015, 6 pages.
Irie, Hidetsugu, "AirTarget: A Highly-portable Real-world-oriented Interface Using Optical See-through HMD and Markerless Image Recognition," Multimedia, Distributed, Cooperative, and Mobile (DICOMO 2012) Symposium Proceedings, IPSJ Symposium Series, Jul. 2012, vol. 2012, No. 1 [CD-ROM], pp. 1297-1299.
Japanese Office Action for Japanese Patent Application No. 2015-501081 mailed on Oct. 4, 2016.

\* cited by examiner

WEARABLE TRACKING DEVICE

TECHNICAL FIELD

The present invention relates to a tracking display system, a tracking display program, a tracking display method, a wearable device using these, a tracking display program for the wearable device, and a manipulation method for the wearable device.

BACKGROUND ART

In general, a manipulation technique using a mouse is known as a method for an input manipulation on a PC and the like. For example, Patent Literature 1 (Japanese Patent Laid-Open No. 2012-69148) discloses an easy-to-use computer mouse peripheral device.

The computer mouse peripheral device according to Patent Literature 1 (Japanese Patent Laid-Open No. 2012-69148) includes: a base part having a lower surface that is suitable for sliding on a working surface; a ridge-like part that protrudes substantially upward from the base part; a thumb engagement surface formed on a first side surface of the ridge-like part; and at least one of at least one index finger tip engagement surface and at least one middle finger tip engagement surface formed on a second side surface opposed to the first side surface of the ridge-like part.

Moreover, Patent Literature 2 (Japanese Patent Laid-Open No. 2012-48659) discloses: a display device to be attached to an observer who observes a composite real space; and an image processing device and an image processing method that provide a technique for switching images to be provided to a separate display device as appropriate without a manipulation by the observer.

The image processing device and the image processing method according to Patent Literature 2 (Japanese Patent Laid-Open No. 2012-48659) include: generation means for generating a virtual space image and outputting the image to a display device attached to an observer who observes the image; determination means for determining whether or not the display device is in use; and control means for operating the generation means, in the case where the determination means determines that the display device is in use.

Patent Literature 3 (Japanese Patent Laid-Open No. 2011-22984) discloses a stereoscopic picture interactive system.

The stereoscopic picture interactive system according to Patent Literature 3 (Japanese Patent Laid-Open No. 2011-22984) is capable of displaying a stereoscopic picture and controlling the stereoscopic picture by means of a manipulator, and includes: a stereoscopic picture capture module including one or more stereoscopic picture capture units that are used to acquire a plurality of article pictures of one article and are used to acquire a motion picture of the manipulator; a stereoscopic picture processing unit that is electrically connected to the stereoscopic picture capture units, adjusts the article pictures to generate a first stereoscopic picture, and acquires a motion feature from the motion picture; a host machine including a central processing unit electrically connected to the stereoscopic picture processing unit and a storage unit electrically connected to the central processing unit, the storage unit being used to store the first stereoscopic picture, the central processing unit being electrically connected to the stereoscopic picture processing unit and calculating a real-time motion of the stereoscopic picture for the motion feature; and a stereoscopic picture display module that is electrically connected to the central processing unit and displays the real-time motion of the stereoscopic picture.

Patent Literature 4 (Japanese Patent Laid-Open No. 2008-181541) discloses a latest object-oriented operating system using innovative framework architecture.

With regard to the latest object-oriented operating system according to Patent Literature 4 (Japanese Patent Laid-Open No. 2008-181541), disclosed is an apparatus that provides an object-oriented application interface between: a cursor position determination device including a user manipulable button for controlling a pointer image; and an object-oriented application program including a plurality of objects each including logic and data for executing a particular function, in a computer system including a processor and a display device. The apparatus includes: (a) an interactive object that is one of the plurality of objects each including logic and data in the object-oriented application program, the interactive object including logic for displaying both an icon and a thumbnail on the display device and logic for manipulating the icon on the display device; (b) means for generating a device event signal in response to a press of the user manipulable button of the cursor position determination device; (c) means for generating a device position signal in response to a physical position of the pointer image on the display device; and (d) an interaction object including: timing means for detecting timing at which the user manipulable button is pressed at a predetermined time interval, in response to the device event signal; storage means for storing a peak threshold; means for generating a peak message when the user manipulable button is pressed for a period of time longer than the peak threshold, in response to the predetermined time interval and the peak threshold; and means for changing the display device from an icon view to a thumbnail view using the logic of the interaction object, in response to the peak message.

Patent Literature 5 (Japanese Patent Laid-Open No. 10-333817) discloses a computer system using an electronic pen. Up to now, whether or not to move a pointer is determined on the basis of the height of an electronic pen from a position detection device, but the height for such determination tends to become larger, so that the electronic pen needs to be raised higher. Under the circumstance, the disclosed computer system prevents such a trouble in use.

The computer system using the electronic pen according to Patent Literature 5 (Japanese Patent Laid-Open No. 10-333817) includes: a position detection device including: the electronic pen that has a writing-material shape and is a position indicator for inputting manipulation information into a computer by a manipulator; and a tablet surface corresponding to an indicatable range using the electronic pen, the position detection device being capable of detecting position information of the electronic pen on the tablet surface and pen pressure information that is a pressing force between the tablet surface and the electronic pen; a computer including a manipulation control unit that acquires the position information and the pen pressure information of the electronic pen detected by the position detection device, as manipulation information for computer control; and a display device including a display screen showing information based on a processing content of the computer, the display device displaying a pointer on the display screen. The manipulation control unit associates a display position of the pointer displayed on the display device with the information from the position detection device, whereby an interactive exchange between the manipulator and the computer is achieved. The manipulation control unit reflects a movement direction and a movement amount of the electronic pen when a slight pen pressure is applied to a tip of the electronic pen, in a movement of the pointer, and starts a process concerning a position indicated by the pointer when a further pen pressure is applied thereto.

Patent Literature 6 (Japanese Patent Laid-Open No. 10-207681) discloses a cursor display device that indicates a spatial target on a screen.

The cursor display device according to Patent Literature 6 (Japanese Patent Laid-Open No. 10-207681) enlarges or reduces a region indicated by a cursor through a manipulation on a dial provided to a pointing device.

Patent Literature 7 (National Publication of International Patent Application No. 2008-546101) discloses a virtual flip chart method and apparatus.

With regard to the virtual flip chart method and apparatus according to Patent Literature 7 (National Publication of International Patent Application No. 2008-546101), disclosed is a presentation system that presents a set of session images, the presentation system including: a control interface; a master presentation unit including a master space; a slave presentation unit including a slave presentation space; a processor; and a network that connects the processor, the interface, the master unit, and the slave unit to one another. The processor is programmed to: simultaneously present session image representations for a plurality of session images in the master space; present at least one session image via the slave presentation unit; and visually distinguish the session image representation associated with the image presented via the slave presentation unit from the other session image representations in the master space.

CITATION LIST

Patent Literature

Patent Literature 1: Japanese Patent Laid-Open No. 2012-69148
Patent Literature 2: Japanese Patent Laid-Open No. 2012-48659
Patent Literature 3: Japanese Patent Laid-Open No. 2011-22984
Patent Literature 4: Japanese Patent Laid-Open No. 2008-181541
Patent Literature 5: Japanese Patent Laid-Open No. 10-333817
Patent Literature 6: Japanese Patent Laid-Open No. 10-207681
Patent Literature 7: National Publication of International Patent Application No. 2008-546101

SUMMARY OF INVENTION

Technical Problem

Under the circumstances, the inventors found out the following problem. That is, although the inventions according to Patent Literature 1 to Patent Literature 7 disclose that a manipulation is performed using a pointer or the like, location awareness becomes difficult in three dimensions including a virtual space at the time of manipulating a two-dimensional mouse, pointer, or the like, and hence various manipulabilities decrease.

In view of the above, the present invention has an object to provide a tracking display system, a tracking display program, a tracking display method, a wearable device using these, a tracking display program for the wearable device, and a manipulation method for the wearable device that enhance the manipulability of a program in a stereoscopic space.

Solution to Problem (1)
A tracking display system according to one aspect includes: a display unit that displays a view object in a virtual space; a detection unit that detects an image of a target in a real space, the target being for selecting the view object; and a control unit that controls at least a position of the view object. Further, the control unit displays the view object such that the view object tracks a motion of the target, in a case where the control unit determines that the view object and the image of the target overlap with each other in the display unit.

Because the virtual space is superimposed in the real space, the view object displayed in the virtual space can be manipulated using the target existing in the real space. Note that the image of the target may be actually displayed in the display unit so as to be visually recognizable by the manipulator, and may not be displayed therein so as not to be visually recognized by the manipulator.

In the case where the target is visually recognized to overlap with the view object from the line of sight of the manipulator, even if the visual recognition position of the target changes thereafter, the view object can be displayed so as to track movement of the target as if the target captured the view object in the air. Accordingly, the manipulator can easily manipulate the view object.

(2)
The target may be at least any of fingers, palms, hands, and arms of a human body of a manipulator, and the detection unit may be at least any of a depth level sensor and an image sensor.

In this case, at least any of the fingers, the palms, the hands, and the arms of the human body of the manipulator can be accurately detected by the detection unit that is at least any of the depth level sensor and the image sensor. Moreover, even in the case where any of the fingers, the palms, the hands, and the arms of the human body of the manipulator is displaced during a manipulation, the view object tracks movement of the displacement, and hence the manipulator can easily and accurately manipulate the view object.

(3)
The control unit may determine whether or not the target overlaps with the view object continuously for a predetermined time.

In this case, the target can select the view object under the condition that the target overlaps with the view object continuously for the predetermined time, and hence an erroneous manipulation on the view object due to an inadvertent motion of the target can be prevented.

(4)
The control unit may display passage of the predetermined time with respect to the view object.

In this case, the control unit displays a timer view with respect to the view object, and hence the manipulator can easily recognize whether or not the view object is selected. The timer view may be represented in the vicinity of the view object, for example, around the view object, and may be represented by changing the color and/or the shape itself of the view object.

(5)
In a case where the target moves beyond a predetermined distance from a tracking start position of the view object, the control unit may end the tracking display, and may display the view object such that the view object returns to the tracking start position.

In this case, the view object returns to its original position, that is, the tracking start position under the condition that the target moves beyond the predetermined distance from the tracking start position. As a result, up to the predetermined distance from the tracking start position, the view object moves so as to track the target. Once the target moves beyond the predetermined distance, the view object is separated from the target to be pulled back to the tracking start position. Accordingly, the view object behaves as if the view object were fixed at the tracking start position by an elastic member (such as a spring) having maximum deflection that is a length corresponding to the predetermined distance. As a result, the manipulator can easily recognize that the view object is selected.

(6)

The view object may be at least any of an icon, a menu item, a text link, and a determination button.

In this case, the manipulator can easily perform manipulations such as application activation, menu selection, access to a link destination, and determination using a button.

(7)

A tracking display system according to another aspect includes: a view object displayed in a virtual space; a target in a real space, for selecting the view object by a manipulator; a detection unit that detects a position of the target in the real space; and a control unit that controls at least a position of the view object in the virtual space. Further, the control unit displays the view object such that the view object tracks a motion of the target, in a case where the control unit determines that the target exists in a predetermined space defined by central projection from a point of view of the manipulator to the view object.

In this case, even in the case where the target is not in contact with the view object in the virtual space, in the case where the target and the view object are visually recognized to overlap with each other from the point of view of the manipulator, the manipulator can manipulate the view object. Even in the case where the position of the target in the real space changes during a manipulation on the target object, the view object tracks the displacement of the target, and hence the manipulator can easily manipulate the view object.

(8)

A wearable device according to another aspect may include the tracking display system according to any of (1) to (7).

In the case of a head-mounted display device that is a representative example of the wearable device, even if a relative positional relation between the view object and the target varies during a manipulation due to movement of the head of the manipulator to whom the head-mounted display is attached, the view object tracks the target. Hence, a decrease in manipulability due to the movement of the head can be prevented.

(9)

A tracking display program according to another aspect includes: a display process of displaying a view object in a virtual space; a detection process of detecting an image of a target in a real space, the target being for selecting the view object; and a control process of controlling at least a position of the view object. Further, the control process includes displaying the view object such that the view object tracks a motion of the target, in a case where it is determined that the view object and the image of the target overlap with each other.

Because the virtual space is superimposed in the real space, the view object displayed in the virtual space can be manipulated using the target existing in the real space. Note that the image of the target may be actually displayed in the display unit so as to be visually recognizable by the manipulator, and may not be displayed therein so as not to be visually recognized by the manipulator.

In the case where the target is visually recognized to overlap with the view object from the line of sight of the manipulator, even if the visual recognition position of the target changes thereafter, the view object can be displayed so as to track movement of the target as if the target captured the view object in the air. Accordingly, the manipulator can easily manipulate the view object.

(10)

A tracking display program according to another aspect includes: a display process of displaying a view object in a virtual space; a selection process of selecting the view object by a manipulator using a target in a real space; a detection process of detecting a position in the real space selected in the selection process; and a control process of controlling at least a position of the view object in the virtual space. Further, the control process includes displaying the view object such that the view object tracks a motion of the target, in a case where it is determined that the target exists in a predetermined space defined by central projection from a point of view of the manipulator to the view object.

In this case, even in the case where the target is not in contact with the view object in the virtual space, in the case where the target and the view object are visually recognized to overlap with each other from the point of view of the manipulator, the manipulator can manipulate the view object. Even in the case where the position of the target in the real space changes during a manipulation on the target object, the view object tracks the displacement of the target, and hence the manipulator can easily manipulate the view object.

(11)

A tracking display program for a wearable device according to another aspect may include the tracking display program according to (9) or (10).

In the case of a head-mounted display device that is a representative example of the wearable device, even if a relative positional relation between the view object and the target varies during a manipulation due to movement of the head of the manipulator to whom the head-mounted display device is attached, the view object tracks the target. Hence, a decrease in manipulability due to the movement of the head can be prevented.

(12)

A tracking display method according to still another aspect includes: a display step of displaying a view object in a virtual space; a detection step of detecting an image of a target in a real space, the target being for selecting the view object; and a control step of controlling at least a position of the view object. Further, the control step includes displaying the view object such that the view object tracks a motion of the target, in a case where it is determined that the view object and the image of the target overlap with each other.

Because the virtual space is superimposed in the real space, the view object displayed in the virtual space can be manipulated using the target existing in the real space. Note that the image of the target may be actually displayed in the display unit so as to be visually recognizable by the manipulator, and may not be displayed therein so as not to be visually recognized by the manipulator.

In the case where the target is visually recognized to overlap with the view object from the line of sight of the manipulator, even if the visual recognition position of the target changes thereafter, the view object can be displayed so as to track movement of the target as if the target captured the view object in the air. Accordingly, the manipulator can easily manipulate the view object.

(13)

A tracking display method according to still another aspect includes: a display step of displaying a view object in a virtual space; a selection step of selecting the view object by a manipulator using a target in a real space; a detection step of detecting a position in the real space selected in the selection step; and a control step of controlling at least a position of the view object in the virtual space. The control step includes displaying the view object such that the view object tracks a motion of the target, in a case where it is determined that the target exists in a predetermined space defined by central projection from a point of view of the manipulator to the view object.

In this case, even in the case where the target is not in contact with the view object in the virtual space, in the case where the target and the view object are visually recognized to overlap with each other from the point of view of the manipulator, the manipulator can manipulate the view object. Even in the case where the position of the target in the real space changes during a manipulation on the target object, the view object tracks the displacement of the target, and hence the manipulator can easily manipulate the view object.

(14)

A manipulation method for a wearable device according to another aspect may include the tracking display method according to (12) or (13).

In the case of a head-mounted display device that is a representative example of the wearable device, even if a relative positional relation between the view object and the target varies during a manipulation due to movement of the head of the manipulator to whom the head-mounted display device is attached, the view object tracks the target. Hence, a decrease in manipulability due to the movement of the head can be prevented.

ADVANTAGEOUS EFFECT OF INVENTION

According to the present invention, it is possible to provide a tracking display system, a tracking display program, a tracking display method, a wearable device using these, a tracking display program for the wearable device, and a manipulation method for the wearable device that enhance the manipulability of a program in a stereoscopic space.

Figure 1:
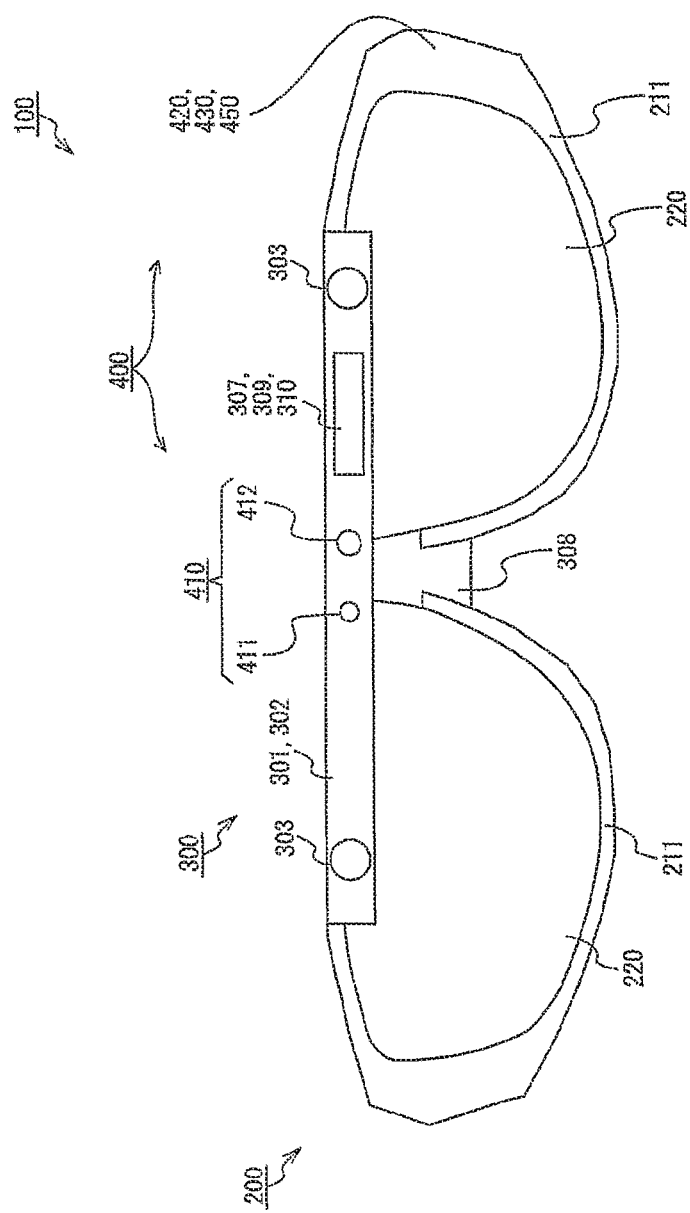
FIG. 1 is a schematic external front view illustrating an example of a basic configuration of a glasses display device 100.

REFERENCE SIGNS LIST 100 glasses display device
220 3D virtual image display region (common region)
300 communication system
410 infrared ray detection unit
410 3D three-dimensional space detection region
450 control unit
456 gesture recognition unit
463 graphics processor unit
464 display processor unit
458 composition processor unit
810 menu
811, 812, 813, 821, 822, 823, 824, 831, 832, 833, 834, 835, 841, 842, 843, 844 selection element
825 storage selection element
826 end selection element
H5 finger
ICHY icon
ICAR icon manipulation region

DESCRIPTION OF EMBODIMENT

Hereinafter, an embodiment of the present invention is described with reference to the drawings. In the following description, the same reference signs are given to the same components. The names and functions thereof are the same. Accordingly, detailed description thereof is not repeated.

Moreover, the present invention is not limitatively applied to the following glasses display device, and can also be applied to other wearable devices, other I/O devices, display devices, televisions, monitors, projectors, and the like.
(Configuration Outline of Glasses Display Device)

Figure 2:
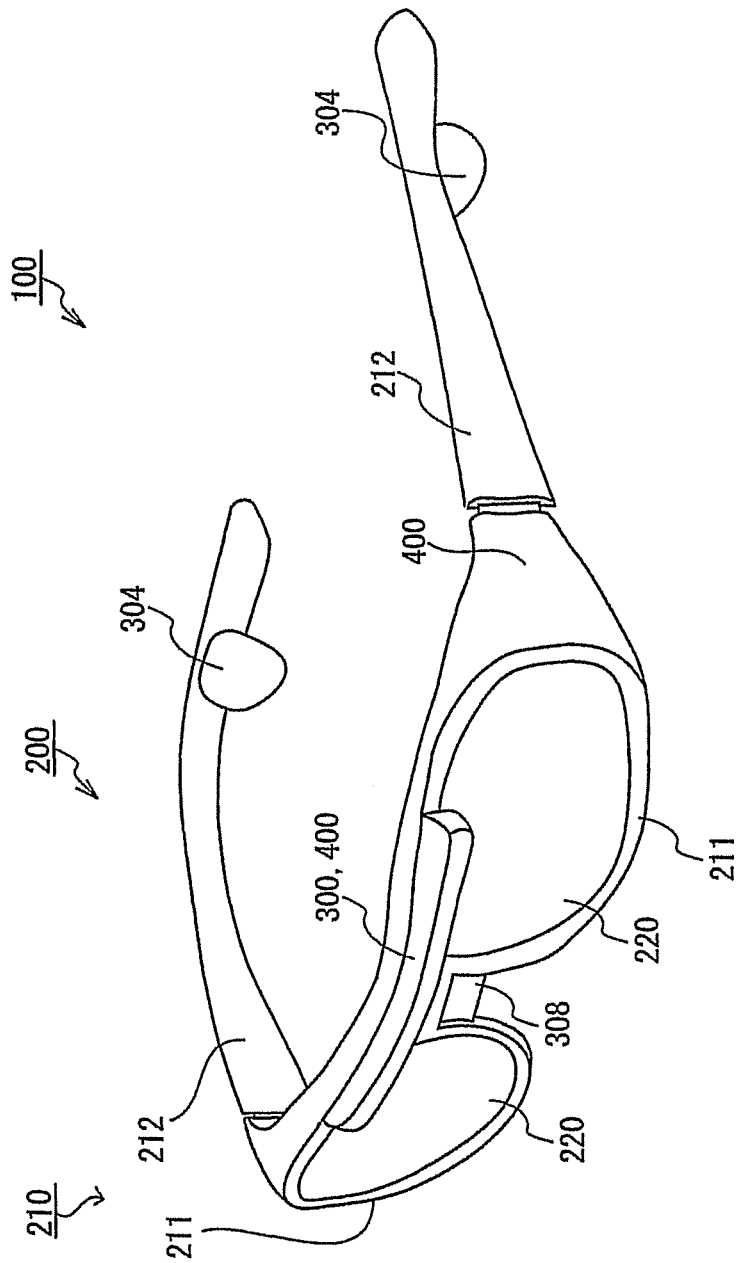
FIG. 2 is a schematic external perspective view illustrating an example of the glasses display device 100.

FIG. 1 is a schematic external front view illustrating an example of a basic configuration of a glasses display device 100 according to an embodiment, and FIG. 2 is a schematic external perspective view illustrating an example of the glasses display device 100.

As illustrated in FIG. 1 or FIG. 2, the glasses display device 100 is a glasses-shaped display device. As described later, the glasses display device 100 is used while being attached to the face of a user.

As illustrated in FIG. 1 and FIG. 2, the glasses display device 100 mainly includes a glasses unit 200, a communication system 300, and an operation system 400.
(Glasses Unit 200)

As illustrated in FIG. 1 and FIG. 2, the glasses unit 200 includes a glasses frame 210 and a pair of semi-transmissive displays 220. The glasses frame 210 mainly includes a rim unit 211 and a temple unit 212.

The pair of semi-transmissive displays 220 is supported by the rim unit 211 of the glasses frame 210.

In the present embodiment, the rim unit 211 of the glasses display device 100 is provided with the pair of semi-transmissive displays 220. Not limited thereto, the rim unit 211 of the glasses display device 100 may be provided with lenses such as normal sunglasses lenses, ultraviolet protection lenses, or glasses lenses, and one semi-transmissive display 220 or the pair of semi-transmissive displays 220 may be separately provided.

Alternatively, the semi-transmissive display(s) 220 may be provided so as to be embedded in part of the lenses.

Further, the present embodiment is not limited to such a glasses type, and can be applied to a hat type and other arbitrary head-mounted display devices as long as the device can be attached to the body of a person and can be arranged within the field of view of the person.
(Communication System 300)

Next, the communication system 300 is described.

The communication system 300 includes a battery unit 301, an antenna module 302, a camera unit 303, a speaker unit 304, a global positioning system (GPS) unit 307, a microphone unit 308, a subscriber identity module card (SIM) unit 309, and a main unit 310.

Note that the camera unit may be provided with a CCD sensor. The speaker unit 304 may be normal earphones, and may be bone-conduction earphones. The SIM unit 309 includes a near field communication (NFC) unit, another contact-type IC card unit, and a contactless IC card unit.

As described above, the communication system 300 according to the present embodiment at least has any of the functions of a mobile phone, a smartphone, and a tablet terminal. Specifically, the communication system 300 has a phone function, an Internet function, a browser function, an e-mail function, an image taking function, and the like.

Accordingly, with the use of the glasses display device 100, the user can use a phone call function similar to that of a mobile phone by means of the communication device, the speaker, and the microphone. Moreover, because the glasses display device 100 is glasses-shaped, the user can make a phone call without using both his/her hands.
(Operation System 400)

Next, the operation system 400 includes an infrared ray detection unit 410, a gyroscope unit 420, an acceleration detection unit 430, and a control unit 450. The infrared ray detection unit 410 mainly includes an infrared ray emission element 411 and an infrared ray detection camera 412.

Figure 3:
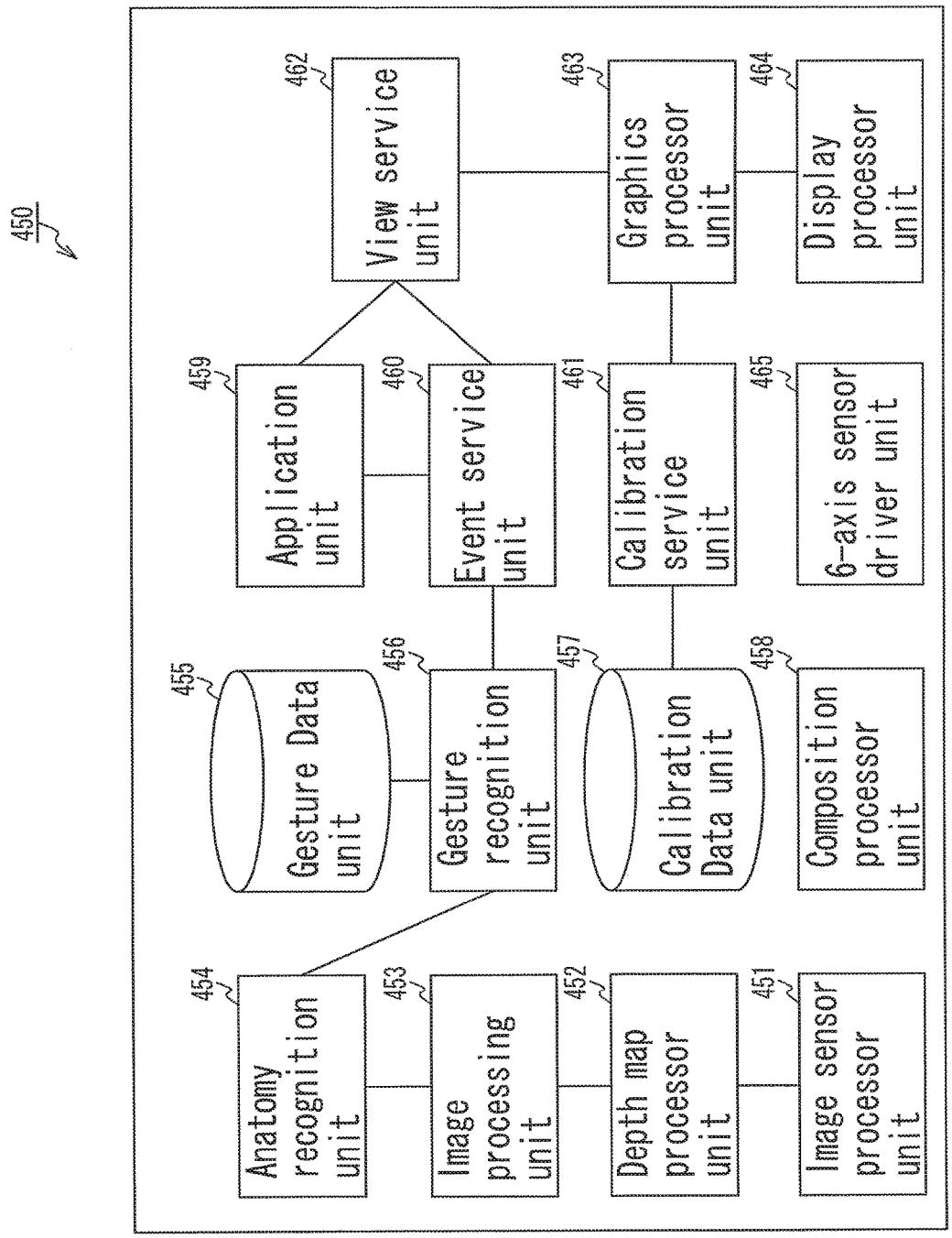
FIG. 3 is a schematic diagram illustrating an example of a configuration of a control unit 450 of an operation system 400.

Next, a configuration, a processing flow, and a concept of the operation system 400 are described. FIG. 3 is a schematic diagram illustrating an example of a configuration of the control unit 450 of the operation system 400.

As illustrated in FIG. 3, the control unit 450 includes an image sensor processor unit 451, a depth map processor unit 452, an image processing unit 453, an anatomy recognition unit 454, a gesture data unit 455, a gesture recognition unit 456, a calibration data unit 457, a composition processor unit 458, an application unit 459, an event service unit 460, a calibration service unit 461, a view service unit 462, a graphics processor unit 463, a display processor unit 464, and a 6-axis sensor driver unit 465.

Note that the control unit 450 does not need to include all the above-mentioned units, and may include one or more necessary units as appropriate. For example, the gesture data unit 455 and the calibration data unit 457 may be arranged on a cloud service, and the composition processor unit 458 may not be particularly provided.

Figure 4:
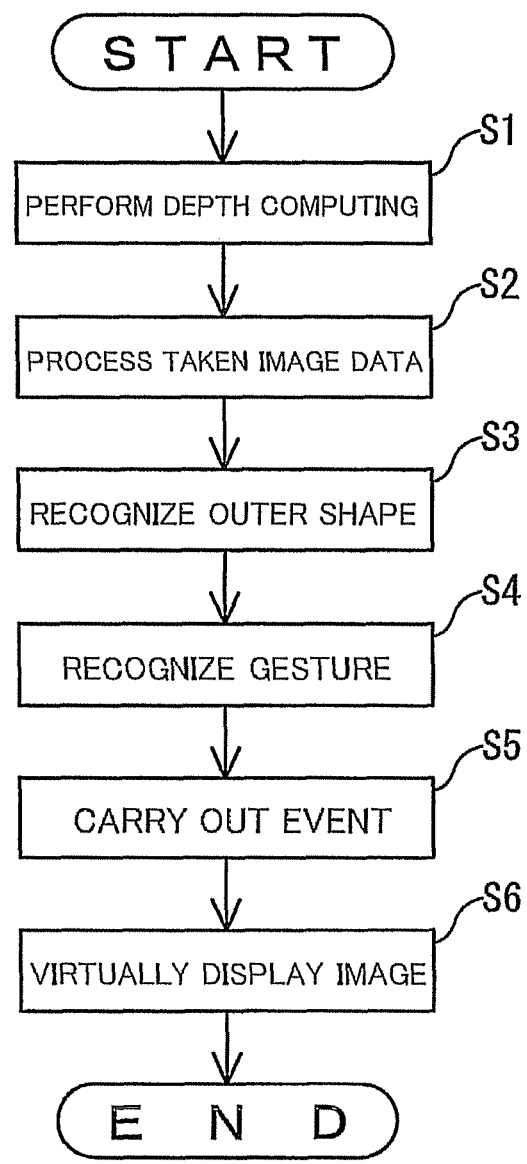
FIG. 4 is a flowchart illustrating a processing flow in the operation system 400.
Figure 5:
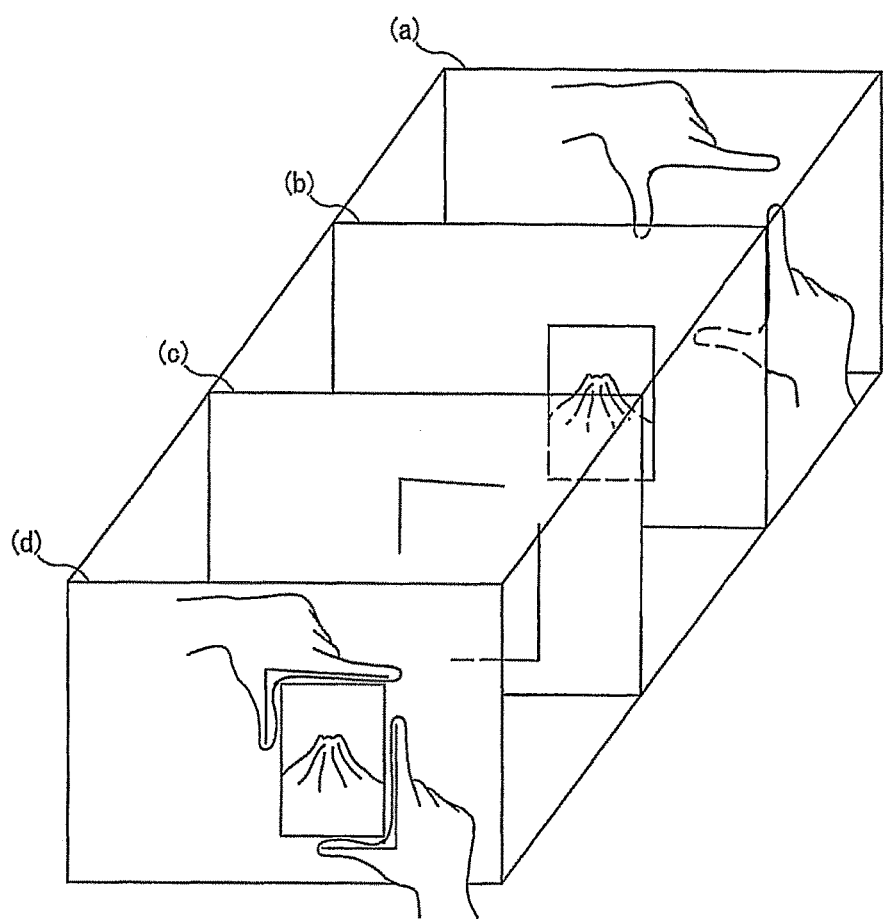
FIG. 5 is a schematic diagram illustrating a concept corresponding to the flowchart of FIG. 4.

Next, FIG. 4 is a flowchart illustrating a processing flow in the operation system 400, and FIG. 5 is a schematic diagram illustrating a concept according to the flowchart of FIG. 4.

First, as illustrated in FIG. 4, target data is acquired from the infrared ray detection unit 410, and depth computing is performed by the depth map processor unit 452 (Step S1). Then, outer shape image data is processed by the image processing unit 453 (Step S2).

Subsequently, on the basis of, the structure of a standard human body, an anatomic feature is recognized from the outer shape image data processed in Step S2, by the anatomy recognition unit 454. As a result, an outer shape is recognized (Step S3).

Further, on the basis of the anatomic feature obtained in Step S3, a gesture is recognized by the gesture recognition unit 456 (Step S4).

The gesture recognition unit 456 refers to gesture data recorded in the gesture data unit 455, and recognizes the gesture from the outer shape whose anatomic feature has been recognized. Note that, although it is assumed that the gesture recognition unit 456 refers to the gesture data recorded in the gesture data unit 455, not limited thereto, the gesture recognition unit 456 may refer to other arbitrary data, and may perform processing without any reference.

In such a manner as described above, a gesture of hands is recognized as illustrated in FIG. 5(*a*).

Subsequently, the application unit 459 and the event service unit 460 carry out a predetermined event in accordance with the gesture recognized by the gesture recognition unit 456 (Step S5).

As a result, as illustrated in FIG. 5(*b*), for example, an image is displayed by a picture application. On this occasion, taken image data from the camera unit 303 may be displayed on this screen.

Lastly, the view service unit 462, the calibration service unit 461, the graphics processor unit 463, the display processor unit 464, and the composition processor unit 458 display or virtually display an image on the semi-transmissive displays 220 (Step S6). As a result, skeletons of the hands indicating the gesture are displayed as illustrated in FIG. 5(*c*), and a composite image that is formed such that the shape and size of a picture coincide with the shape and size of the skeletons is displayed as illustrated in FIG. 5(*d*).

Note that the 6-axis sensor driver unit 465 always detects signals from the gyroscope unit 420 and the acceleration detection unit 430, and transmits a posture condition to the display processor unit 464.

In the case where the user to whom the glasses display device 100 is attached inclines the glasses display device 100, the 6-axis sensor driver unit 465 always receives signals from the gyroscope unit 420 and the acceleration detection unit 430, and controls image display. In this control, the displayed image may be kept horizontal, and may be adjusted in accordance with the inclination.

(One Example of Detection Region and Virtual Display Region)

Next, a relation between a detection region of the infrared ray detection unit 410 of the operation system 400 and a virtual display region of the pair of semi-transmissive displays 220 is described.

Figure 6:
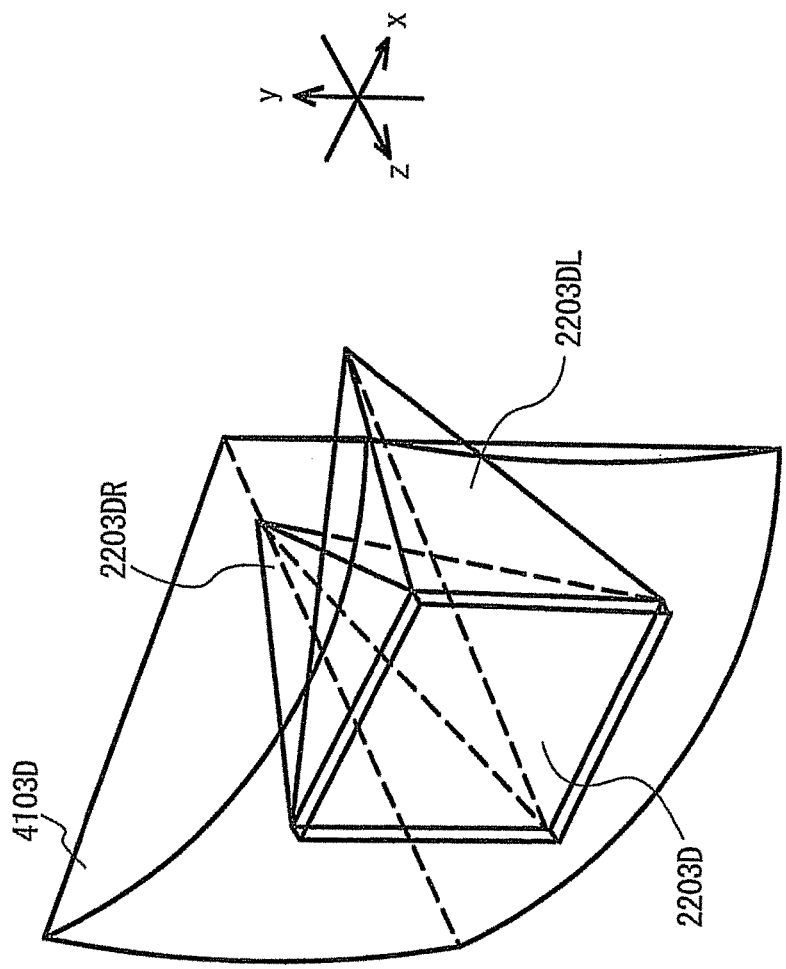
FIG. 6 is a schematic perspective view for describing a detection region of an infrared ray detection unit 410 and a virtual display region of a pair of semi-transmissive displays 220.
Figure 7:
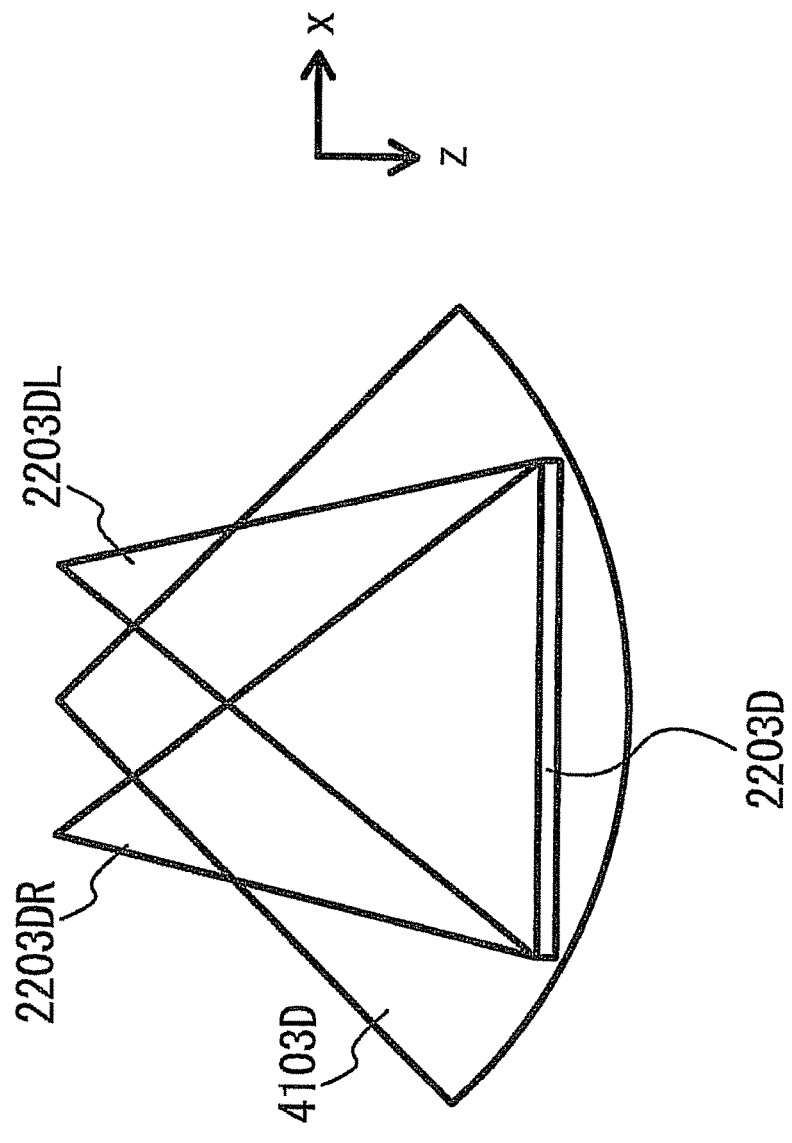
FIG. 7 is a top view of FIG. 6.
Figure 8:
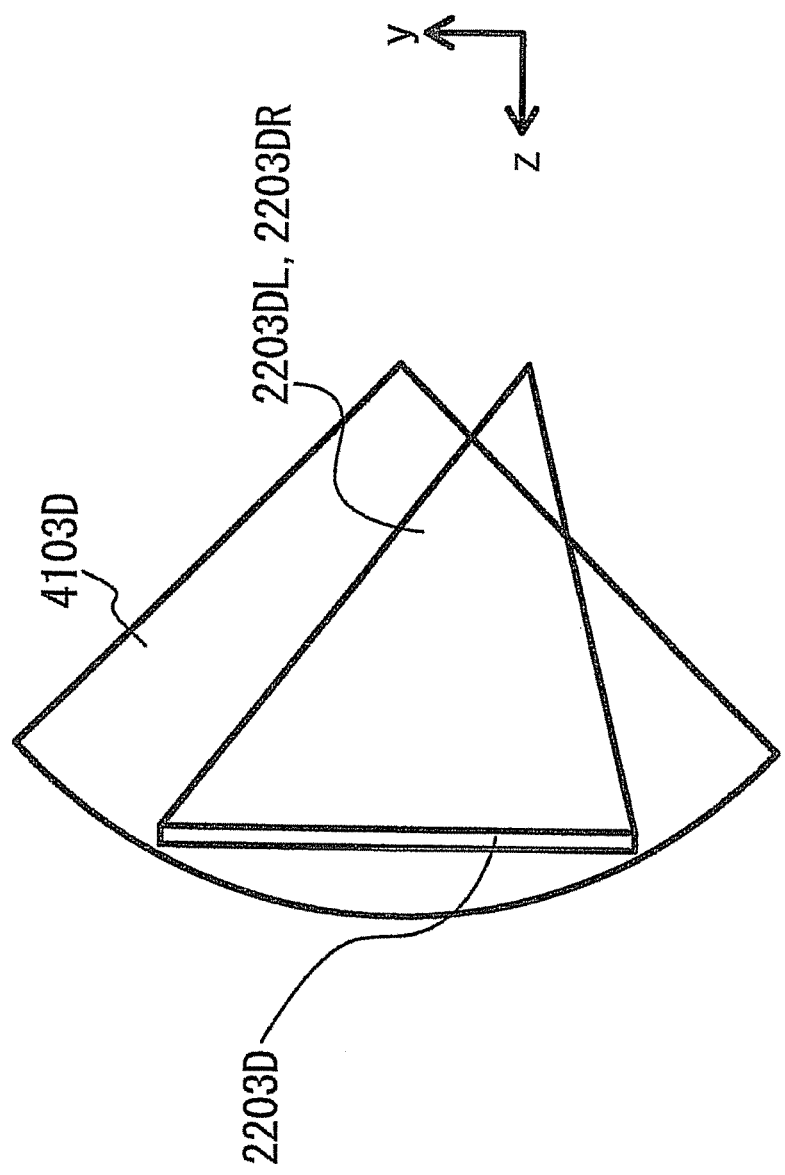
FIG. 8 is a side view of FIG. 6.

FIG. 6 is a schematic perspective view for describing the detection region of the infrared ray detection unit 410 and the virtual display region of the pair of semi-transmissive displays 220, FIG. 7 is a top view of FIG. 6, and FIG. 8 is a side view of FIG. 6.

In the following, for convenience of description, a three-dimensional orthogonal coordinate system formed by an x-axis, a y-axis, and a z-axis is defined as illustrated in FIG. 6. In the following drawings, an x-axis arrow indicates the horizontal direction. A y-axis arrow indicates the vertical direction or the long axis direction of the user's body. A z-axis arrow indicates the depth level direction. The z-axis positive direction indicates the direction of a higher depth level. The direction of each arrow is the same in the other drawings.

As illustrated in FIG. 6 to FIG. 8, a three-dimensional space detection region (3D space) 4103D in which detection by the infrared ray detection unit 410 of the operation system 400 is possible is provided.

The three-dimensional space detection region 4103D is formed by a conical or pyramidal three-dimensional space extending from the infrared ray detection unit 410.

That is, infrared rays emitted from the infrared ray emission element 411 can be detected by the infrared ray detection camera 412, and hence the infrared ray detection unit 410 can recognize a gesture in the three-dimensional space detection region 4103D.

Moreover, although one infrared ray detection unit 410 is provided in the present embodiment, not limited thereto, a plurality of the infrared ray detection units 410 may be provided, and one infrared ray emission element 411 and a plurality of the infrared ray detection cameras 412 may be provided.

Subsequently, as illustrated in FIG. 6 to FIG. 8, the pair of semi-transmissive displays 220 is visually recognized by the user as a virtual display with a depth in not an actual place of the glasses display device 100 but a virtual image display region 2203D that is a place apart from the glasses display device 100. The depth corresponds to the thickness in the depth level direction (z-axis direction) of a virtual stereoscopic shape of the virtual image display region 2203D. Accordingly, the depth is provided in accordance with the thickness in the depth level direction (z-axis direction) of the virtual stereoscopic shape.

That is, although images are respectively displayed on the semi-transmissive displays 220 of the glasses display device 100 in actuality, a right-eye image is transmitted through the semi-transmissive display 220 on the right-eye side to be recognized by the user in a three-dimensional space region 2203DR, and a left-eye image is transmitted through the semi-transmissive display 220 on the left-eye side to be recognized by the user in a three-dimensional space region 2203DL. As a result, the two recognized images are composited with each other in the brain of the user, whereby the user can recognize the two images as a virtual image in the virtual image display region 2203D.

Moreover, the virtual image display region 2203D is displayed using any of a frame sequential method, a polarization method, a linear polarization method, a circular polarization method, a top-and-bottom method, a side-by-side method, an anaglyph method, a lenticular method, a parallax barrier method, a liquid crystal parallax barrier method, a two-parallax method, and a multi-parallax method using three or more parallaxes.

Moreover, in the present embodiment, the virtual image display region 2203D includes a space region common to the three-dimensional space detection region 4103D. In particular, as illustrated in FIG. 6 and FIG. 7, the virtual image display region 2203D exists inside of the three-dimensional space detection region 4103D, and hence the virtual image display region 2203D corresponds to the common region.

Note that the shape and size of the virtual image display region 2203D can be arbitrarily adjusted by a display method on the pair of semi-transmissive displays 220.

Moreover, as illustrated in FIG. 8, description is given above of the case where the infrared ray detection unit 410 is arranged above (y-axis positive direction) the pair of semi-transmissive displays 220. Even if the arrangement position in the vertical direction (y-axis direction), of the infrared ray detection unit 410 is below (y-axis negative direction) the semi-transmissive displays 220 or the same as the position of the semi-transmissive displays 220, the virtual image display region 2203D similarly includes a space region common to the three-dimensional space detection region 4103D.

(Other Examples of Detection Region and Virtual Display Region)

Figure 9:
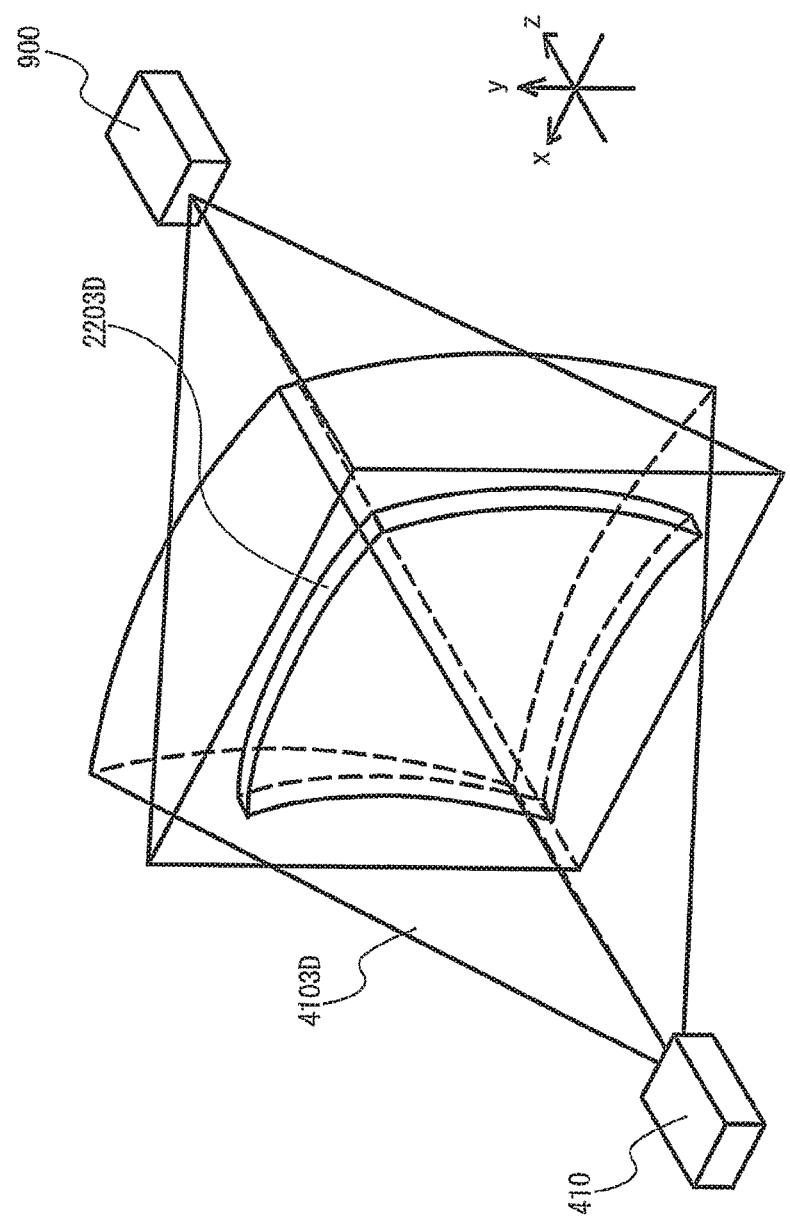
FIG. 9 is a schematic diagram illustrating another example of the detection region and the virtual display region.
Figure 10:
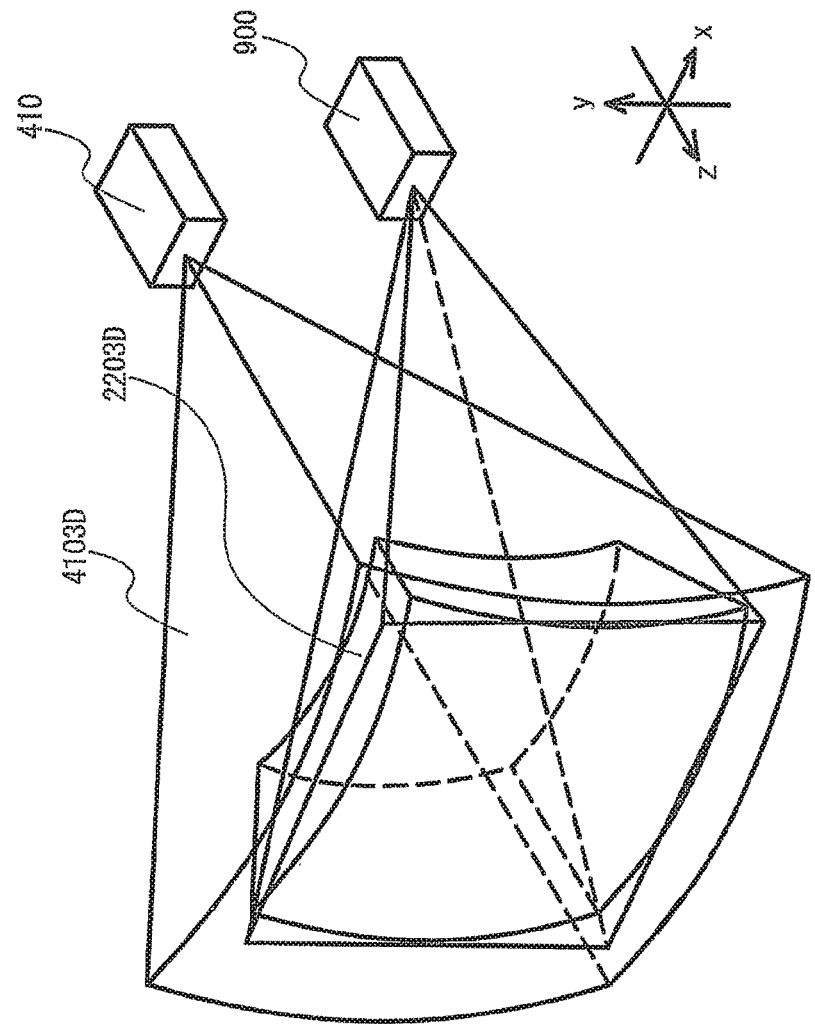
FIG. 10 is a schematic diagram illustrating another example of the detection region and the virtual display region.
Figure 11:
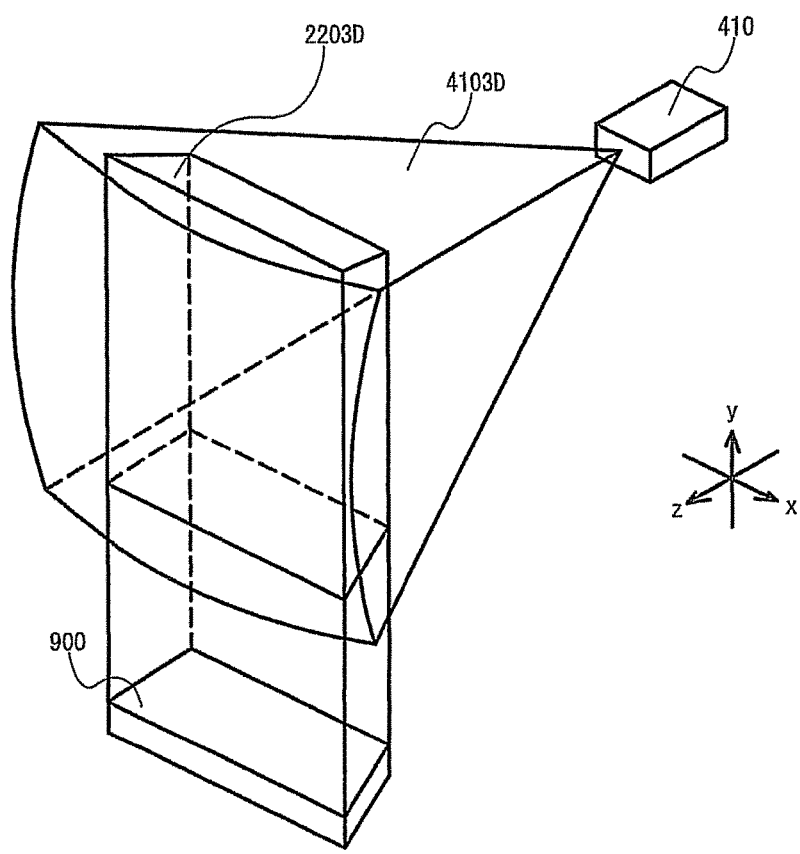
FIG. 11 is a schematic diagram illustrating another example of the detection region and the virtual display region.

Next, FIG. 9 to FIG. 11 are schematic diagrams respectively illustrating other examples of the detection region and the virtual display region illustrated in FIG. 6 to FIG. 8.

For example, as illustrated in FIG. 9 to FIG. 11, other I/O devices, display devices, televisions, monitors, and the like may be used instead of the semi-transmissive displays 220 of the glasses display device 100. Hereinafter, other I/O devices, display devices, televisions, monitors, and projectors are collectively referred to as an I/O device 900.

As illustrated in FIG. 9, the virtual image display region 2203D may be outputted in the z-axis negative direction from the I/O device 900, and the three-dimensional space detection region 4103D may be formed in the z-axis positive direction from the infrared ray detection unit 410 that is positioned so as to be opposed to the I/O device 900 in the z-axis direction.

In this case, the virtual image display region 2203D outputted by the I/O device 900 is generated as a space region common to the three-dimensional space detection region 4103D.

Moreover, as illustrated in FIG. 10, the virtual image display region 2203D may be outputted from the I/O device 900, and the three-dimensional space detection region 4103D of the infrared ray detection unit 410 may be formed in the same direction as that of the I/O device 900 (both in the z-axis positive direction with respect to the x-y plane).

Also in this case, the virtual image display region 2203D outputted by the I/O device 900 is generated as a space region common to the three-dimensional space detection region 4103D.

Then, as illustrated in FIG. 11, the virtual image display region 2203D may be outputted in the vertical upward direction (y-axis positive direction) from the I/O device 900. Also in FIG. 11, similarly to FIG. 9 and FIG. 10, the virtual image display region 2203D outputted by the I/O device 900 is generated as a space region common to the three-dimensional space detection region 4103D.

Moreover, although not illustrated, the I/O device 900 may be arranged on the upper side (y-axis positive direction side) of the three-dimensional space detection region 4103D, and the virtual image display region 2203D may be outputted in the vertical downward direction (y-axis negative direction). The virtual image display region 2203D may be outputted in the horizontal direction (x-axis direction). Like a projector or a movie theater, the virtual image display region 2203D may be outputted from the upper back side (the z-axis positive direction and the y-axis positive direction).

(Manipulation Region and Gesture Region)

Figure 12:
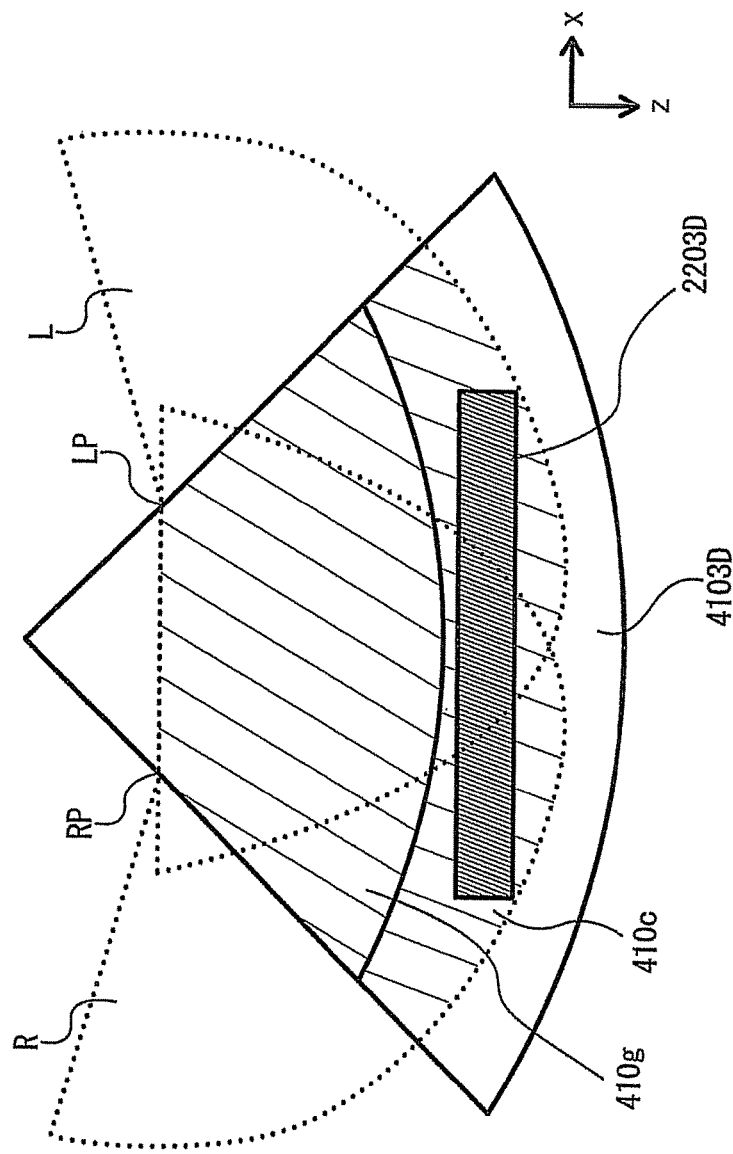
FIG. 12 is a schematic diagram illustrating an example of a manipulation region and a gesture region in the detection region.
Figure 13:
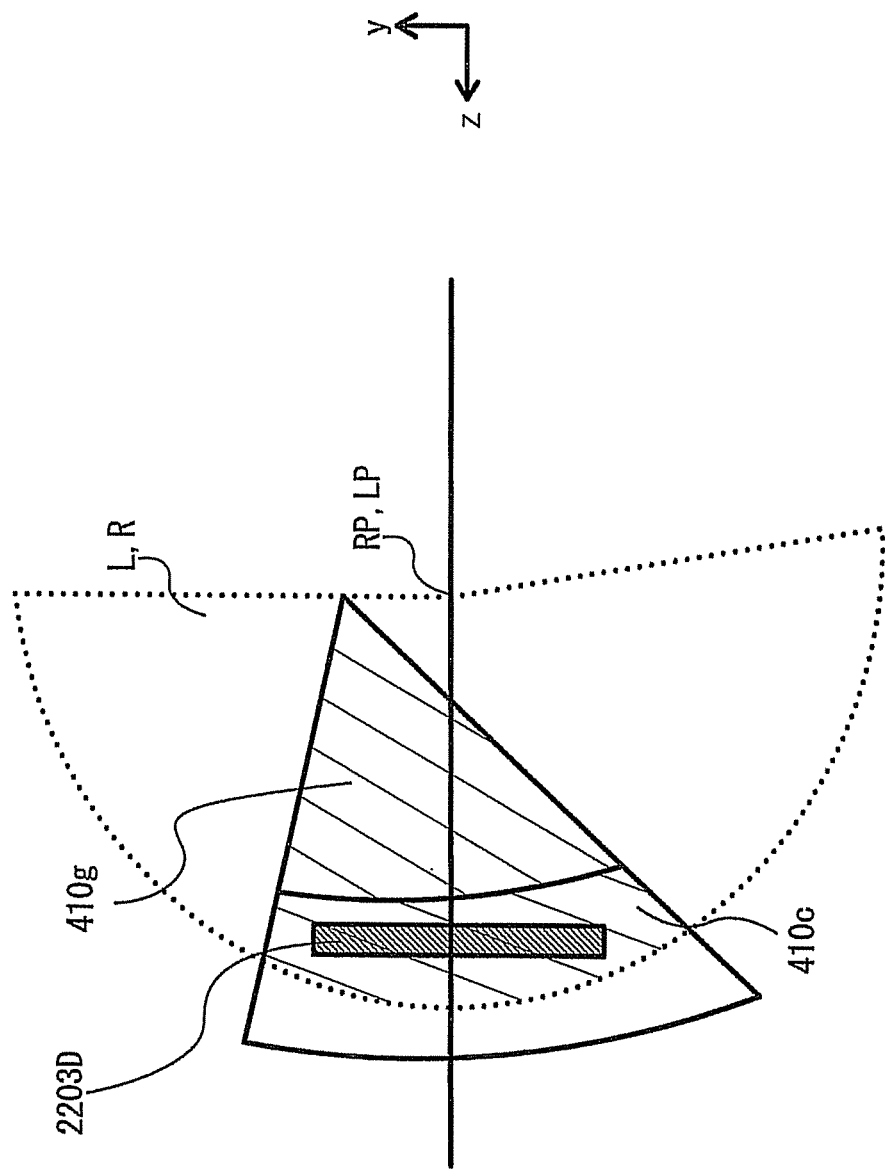
FIG. 13 is a schematic diagram illustrating an example of the manipulation region and the gesture region in the detection region.

Next, a manipulation region and a gesture region in the detection region are described. FIG. 12 and FIG. 13 are schematic diagrams illustrating an example of the manipulation region and the gesture region in the detection region.

First, as illustrated in FIG. 12, in general, the user horizontally moves both his/her hands about both his/her shoulder joints (a right shoulder joint RP and a left shoulder joint LP) as the respective centers of rotation, and hence both his/her hands can respectively move within a movement region L and a movement region R surrounded by dotted lines.

Moreover, as illustrated in FIG. 13, in general, the user vertically moves both his/her hands about both his/her shoulder joints (the right shoulder joint RP and the left shoulder joint LP) as the respective centers of rotation, and hence both his/her hands can respectively move within the movement region L and the movement region R surrounded by dotted lines.

That is, as illustrated in FIG. 12 and FIG. 13, the user can move both his/her hands about the right shoulder joint RP and the left shoulder joint LP as the respective centers of rotation, in a three-dimensional space having an imperfect spherical shape (having an arch-like curved surface that is convex in the depth level direction).

Then, an overlapping space region of all of: the three-dimensional space detection region 4103D of the infrared ray detection unit 410; a region in which a virtual image display region can exist (in FIG. 12, the virtual image display region 2203D is illustrated as an example); and a region obtained by integrating the arm movement region L and the arm movement region R is set as a manipulation region 410c.

Moreover, a portion other than the manipulation region 410c in the three-dimensional space detection region 4103D is set as a gesture region 410g, the portion overlapping with the region obtained by integrating the arm movement region L and the arm movement region R.

Here, the manipulation region 410c has a stereoscopic shape whose farthest surface in the depth level direction is an arch-like curved surface that is convex in the depth level direction (z-axis positive direction), whereas the virtual image display region 2203D has a stereoscopic shape whose farthest surface in the depth level direction is a planar surface. Due to such a difference in the shape of the farthest surface between the two regions, the user physically feels a sense of discomfort during the manipulation. In order to solve the sense of discomfort, adjustment is performed in a calibration process. Moreover, the details of the calibration process are described below.

(Description of Calibration)

Figure 14:
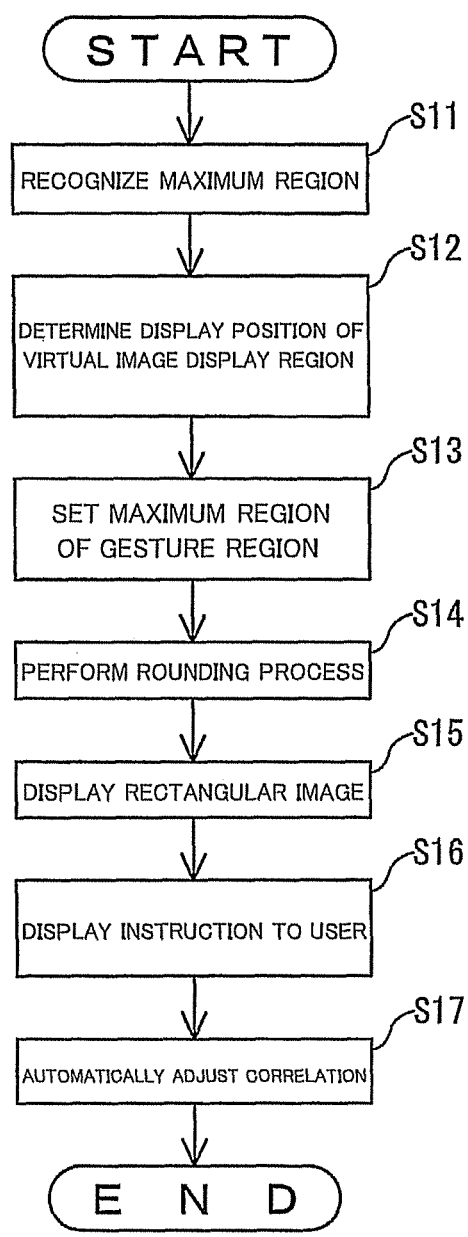
FIG. 14 is a flowchart for describing a calibration process.

Next, the calibration process is described. FIG. 14 is a flowchart for describing the calibration process.

As illustrated in FIG. 12 and FIG. 13, when the user tries to move his/her hand(s) along the virtual image display region 2203D, the user needs to move his/her hand(s) along a plane without any guide. Accordingly, the calibration process is performed to facilitate the manipulation in the virtual image display region 2203D through a recognition process to be described below.

Moreover, in the calibration process, the finger length, the hand length, and the arm length, which are different for each user, are also adjusted.

Hereinafter, description is given with reference to FIG. 14. First, the glasses display device 100 is attached to the user, and the user maximally stretches both his/her arms. As a result, the infrared ray detection unit 410 recognizes the maximum region of the manipulation region 410c (Step S11).

That is, because the finger length, the hand length, and the arm length are different for each user, the manipulation region 410c is adjusted to suit each user.

Then, in the glasses display device 100, a display position of the virtual image display region 2203D is determined (Step S12). That is, if the virtual image display region 2203D is arranged outside of the manipulation region 410c, a user's manipulation becomes impossible, and hence the virtual image display region 2203D is arranged inside of the manipulation region 410c.

Subsequently, the maximum region of the gesture region 410g is set within the three-dimensional space detection region 4103D of the infrared ray detection unit 410 of the glasses display device 100 so as not to overlap with the display position of the virtual image display region 2203D (Step S13).

Note that it is preferable that the gesture region 410g be arranged so as not to overlap with the virtual image display region 2203D and be provided with a thickness in the depth direction (z-axis positive direction).

In the present embodiment, the manipulation region 410c, the virtual image display region 2203D, and the gesture region 410g are set in such a manner as described above.

Next, calibration of the virtual image display region 2203D in the manipulation region 410c is described.

In the case where it is determined that the finger(s), the hand(s), or the arm(s) of the user exist around the outside of the virtual image display region 2203D in the manipulation region 410c, such rounding as if the finger(s), the hand(s), or the arm(s) of the user existed inside of the virtual image display region 2203D is performed (Step S14).

As illustrated in FIG. 12 and FIG. 13, in a region near a central part of an image virtually displayed by the semi-transmissive displays 220, if the user maximally stretches both his/her arms, the tips of both his/her hands do not stay within the virtual image display region 2203D and go out thereof in the depth direction (z-axis positive direction). Meanwhile, in an end part of the virtually displayed image, unless the user maximally stretches both his/her arms, it is not determined that the tips of both his/her hands exist within the virtual image display region 2203D.

Hence, if a signal from the infrared ray detection unit 410 is used without being processed, even if the tips of his/her hands go out of the virtual image display region 2203D, the user has difficulty in physically feeling such a state.

Accordingly, in the process of Step S14 in the present embodiment, the signal from the infrared ray detection unit 410 is processed such that the tips of his/her hands that protrude to the outside of the virtual image display region 2203D are corrected to exist within the virtual image display region 2203D.

As a result, in the state where the user maximally stretches or slightly bends both his/her arms, a manipulation from the central part to the end part in the planar virtual image display region 2203D with a depth is possible.

Note that, although the virtual image display region 2203D is formed by a three-dimensional space region whose farthest surface in the depth level direction is a planar surface in the present embodiment, not limited thereto, the virtual image display region 2203D may be formed by a three-dimensional space region that is a curved surface having a shape along the farthest surfaces in the depth level direction of the farthest surface regions L and R in the depth level direction. As a result, in the state where the user maximally stretches or slightly bends both his/her arms, a manipulation from the central part to the end part in the planar virtual image display region 2203D with a depth is possible.

Further, the semi-transmissive displays 220 display a rectangular image in the virtual image display region 2203D. For example, as illustrated in FIG. 5(b), the semi-transmissive displays 220 display a rectangular image (Step S15).

Subsequently, an instruction to the effect that "please surround the displayed image with your fingers" is displayed on the semi-transmissive displays 220 (Step S16). Here, a finger-shaped image may be softly displayed in the vicinity of the image, and a vocal instruction from the speaker may be given to the user instead of such display on the semi-transmissive displays 220.

According to the instruction, the user places his/her fingers on a portion of the image as illustrated in FIG. 5(d). Then, a correlation between the display region of the virtual image display region 2203D and the infrared ray detection unit 410 is automatically adjusted (Step S17).

Note that, in the above example, the user defines a rectangular with his/her fingers, and places the rectangular thus defined on the rectangular of the outer edge of the image. For this reason, the visual recognition size and position of the rectangular defined by his/her fingers is made coincident with the visual recognition size and position of the rectangular of the outer edge of the image. However, the method of defining a shape with fingers is not limited thereto, and may be other arbitrary methods such as a method of tracing the outer edge of the displayed image with a finger and a method of pointing to a plurality of points on the outer edge of the displayed image with a finger. Moreover, these methods may be applied to images having a plurality of sizes.

Note that, although only the case of the glasses display device 100 is taken in the above description of the calibration process, in the case of the I/O device 900, an image may be displayed in the process of Step S11, and a correlation between the displayed image and the infrared ray detection unit 410 may be adjusted in the process of Step S17.

(Finger, Palm, and Arm Recognition)

Figure 15:
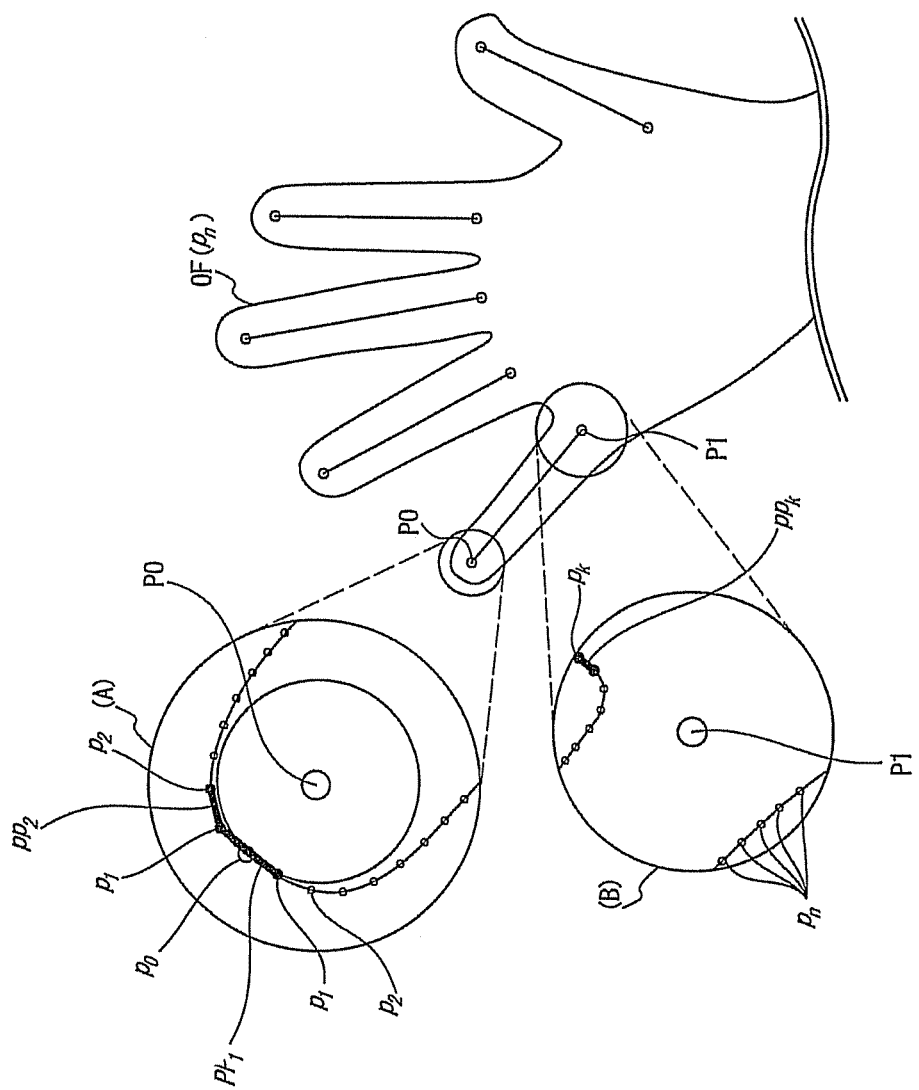
FIG. 15 is a schematic diagram illustrating an example of finger recognition.
Figure 16:
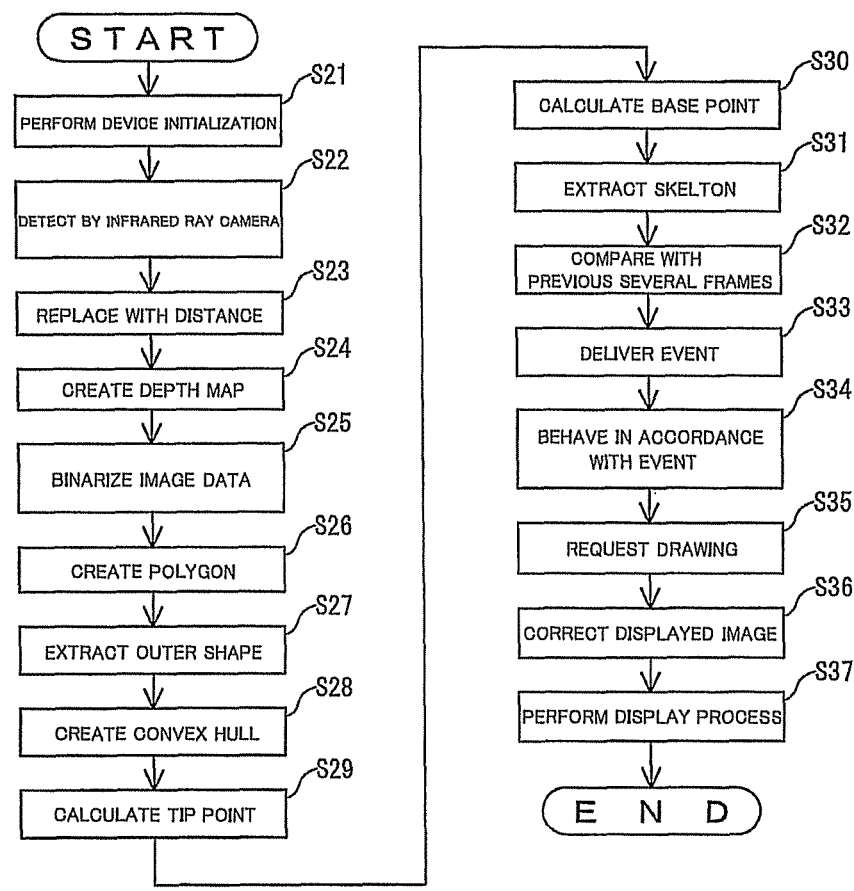
FIG. 16 is a flowchart illustrating an example of a finger recognition process.

Next, finger recognition is described, followed by description of palm recognition and arm recognition in the stated order. FIG. 15 is a schematic diagram illustrating an example of the finger recognition. In FIG. 15, (A) is an enlarged view of the vicinity of the tip of a finger, and (B) is an enlarged view of the vicinity of the base of the finger. FIG. 16 is a flowchart illustrating an example of the finger recognition process.

As illustrated in FIG. 16, in the present embodiment, device initialization is performed (Step S21). Then, an infrared ray that has been emitted from the infrared ray emission element 411 and has been reflected on a hand is detected by the infrared ray detection camera 412 (Step S22).

Then, image data is replaced with a distance on a pixel basis by the infrared ray detection unit 410 (Step S23). In this case, the luminance of the infrared ray is inversely proportional to the cube of the distance. A depth map is created using this fact (Step S24).

Subsequently, an appropriate threshold is set to the created depth map. Then, the image data is binarized (Step S25). That is, noise is removed from the depth map.

Subsequently, a polygon having about 100 vertexes is created from the binarized image data (Step S26). Then, a new polygon having a larger number of vertexes $p_n$ is created using a low-pass filter (LPF) such that the vertexes become smoother, whereby an outer shape OF of the hand illustrated in FIG. 15 is extracted (Step S27).

Note that, although the number of vertexes that are extracted from the data binarized in Step S26 in order to create a polygon is about 100 in the present embodiment, not limited thereto, the number of vertexes may be 1,000 or other arbitrary numbers.

(Finger Recognition)

A convex hull is extracted using Convex Hull from the set of the vertexes $p_n$ of the new polygon created in Step S27 (Step S28).

After that, a vertex $p_0$ common between the new polygon created in Step S27 and the convex hull created in Step S28 is extracted (Step S29). The common vertex $p_0$ itself thus extracted can be used as a tip point of the finger.

Further, another point calculated on the basis of the position of the vertex $p_0$ may be used as the tip point of the finger. For example, as illustrated in FIG. 15(A), the center of an inscribed circle of the outer shape OF at the vertex $p_0$ may also be calculated as a tip point P0.

Then, as illustrated in FIG. 15, a vector of a reference line segment $PP_1$ that passes through a pair of right and left vertexes $p_1$ adjacent to the vertex $p_0$ is calculated. After that, a side $pp_2$ connecting each vertex $p_1$ and a vertex $p_2$ adjacent thereto is selected, and a vector of the side $pp_2$ is calculated. Similarly, with the use of the vertexes $p_n$ forming the outer shape OF, such a process of obtaining a vector of each side is repeated along the outer periphery of the outer shape OF. The direction of each side and the direction of the reference line segment $PP_1$ calculated in the process of Step S30 are compared with each other, and a side $pp_k$ that is close to parallel to the reference line segment $PP_1$ is determined to exist at the position of a valley between fingers. Then, a base point P1 of the finger is calculated on the basis of the position of the side $pp_k$ (Step S30). A skeleton of the finger can be obtained by connecting the tip point P0 of the finger and the base point P1 of the finger using a straight line (Step S31). If the skeleton of the finger are obtained, the extending direction of the finger can be recognized.

A similar process is performed on all the fingers, whereby the skeletons of all the fingers are obtained. As a result, the pose of the hand can be recognized. That is, it can be recognized which of the thumb, the index finger, the middle finger, the ring finger, and the little finger is stretched and which thereof is bent.

Subsequently, a difference in the pose of the hand is detected in comparison with image data of several frames taken immediately before (Step S32). That is, movement of the hand can be recognized through the comparison with the image data of the several frames taken immediately before.

Subsequently, the recognized shape of the hand is event-delivered as gesture data to the event service unit 460 (Step S33).

Subsequently, a behavior according to the event is carried out by the application unit 459 (Step S34).

Subsequently, drawing in a three-dimensional space is requested by the view service unit 462 (Step S35).

The graphics processor unit 463 refers to the calibration data unit 457 using the calibration service unit 461, and corrects the displayed image (Step S36).

Lastly, the resultant image is displayed on the semi-transmissive displays 220 by the display processor unit 464 (Step S37).

Note that, although the base point of each finger is detected through the process of Step S30 and the process of Step S31 in the present embodiment, the method of detecting the base point is not limited thereto. For example, first, the length of the reference line segment $PP_1$ is calculated, the reference line segment $PP_1$ connecting the pair of vertexes $p_1$ that are adjacent to the vertex $p_0$ on one side and another side of the vertex $p_0$, respectively. Then, the length of a line segment connecting the pair of vertexes $p_2$ on the one side and the another side is calculated. Similarly, the length of each line segment connecting a pair of vertexes on the one side and the another side is calculated in order from vertexes positioned closer to the vertex $p_0$ to vertexes positioned farther therefrom. Such line segments do not intersect with one another inside of the outer shape OF, and are substantially parallel to one another. In the case where the vertexes at both the ends of such a line segment are in the portion of the finger, the length of the line segment corresponds to the width of the finger, and hence the amount of change thereof is small. Meanwhile, in the case where at least any of the vertexes at both the ends of such a line segment reaches the portion of the valley between the fingers, the amount of change of the length becomes larger. Accordingly, a line segment that has the length whose amount of change does not exceed a predetermined amount and is the farthest from the vertex $p_0$ is detected, and one point on the detected line segment is extracted, whereby the base point can be determined.

(Palm Recognition)

Figure 17:
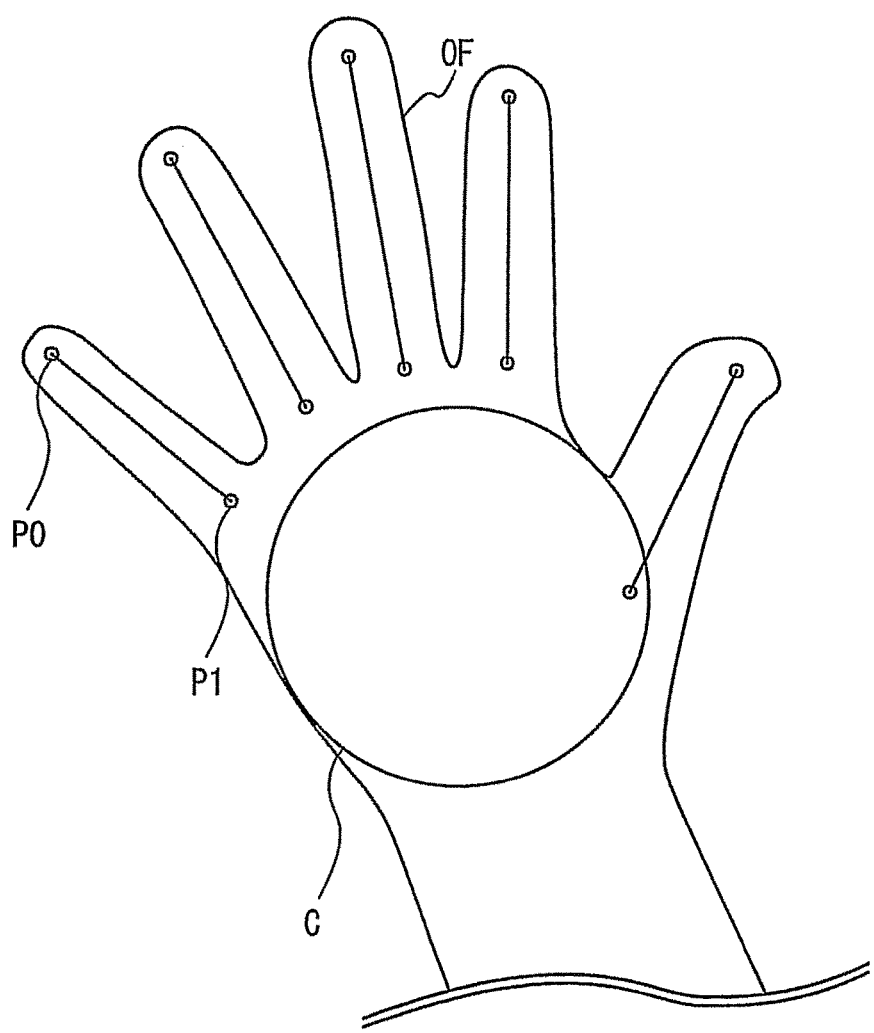
FIG. 17 is a schematic diagram illustrating an example of palm recognition.

Next, FIG. 17 is a schematic diagram illustrating an example of the palm recognition.

As illustrated in FIG. 17, after the finger recognition is carried out, a maximum inscribed circle C inscribed in the outer shape OF of the image data is extracted. The position of the maximum inscribed circle C can be recognized as the position of the palm.

Figure 18:
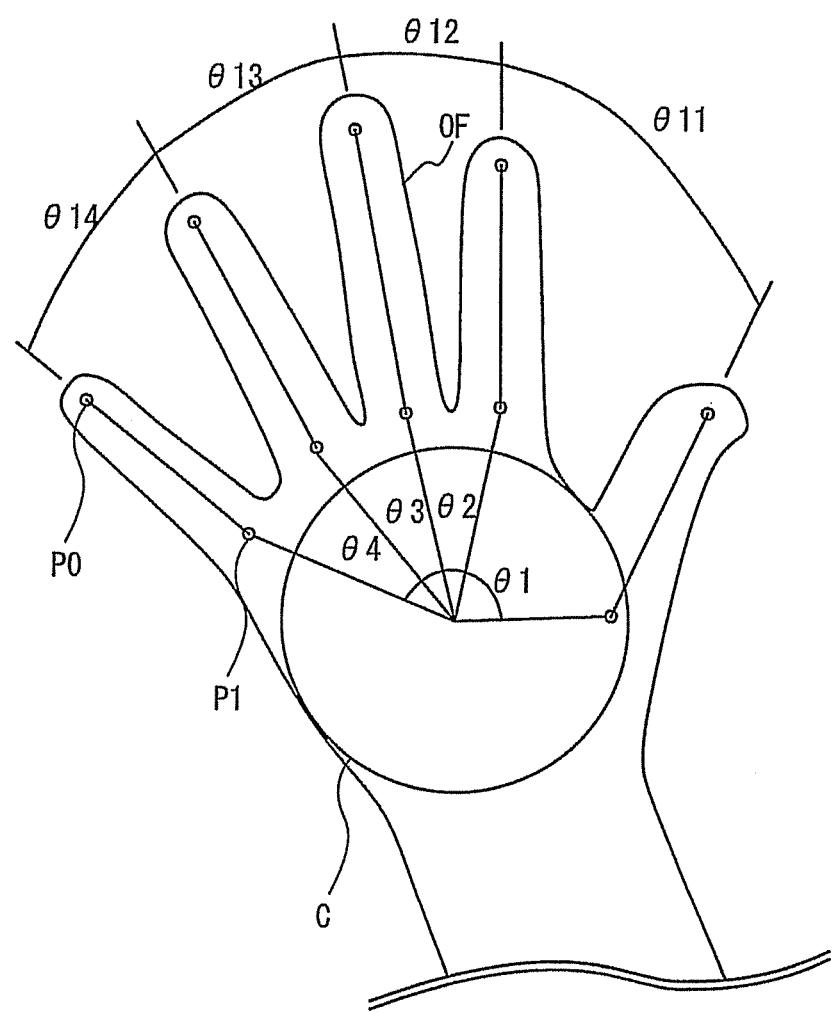
FIG. 18 is a schematic diagram illustrating an example of thumb recognition.

Next, FIG. 18 is a schematic diagram illustrating an example of thumb recognition.

As illustrated in FIG. 18, the thumb has features different from those of the other four fingers of the index finger, the middle finger, the ring finger, and the little finger. For example, among angles θ1, θ2, θ3, and θ4 mutually formed by straight lines connecting: the center of the maximum inscribed circle C indicating the position of the palm; and the respective base points P1 of the fingers, θ1 concerning the thumb tends to be the largest. Moreover, among angles θ11, θ12, θ13, and θ14 mutually formed by straight lines connecting: the respective tip points P0 of the fingers; and the respective base points P1 of the fingers, θ11 concerning the thumb tends to be the largest. The thumb is determined on the basis of such tendencies. As a result, it can be determined whether the image data is a right hand or a left hand or whether the image data is the front side or the back side of the palm.

(Arm Recognition)

Next, the arm recognition is described. In the present embodiment, the arm recognition is carried out after any of the fingers, the palm, and the thumb is recognized. Note that the arm recognition may also be carried out before any of the fingers, the palm, and the thumb is recognized or at the same time as at least any thereof is recognized.

In the present embodiment, a polygon is extracted from a region larger than the polygon of the shape of the hand of the image data. For example, the processes of Steps S21 to S27 are carried out in a length range of 5 cm or more and 100 cm or less and, more preferably, a length range of 10 cm or more and 40 cm or less, so that an outer shape is extracted.

After that, a quadrangular frame circumscribed around the extracted outer shape is selected. In the present embodiment, the shape of the quadrangular frame is a parallelogram or a rectangle.

In this case, because the parallelogram or the rectangle has longer sides opposed to each other, the extending direction of the arm can be recognized from the extending direction of the longer sides, and the direction of the arm can be determined from the direction of the longer sides. Note that, similarly to the process of Step S32, movement of the arm may be detected in comparison with image data of several frames taken immediately before.

Note that, although the fingers, the palm, the thumb, and the arm are detected from a two-dimensional image in the above description, not limited thereto, the infrared ray detection unit 410 may be further provided, or only the infrared ray detection camera 412 may be further provided, and a three-dimensional image may be recognized from two-dimensional images. As a result, the recognition accuracy can be further enhanced.

(Gesture Registration)

Gesture data to be stocked in the gesture data unit 455 (see FIG. 3) may be registered by the user. Moreover, the gesture data is set as a gesture command by the user, and is further rewritten as needed by the user.

(Gesture Data Registration)

Figure 19:
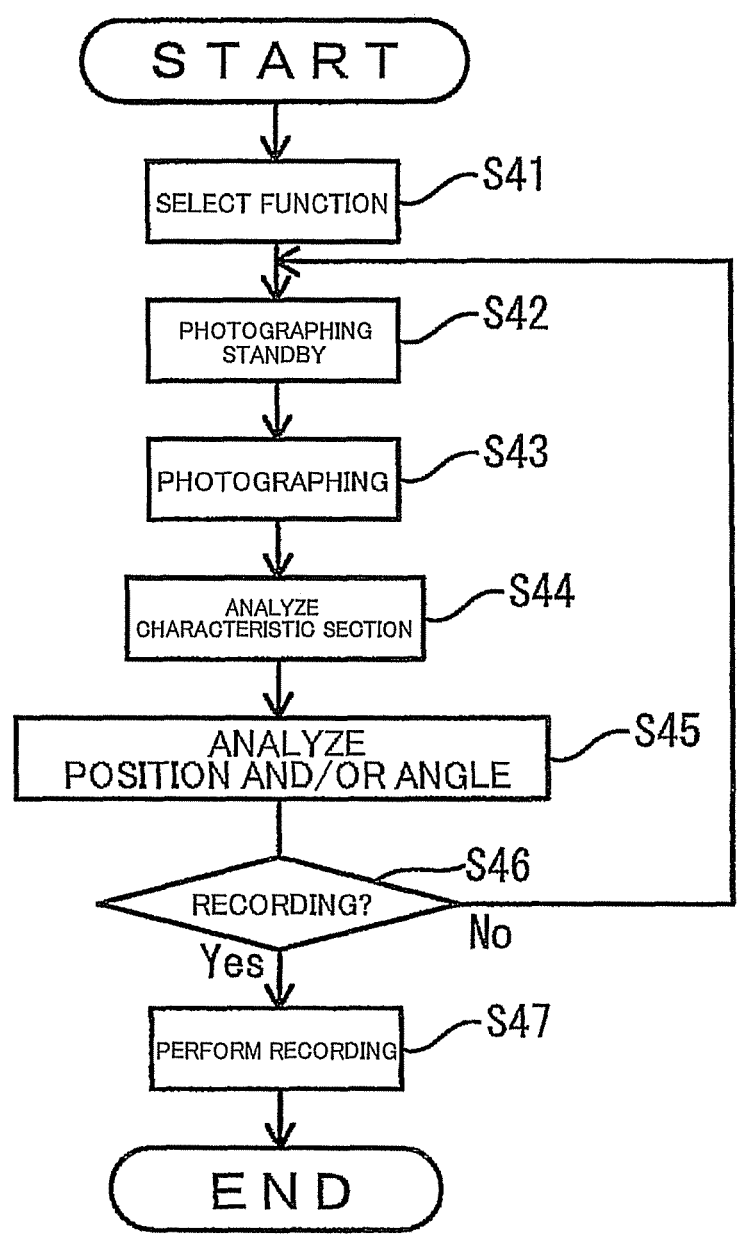
FIG. 19 is a flowchart illustrating an example of a process of registering gesture data.

FIG. 19 is a flowchart illustrating an example of a process of registering gesture data into the gesture data unit 455.

In the present embodiment, the application unit 459 activates a gesture setting application in accordance with a manipulation by the user. As illustrated in FIG. 19, a gesture data registration function is selected from functions displayed on the application screen (Step S41). Consequently, preparations for photographing are started. In the preparations for the photographing, a form whose registration as a gesture is desired by the user is represented using his/her hand and arm. The photographing is awaited until the form of the hand representing the gesture is determined by the user (Step S42). The time for awaiting the photographing can be set to, for example, five seconds.

After that, a portion including the hand and at least part of the arm representing the gesture is photographed (Step S43). Through the photographing, outer shape data is acquired as a series of detected outer shapes. In acquiring the outer shape data, a moving image is acquired by photographing the hand and the arm representing the gesture for a given time. The photographing time can be set to, for example, ten seconds.

In the case of a gesture with a motion, a state where the motion of the gesture is repeated can be photographed during the photographing time.

In the case of a gesture in which the transition of motions is not intended, a state where the user variously moves his/her hand and arm within the range not departing from a mode that the user himself/herself perceives as the gesture, while representing the sign of the gesture, can be photographed.

Note that, instead of the above-mentioned moving image photographing, the outer shape data may be acquired as a plurality of detected outer shapes by photographing still images several times. In this case, in the case of a gesture with a motion, images are continuously photographed while the gesture is represented, whereby a plurality of frames can be acquired. In the case of a gesture without a motion, the same gesture is photographed with the time and the location being changed, whereby a plurality of frames can be acquired.

The photographing is performed by, for example, the infrared ray detection unit 410. In the photographing, the infrared ray detection unit 410 detects the outer shapes of the hand and the arm representing the gesture. The outer shapes are detected through the same processes as Step S22 to Step S25 in FIG. 16. The process of detecting the outer shapes is performed for each of the plurality of frames.

On the basis of the photographing result, a feature part of the hand and the arm representing the gesture is analyzed (Step S44). The feature part is analyzed for each of the plurality of detected outer shapes. Examples of the feature part to be analyzed include a portion of a target showing an anatomic feature, such as the number of fingers in a predetermined form and the positions thereof.

Further, a value of the position and/or the angle of the feature part is analyzed (Step S45). The position of the feature part can be represented by adding coordinate information to each anatomic feature point in the target, such as points representing the finger tip and the finger base. Moreover, the angle of the feature part can be represented by adding angle information based on the extending direction of the finger, the extending direction of the arm, and the like.

In Step S44 and Step S45, the same processes as those of the above-mentioned finger recognition, palm recognition, and arm recognition are performed.

More specifically, the same processes as Step S26 to Step S31 in FIG. 16 are performed. In this manner, a similar process is performed on all the fingers, whereby the skeletons of all the fingers are obtained. Consequently, the extending direction of the finger, specifically, the angle of the finger about the joint of the finger can be recognized. Moreover, the position of a feature point indicating the finger tip, the finger base, or the like can be recognized by adding coordinate information. Further, the form of the hand can be recognized. For example, the form of each finger (specifically, which of the thumb, the index finger, the middle finger, the ring finger, and the little finger is bent and which thereof is stretched) can be recognized.

Moreover, the position of the palm can be recognized through the palm recognition similarly to FIG. 17, and it can be determined whether the image data is a right hand or a left hand or whether the image data is the front side or the back side of the palm, through the thumb recognition similarly to FIG. 18. Consequently, the position of a predetermined finger can be recognized.

Further, the extending direction of the arm, specifically, the angle of the arm about the joint of the elbow can be determined through the arm recognition.

In Step S45, further, pieces of information on the feature parts respectively extracted for the plurality of outer shapes are synthesized, whereby the movable range of the hand and the arm representing the gesture, which are the photographing target in Step S43, is derived.

Specifically, a range including the maximum value and the minimum value of the angle obtained by extracting the above described feature parts is obtained, whereby the movable range can be derived.

Alternatively, a range including a trace of coordinates of the feature point indicating the finger tip or the like is obtained, whereby the movable range can be derived.

In the case of a gesture with a motion, the plurality of outer shapes are compared over time on the basis of a difference among the feature parts respectively extracted for the plurality of outer shapes. Consequently, the transition of the outer shapes along with the gesture motion can also be recognized.

The user determines whether or not the analysis result is recorded as gesture data (Step S46). In this case, the form of the photographed hand and arm may be checked through reproduction of the photographed moving image and display of the analysis result. If the analysis result is recorded as the gesture data (Yes in Step S46), the analysis result is recorded into the gesture data unit 455 (Step S47). If the analysis result is not recorded as the gesture data (No in Step S46), no data is recorded into the gesture data unit 455, and photographing can be awaited (Step S42) again in order to photograph another moving image.

Note that, although the mode of acquiring a series of outer shapes or a plurality of outer shapes is adopted in the above-mentioned embodiment, the present invention is not limited to this mode. For example, one outer shape may be acquired, a feature point and a value of the position and/or the direction of the feature point may be analyzed for the acquired outer shape, and the analysis result may be recorded into the gesture data unit 455. In this case, a predetermined width can be provided to the acquired value, so that a predetermined range is acquired. The predetermined range can be recorded as an allowable range as the gesture into the gesture data unit 455.

(Gesture Command Setting)

Figure 20:
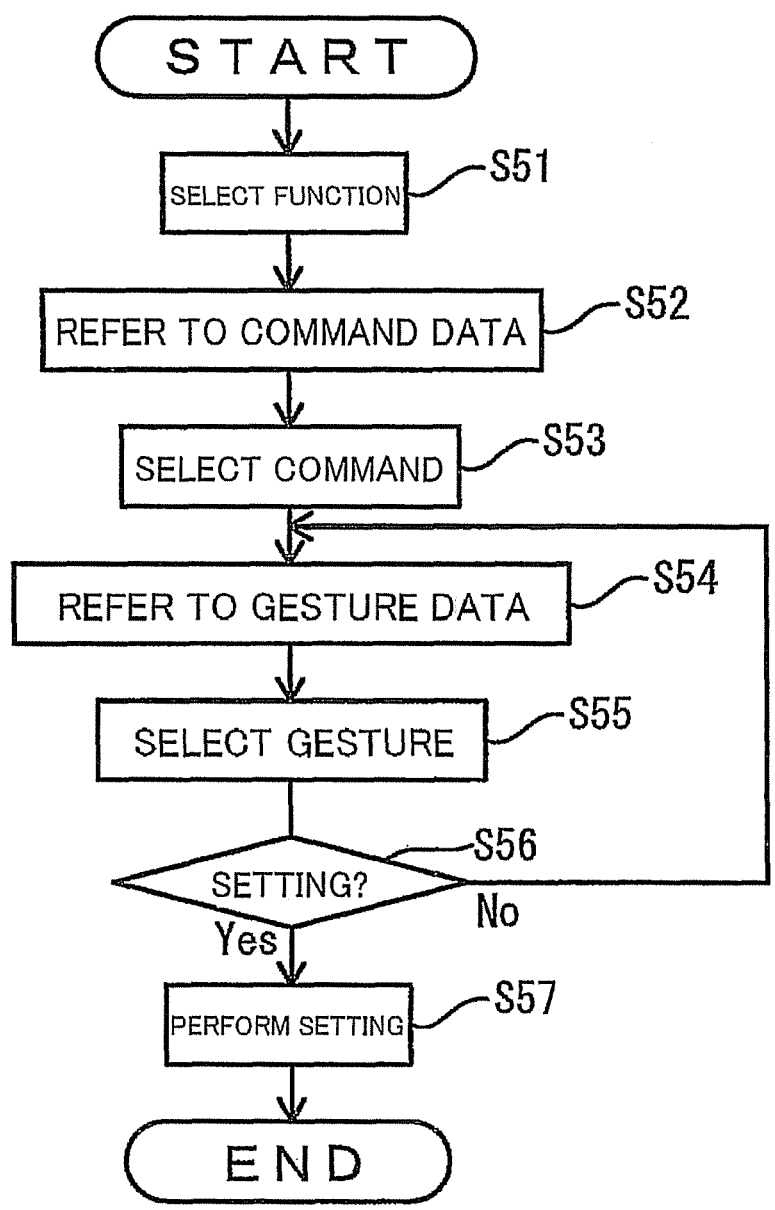
FIG. 20 is a flowchart illustrating an example of a process of setting a gesture command.

FIG. 20 is a flowchart illustrating an example of an association process of recording gesture data into the gesture data unit 455 in association with an application manipulation for which the gesture data is used as a command.

In the present embodiment, a gesture command setting function is selected from the functions displayed on the screen of the gesture setting application, in accordance with a manipulation by the user (Step S51). Then, in the application unit 459, an application manipulation command is invoked and is referred to (Step S52). The application manipulation includes every manipulation (such as activation and end of the application, selection and decision of each function in the application, and movement of the screen) to be performed for application use.

A command desired to be generated by a gesture is selected from the command data referred to (Step S53). Further, gesture data is invoked from the gesture data unit 455 and is referred to (Step S54). A gesture desired to be associated with the command selected in Step S53 is selected (Step S55). The user determines whether or not the selected gesture is set (Step S56). If the selected gesture is set (Yes in Step S56), the gesture data and an event to be generated by using the gesture data as a command are recorded in association with each other into the gesture data unit 455 (Step S57). If the selected gesture is cancelled (No in Step S56), gesture data is selected again (Step S54), and another gesture can be selected (Step S55).

Note that, although the mode of first invoking and selecting an application manipulation command and then associating gesture data with the selected application command is adopted in the above-mentioned embodiment, the present invention is not limited to this mode. For example, gesture data may be first invoked and selected, and an application manipulation command may be then associated with the selected gesture data.

Alternatively, for example, a mode of invoking an application manipulation command, then directly recording gesture data, and associating the two with each other may be adopted.

(Gesture Command Rewriting)

Figure 21:
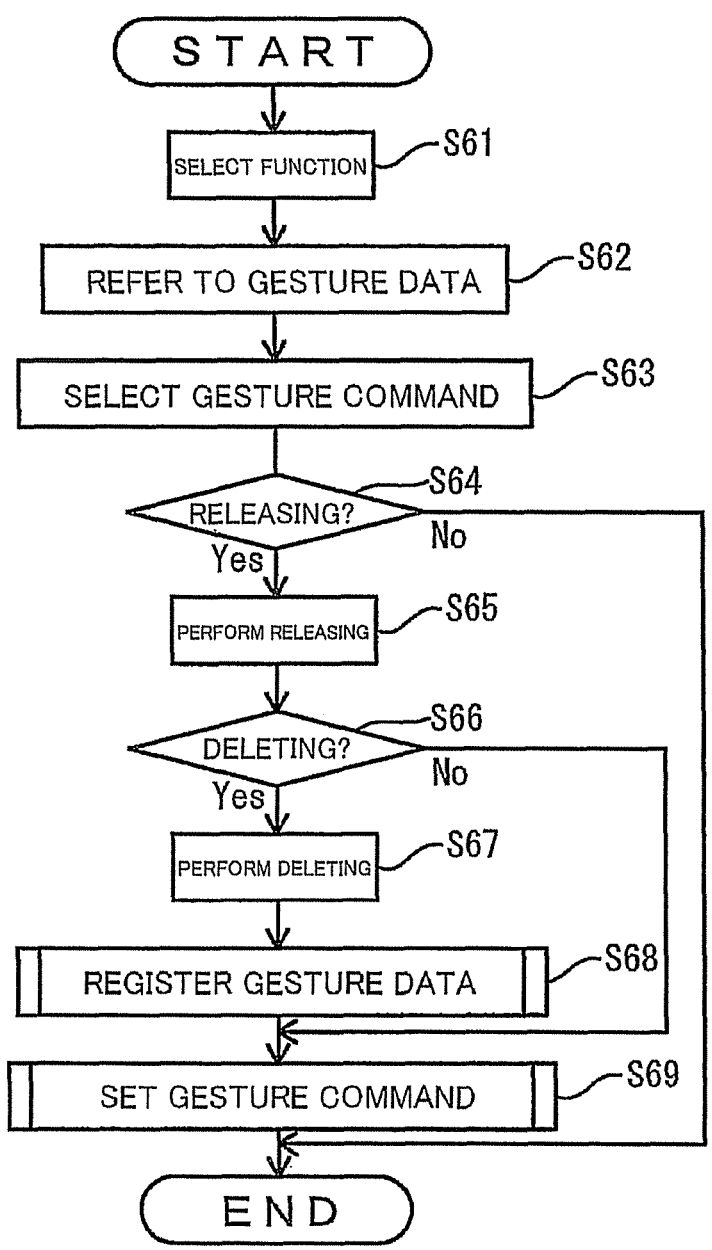
FIG. 21 is a flowchart illustrating an example of a process of rewriting the gesture command.

FIG. 21 is a flowchart illustrating an example of a process of rewriting a gesture command in the gesture data unit 455.

In the present embodiment, a gesture command rewriting function is selected from the functions displayed on the screen of the gesture setting application, in accordance with a manipulation by the user (Step S61). Then, gesture data is invoked from the gesture data unit 455 and is referred to (Step S62). A gesture command desired to be rewritten is selected (Step S63), and it is determined whether or not the association with the application manipulation with which the selected gesture command is associated is cancelled (Step S64). If the association is cancelled (Yes in Step S64), the cancellation is executed, and the gesture data constituting the gesture command is no longer associated with the application manipulation (Step S65). If the association is not cancelled (No in Step S64), this process is ended.

After the association between the gesture data and the application manipulation is cancelled in Step S65, it is further determined whether or not the gesture data itself for which the association has been cancelled is deleted (Step S66). If the gesture data itself is deleted (Yes in Step S66), the gesture data is deleted from the gesture data unit 455 (Step S67).

If the gesture data is deleted in Step S67, the gesture data registration process described with reference to FIG. 19 is performed (Step S68). After that, the gesture command setting process described with reference to FIG. 20 is performed, whereby a new gesture command is set (Step S69).

On the other hand, if the gesture data is not deleted (No in Step S66), the gesture command setting process described with reference to FIG. 20 is performed, and this gesture data is associated with another application manipulation, whereby a new gesture command is set (Step S69).

(Application Manipulation through Recognition of Set Gesture Command)

The method of recognizing a gesture using the gesture data that is recorded as described above in the gesture data unit 455 is as described in Step S1 to Step S4 in FIG. 4. More specifically, similarly to the above-mentioned gesture data registration, a plurality of frames of outer shape image data of the target are acquired in Step S2, and information on a feature part of the outer shape and the movable range thereof is acquired for each of the plurality of frames in Step S3. Further, in Step S4, the feature part of the outer shape of the gesture data and the movable range thereof recorded in the gesture data unit 455 is compared with the feature part of the outer shape of the gesture to be recognized and the movable range thereof. Through determination of coincidence between the two pieces of data, it is determined which of the pieces of gesture data recorded in the gesture data unit 455 the gesture to be recognized corresponds to.

Subsequently, as described in Step S5, the application unit 459 performs a predetermined application manipulation with the gesture determined by the gesture recognition unit 456 being used as a command.

(View Example of Semi-transmissive Display)

Figure 22:
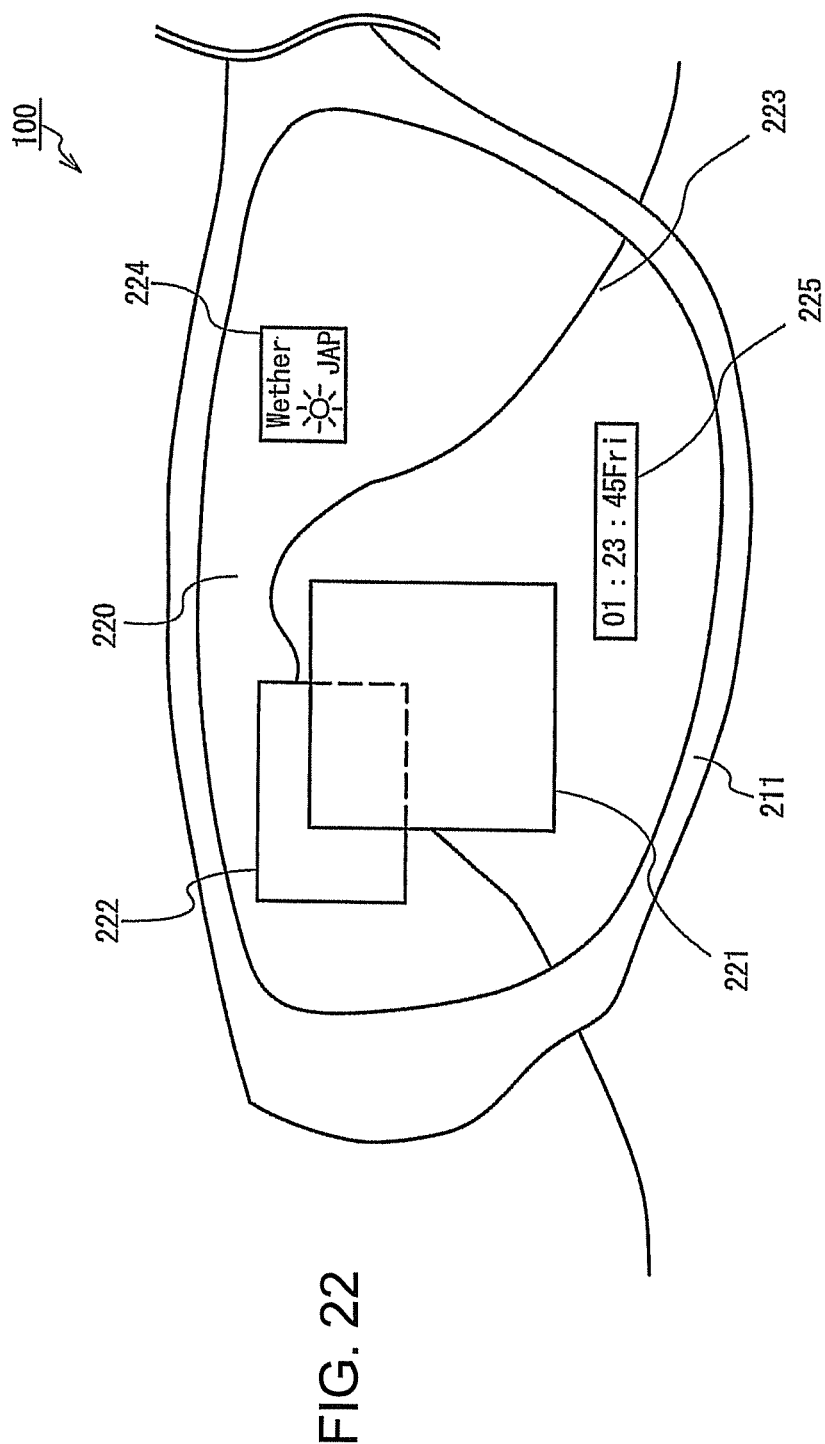
FIG. 22 is a schematic diagram illustrating an example of a view of the semi-transmissive display 220 of the glasses display device 100.

Next, FIG. 22 is a schematic diagram illustrating an example of a view of the semi-transmissive display 220 of the glasses display device 100.

As illustrated in FIG. 22, on the semi-transmissive display 220 of the glasses display device 100, an advertisement 221 is partially displayed, and a map 222 is further partially displayed. In addition, through the semi-transmissive display 220 of the glasses display device 100, scenery 223 is visually recognized. In addition, weather forecast 224 and time 225 are displayed thereon.

(Description of Field of View)

Next, an example of the view displayed on the semi-transmissive display 220 of the glasses display device 100 is described. FIG. 23(a) is a diagram for describing an example of the field of view of the semi-transmissive display 220, and FIG. 23(b) is a diagram for describing an example of the view of the semi-transparent display 220

Figure 23:
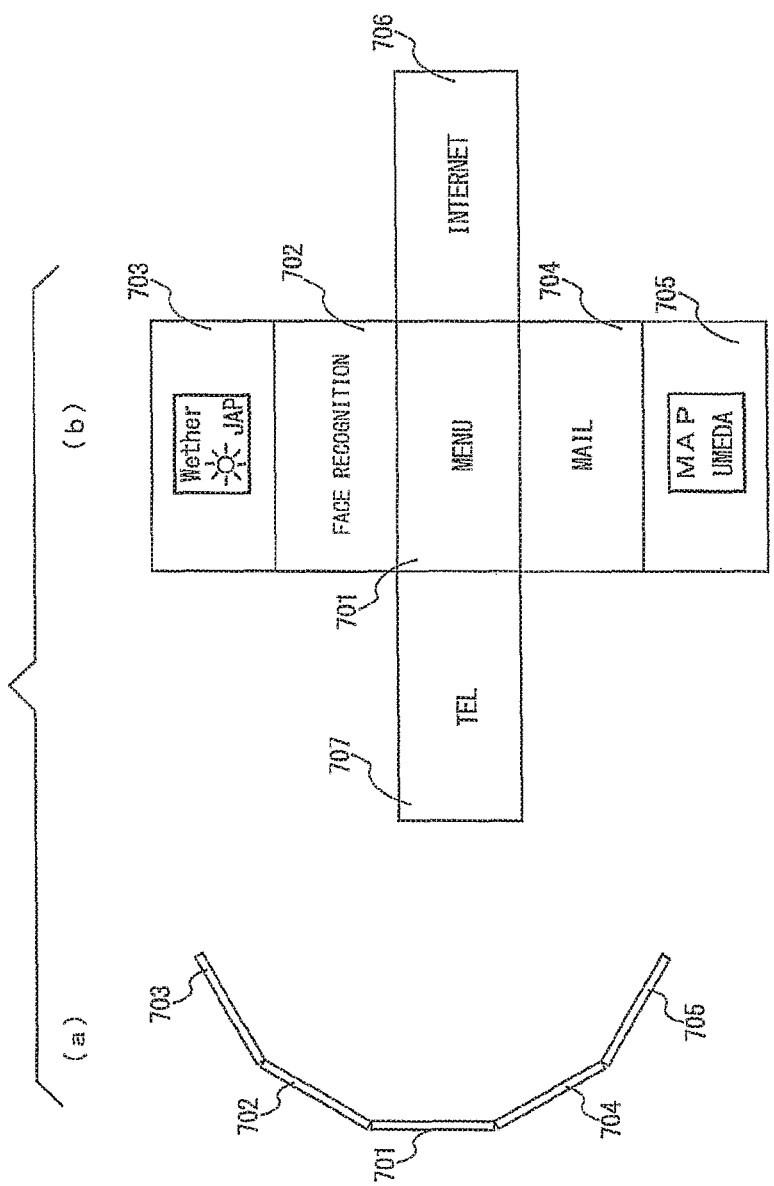
FIG. 23 is a schematic diagram illustrating an example (a) of a field of view of the semi-transmissive display 220 and an example (b) of the view of the semi-transparent display 220.

As illustrated in FIG. 23, in the present embodiment, the view that can be visually recognized on the glasses display device 100 includes a plurality of views 701 to 707. All the plurality of views are segments each constituting part of an integrated continuous image. Through smooth transition from one visually recognized portion to another visually recognized portion in the continuous image, the plurality of views are switchingly displayed without any discontinuity.

As illustrated in FIG. 23, the views 703, 702, 701, 704, and 705 are provided in the top-bottom direction, and the views 706 and 707 are respectively provided on the right side and the left side of the view 701. Note that, as a matter of course, the views 701 to 707 can be freely deleted or changed by the user, and other views can be further added by the user.

Note that, although the views 701 to 707 are a seamless continuous image in the present embodiment, the views to be switched may be discontinuous images independent of one another.

Specifically, in the case where the posture of the glasses display device 100 is in the horizontal direction, that is, in the case where the glasses display device 100 is attached to the user and where the user faces horizontally forward, the view 701 is displayed.

Subsequently, in the case where the glasses display device 100 is attached to the user and where the user faces obliquely upward at about 30 degrees with respect to a horizontal plane (that is, a plane parallel to the horizontal direction), the view 702 is displayed. That is, on the basis of a signal from at least one of the gyroscope unit 420 and the acceleration detection unit 430 in the glasses display device 100, which direction the user faces is recognized. Note that, for example, a screen of a face recognition application may be displayed as the view 702.

Further, in the case where the user faces obliquely upward at about 45 degrees with respect to the horizontal plane, the view 703 is displayed. Weather forecast may be displayed as the view 703. Moreover, other sky information may be displayed as the view 703, and, for example, a constellation image may also be displayed thereas depending on the time zone.

Similarly, in the case where the glasses display device 100 is attached to the user and where the user faces obliquely downward at about 30 degrees with respect to the horizontal plane, the view 704 (for example, an e-mail screen) is displayed. In the case where the user faces obliquely downward at about 45 degrees with respect to the horizontal plane, the view 705 (for example, a map) is displayed. In the case where the user faces rightward at about 30 degrees with respect to a vertical plane, the view 706 (for example, an Internet browser) is displayed. In the case where the user faces leftward at about 30 degrees with respect to the vertical plane, the view 707 (for example, a phone call screen) is displayed.

Moreover, although the switching among the view 701 to the view 707 is made on the basis of the signal from at least one of the gyroscope unit 420 and the acceleration detection unit 430 in the above description, not limited thereto, the switching thereamong may be made on the basis of the above-mentioned finger, palm, or arm recognition.

Further, when the user is walking, as a condition for making at least any of switches from the view 701 to the view 702, from the view 701 to the view 704, from the view 701 to the view 707, and from the view 701 to the view 706, the level of the signal from at least one of the gyroscope unit 420 and the acceleration detection unit 430 may be set to be higher. This can prevent switching from the view 701 to another view in a short time during the walk. Moreover, such setting that switching is not particularly made when the user suddenly turns around may be provided.

Meanwhile, the view 703 of sky information and the view 705 of map information may be panoramically displayed. In this case, the views 703 and 705 may be scrolled along with rightward and leftward movements.

(Specific Example of Event Generation)

Figure 24:
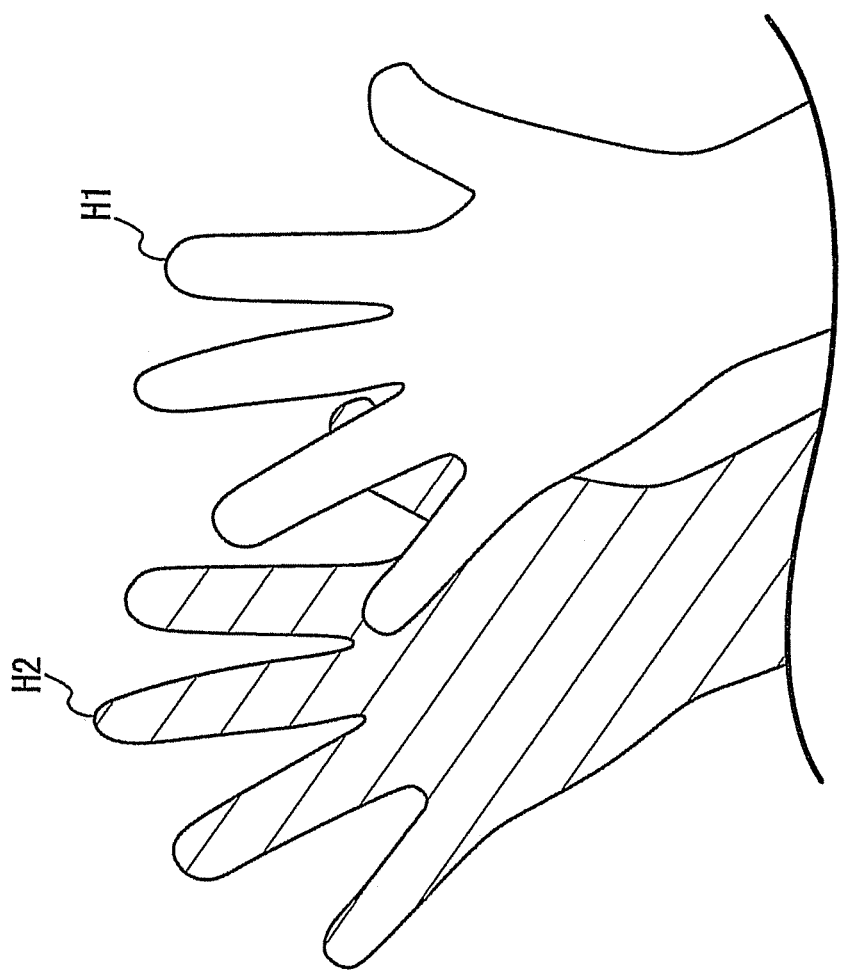
FIG. 24 is a schematic diagram illustrating an example of event generation.

Next, a predetermined event is generated in order to enable the user to easily recognize a difference between the case where the fingers, the palm, the hand, and the arm exist in the manipulation region 410c and the case where the fingers, the palm, the hand, and the arm exist in the gesture region 410g. Hereinafter, the predetermined event is described. FIG. 24 is a schematic diagram illustrating an example of the predetermined event generation, FIG. 25 is a schematic diagram illustrating another example of the event generation in FIG. 24, and FIG. 26 is a schematic diagram illustrating an example of another event generation.

First, as illustrated in FIG. 24, the shape of a hand H1 detected by the infrared ray detection unit 410 is displayed as a virtual image. Further, in the case where the user's hand is far from the manipulation region 410c, a shadow H2 having the shape of the hand H1 is displayed as an example of the event.

This enables the user to easily recognize that his/her hand exists in the gesture region 410g.

Figure 25:
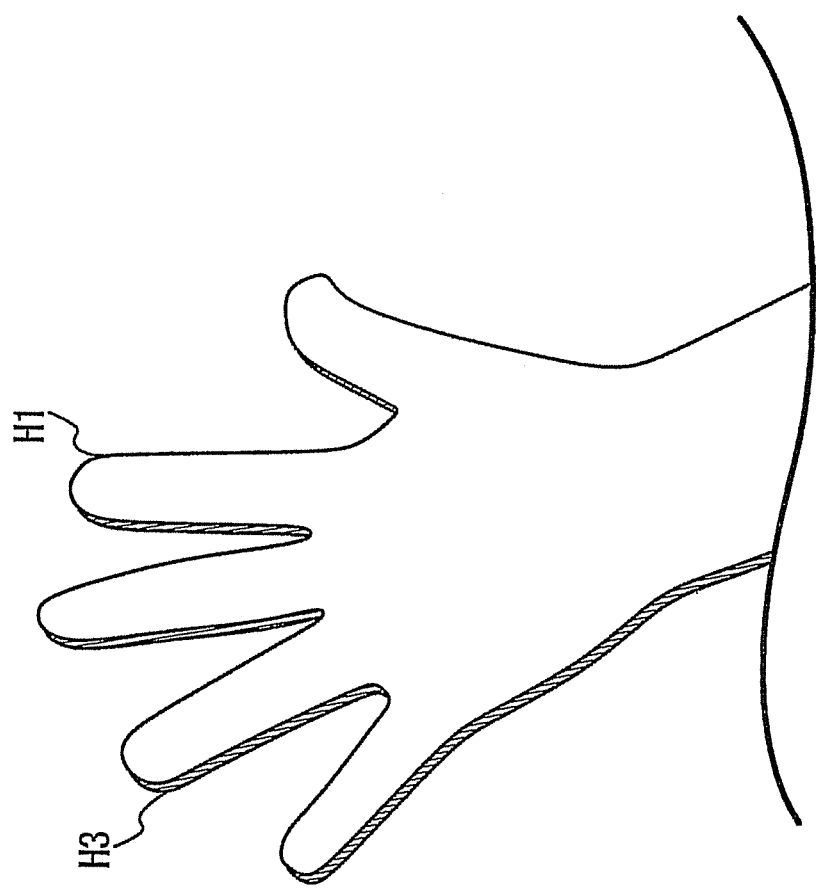
FIG. 25 is a schematic diagram illustrating another example of the event generation.
Figure 26:
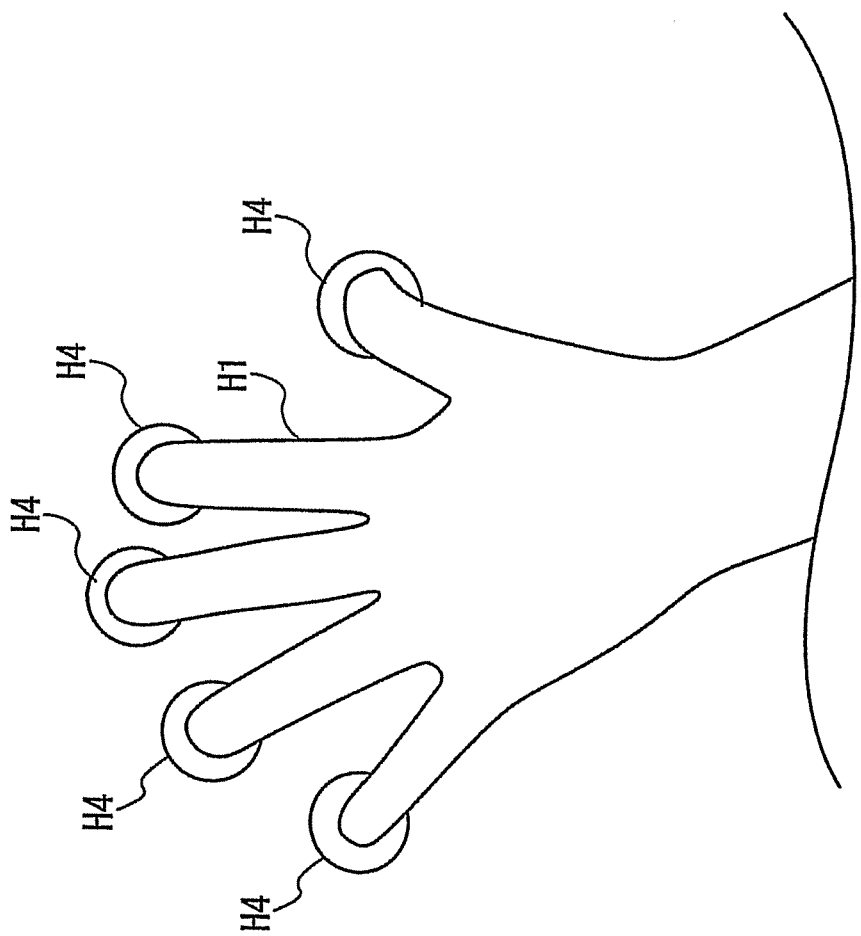
FIG. 26 is a schematic diagram illustrating another example of the event generation.

Subsequently, as illustrated in FIG. 25, the shape of the hand H1 detected by the infrared ray detection unit 410 is displayed as a virtual image, and a shadow H3 darker than the shadow H2 is displayed with a small area around the shape of, the hand H1. Accordingly, the user can easily recognize that his/her hand more approaches the manipulation region 410c than the case of FIG. 24. Further, in the case where his/her hand exists in the manipulation region 410c, the shadows H2 and H3 are not displayed.

As a result, the user does not need to look for the manipulation region 410c through trial and error or gropingly. That is, the user can easily recognize the distance to the manipulation region 410c on the basis of the darkness of the shadow and the positional difference between the shape of the hand and the shadow.

Moreover, as illustrated in FIG. 26, in the case where the user's hand exists in the manipulation region 410c, circle views H4 may be respectively displayed on the finger tips.

Note that, although the event generation mode of displaying the shadows H2 and H3 and the circle views H4 is described above in the embodiment, not limited thereto, in the case where the user's hand exists in the manipulation region 410c, the displayed image may be rippled, the glasses display device 100 may be provided with a vibration generation device to generate vibrations, a sound may be generated, and the displayed image may be changed by at least any of blinking the displayed image and changing the lighting luminance. For example, the distance to the manipulation region 410c may be represented by the blinking interval, and the distance to the manipulation region 410c may be represented by the lighting luminance. For example, the blinking interval becomes longer with the increasing distance from the manipulation region 410c, and the blinking interval becomes shorter with the decreasing distance therefrom. Alternatively, the lighting luminance becomes lower with the increasing distance from the manipulation region 410c, and the lighting luminance becomes higher with the decreasing distance therefrom. Alternatively, the displayed image is lighted with a darker color (such as red, black, and purple) with the increasing distance from the manipulation region 410c, and the displayed image is lighted with a paler color (such as blue, yellow, and pink) with the decreasing distance therefrom. In this way, an arbitrary event that appeals to human senses (typified by a sense of sight, a sense of hearing, and a sense of touch) may be generated.

(Manipulation on Glasses Display Device)

A usage mode of the glasses display device 100 along with the above-mentioned finger, palm, and arm recognition and the above-mentioned event generation is described.

First, if the user places his/her hand in the manipulation region 410c, his/her hand is recognized, and the user can manipulate a virtual image view. For example, the user can enlarge or reduce the virtual image view, scroll the view, or select a point.

Figure 27:
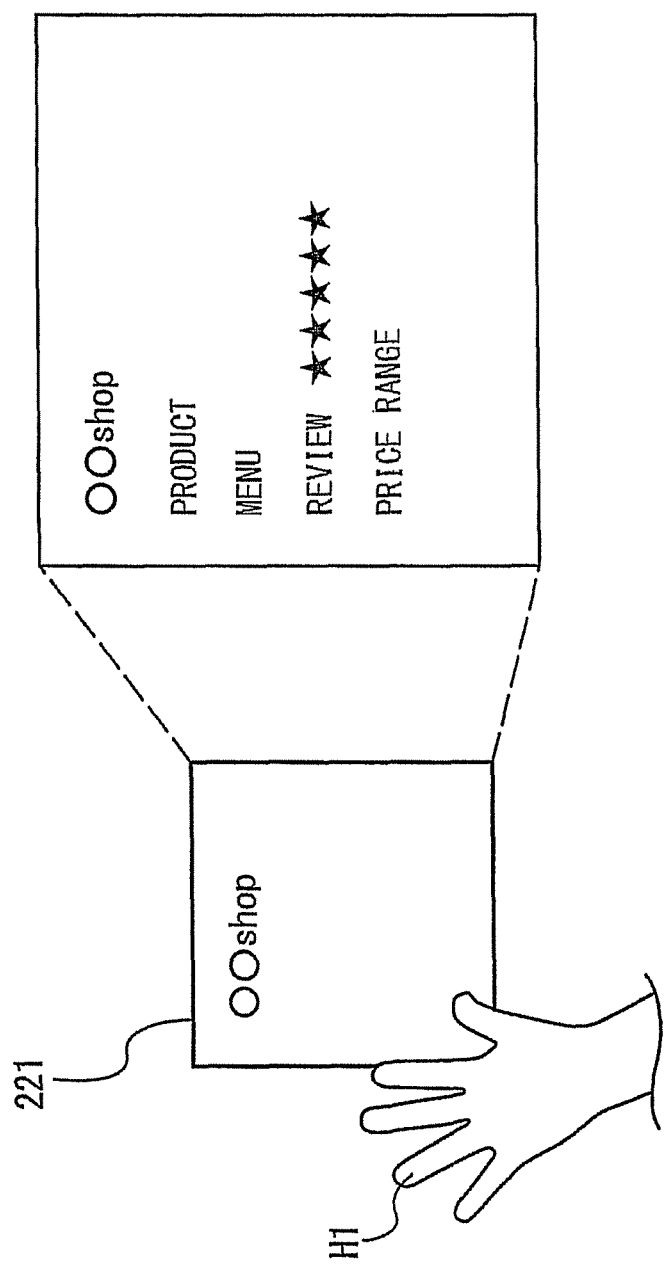
FIG. 27 is a schematic diagram illustrating an example of a manipulation on the glasses display device.

For example, as illustrated in FIG. 27, in the case where the user touches the view of the advertisement 221, an additional view may be displayed.

For example, information on products, services, and the like of a shop is displayed as the advertisement 221. In the case where the user touches the advertisement 221, further detailed information concerning the shop may be additionally displayed. For example, in the case where the shop is a restaurant, a main menu, user's reviews, a price range, and the like of the restaurant may be displayed.

Note that the advertisement 221 may be an image itself obtained by taking the shop by the camera unit 303, and may be recognition result information that is displayed on a shop recognition application screen as a result of automatically starting shop recognition on the basis of the image data of the shop taken by the camera unit 303.

(Display Based on Parody Mode)

Figure 28:
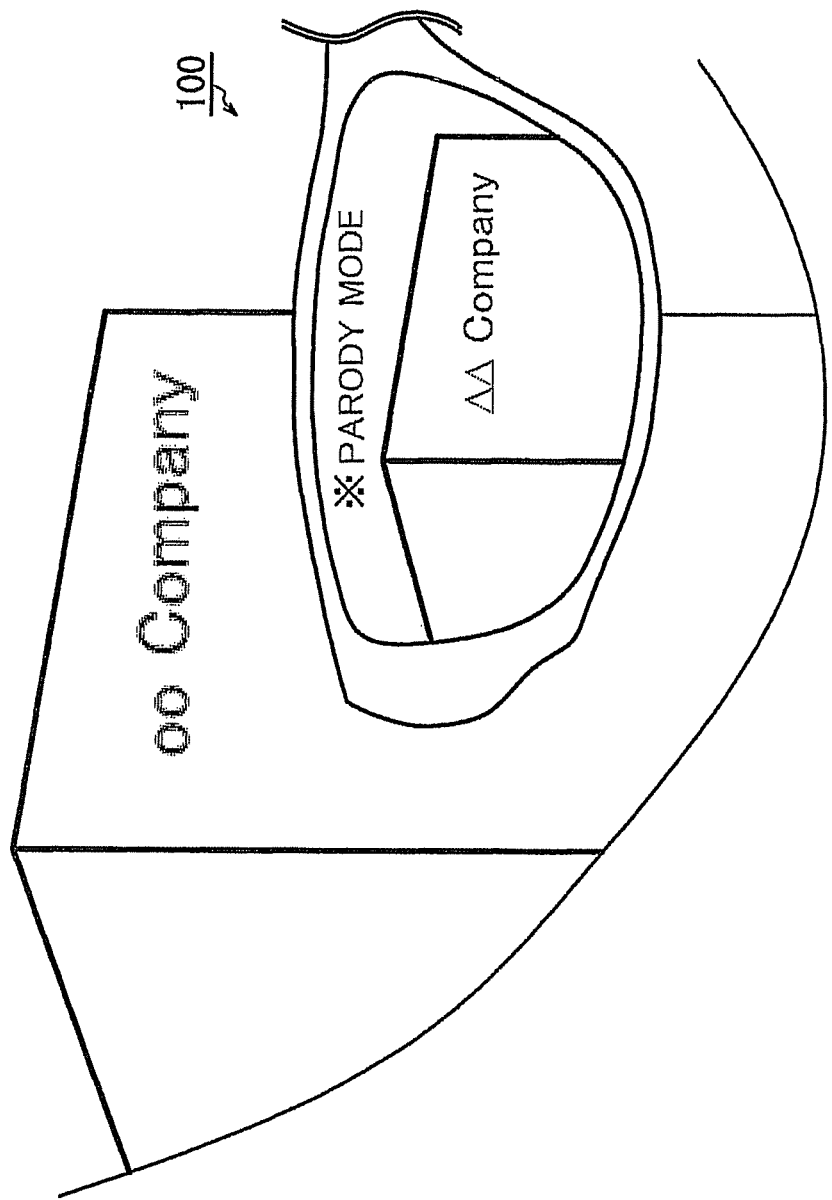
FIG. 28 is a schematic diagram illustrating another example of the manipulation on the glasses display device.

Moreover, as illustrated in FIG. 28, when a logo of one company (∘∘ Company) is displayed on the semi-transmissive display 220, if the user touches the logo on the screen, information concerning another competitive or non-competitive company (ΔΔ Company) can be displayed. In this case, for example, a logo of the another company may be displayed as a parody mode.

(Display Based on Gesture Command)

Moreover, if the user makes a predetermined hand pose within the gesture region 410g, a preset operation is carried out. FIG. 29 to FIG. 36 are schematic diagrams each illustrating an example of the gesture recognition.

Figure 29:
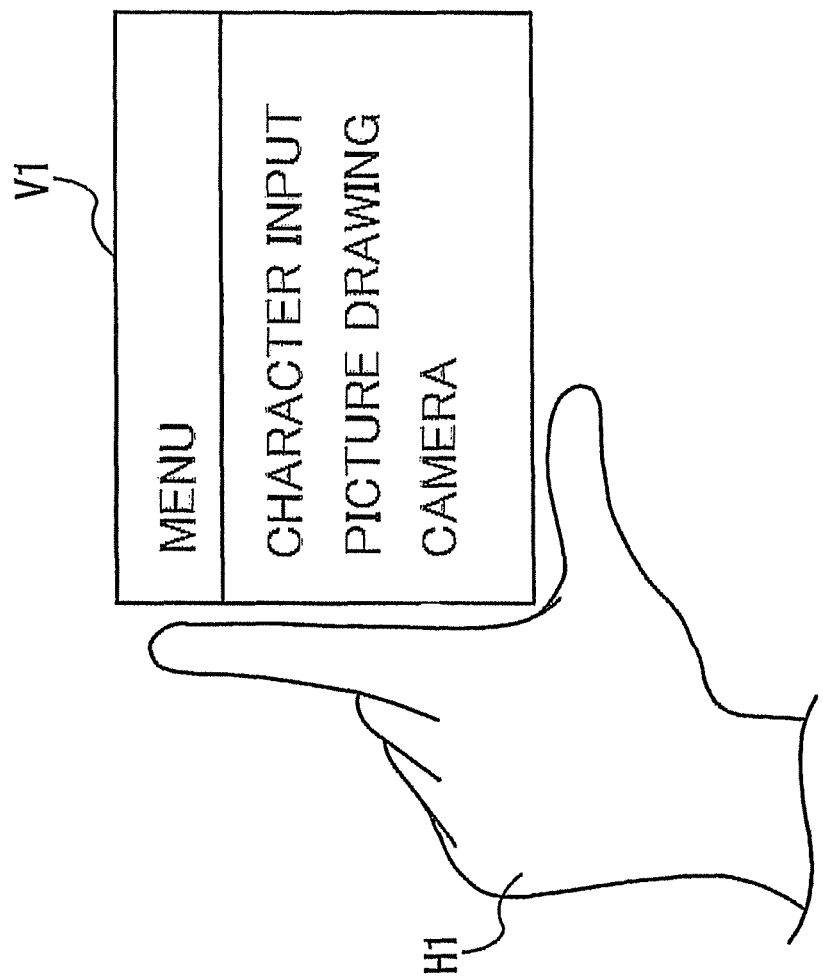
FIG. 29 is a schematic diagram illustrating an example of gesture recognition.

For example, as illustrated in FIG. 29, in the case where the user opens and stretches the thumb and the index finger of the closed hand H1 at 90 degrees to make an L-shaped sign, a menu screen V1 may be displayed between the thumb and the index finger.

Figure 30:
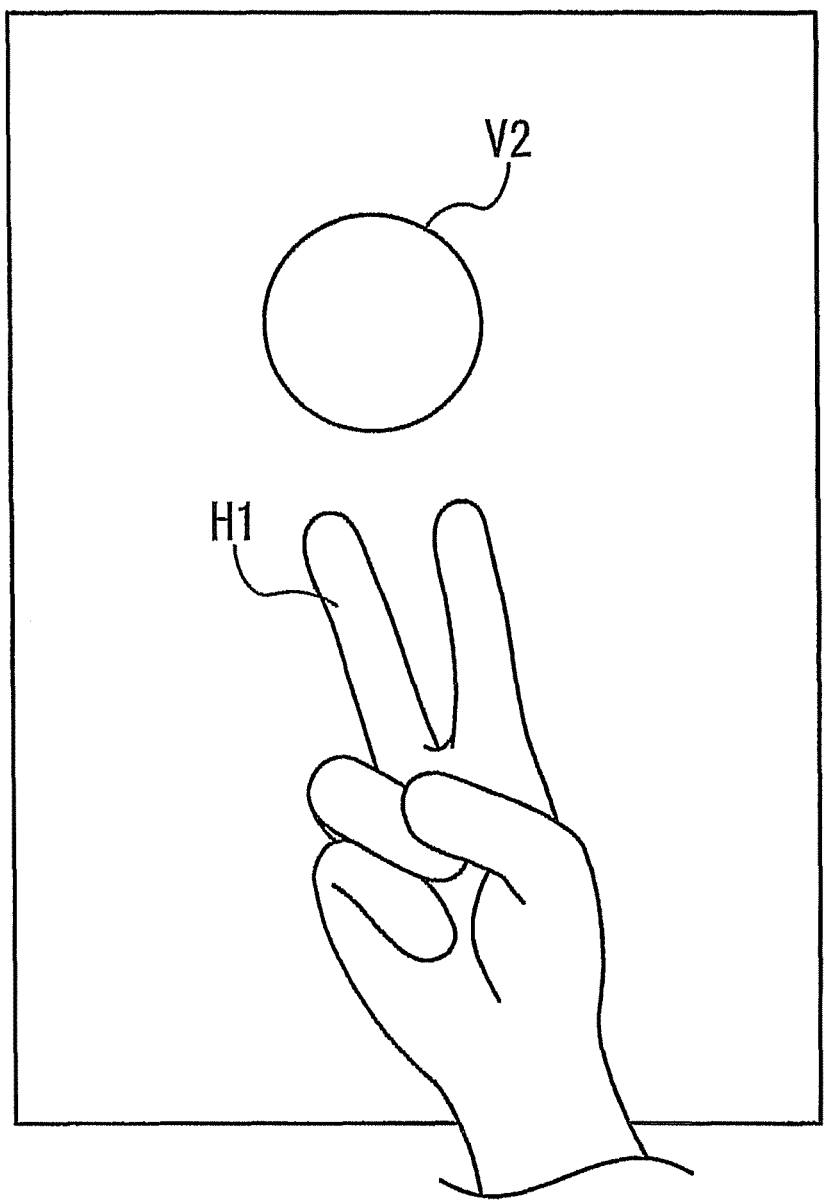
FIG. 30 is a schematic diagram illustrating another example of the gesture recognition.

Moreover, as illustrated in FIG. 30, in the case where the user opens and stretches the index finger and the middle finger of the closed hand H1 to make a so-called peace sign, a predetermined image V2 may be displayed between the index finger and the middle finger.

Figure 31:
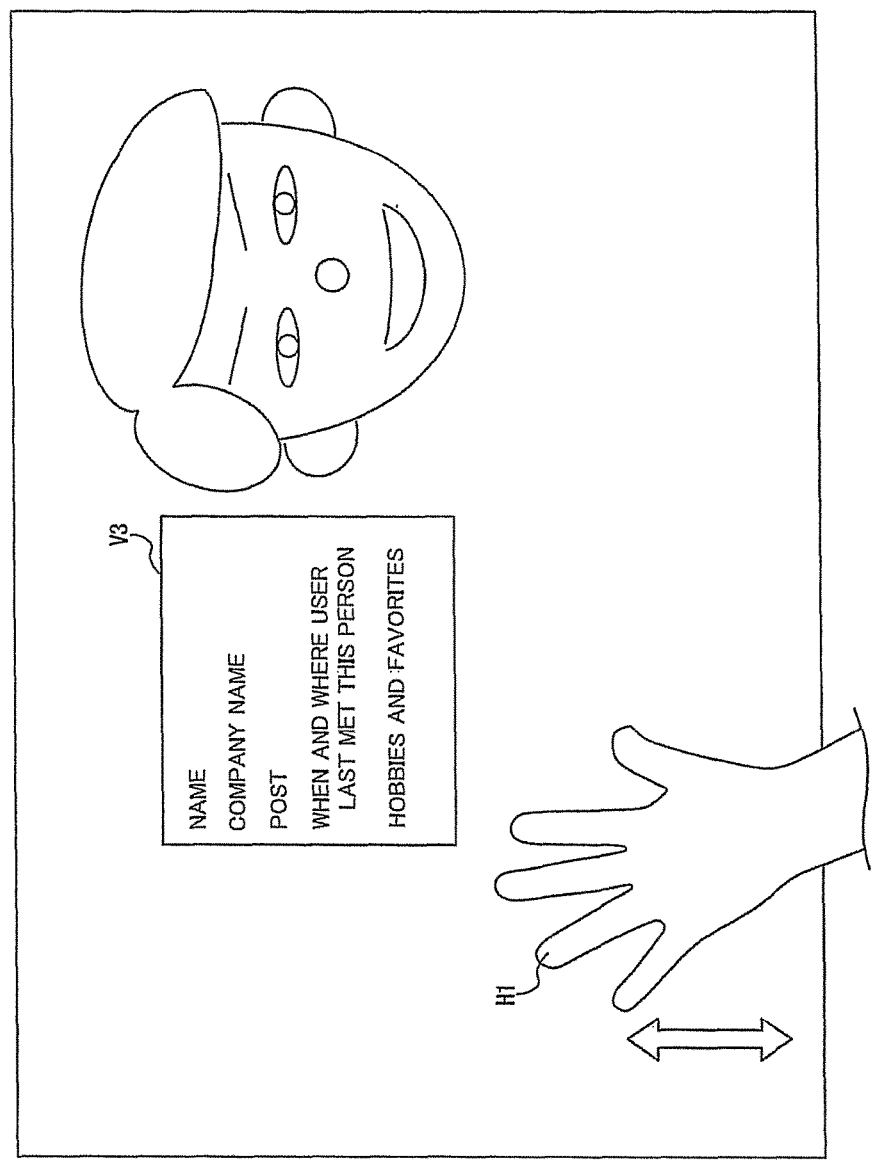
FIG. 31 is a schematic diagram illustrating another example of the gesture recognition.

Moreover, as illustrated in FIG. 31, in the case where the user makes a greeting action by moving the loosely opened hand H1 in an arrow direction, a face recognition application is automatically activated. On the basis of face data acquired by the camera unit 303, of a person whom the user gives the greeting, the face recognition is automatically started, and information on the name, the company name, the post, when and where the user last met this person, and the like is displayed on a face recognition application screen V3. Further, a flag is set each time the user meets the same person based on the recognition of the face recognition application, and the number of flags may be displayed on the face recognition application screen V3. In this case, the background, color, and the like of the face recognition application screen V3 may be changed depending on the number of flags.

Figure 32:
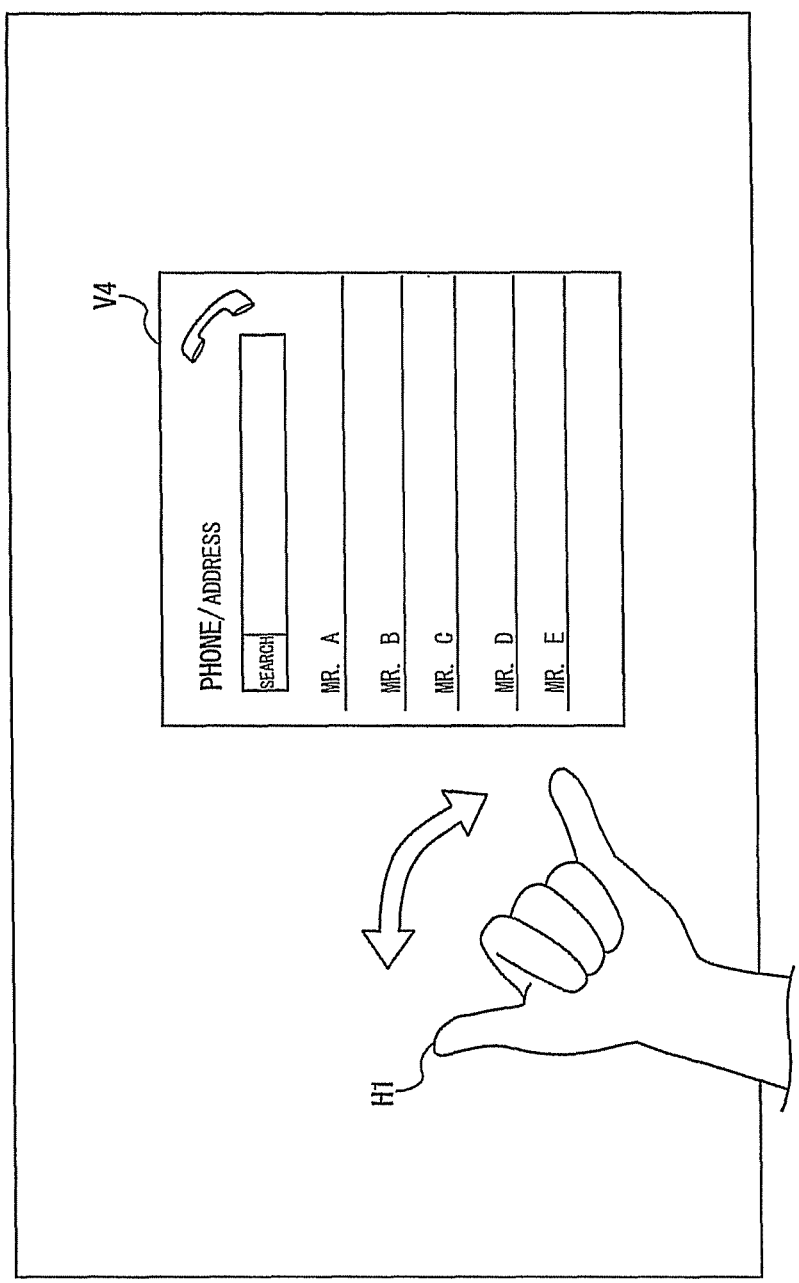
FIG. 32 is a schematic diagram illustrating another example of the gesture recognition.

Further, as illustrated in FIG. 32, in the case where the user opens the thumb and the little finger of the closed hand H1 to make a so-called aloha sign and waves the sign in the arrow directions, a phone application is automatically activated, and address book data V4 is displayed. The user can make a phone call to a predetermined person by manipulating the phone application.

Figure 33:
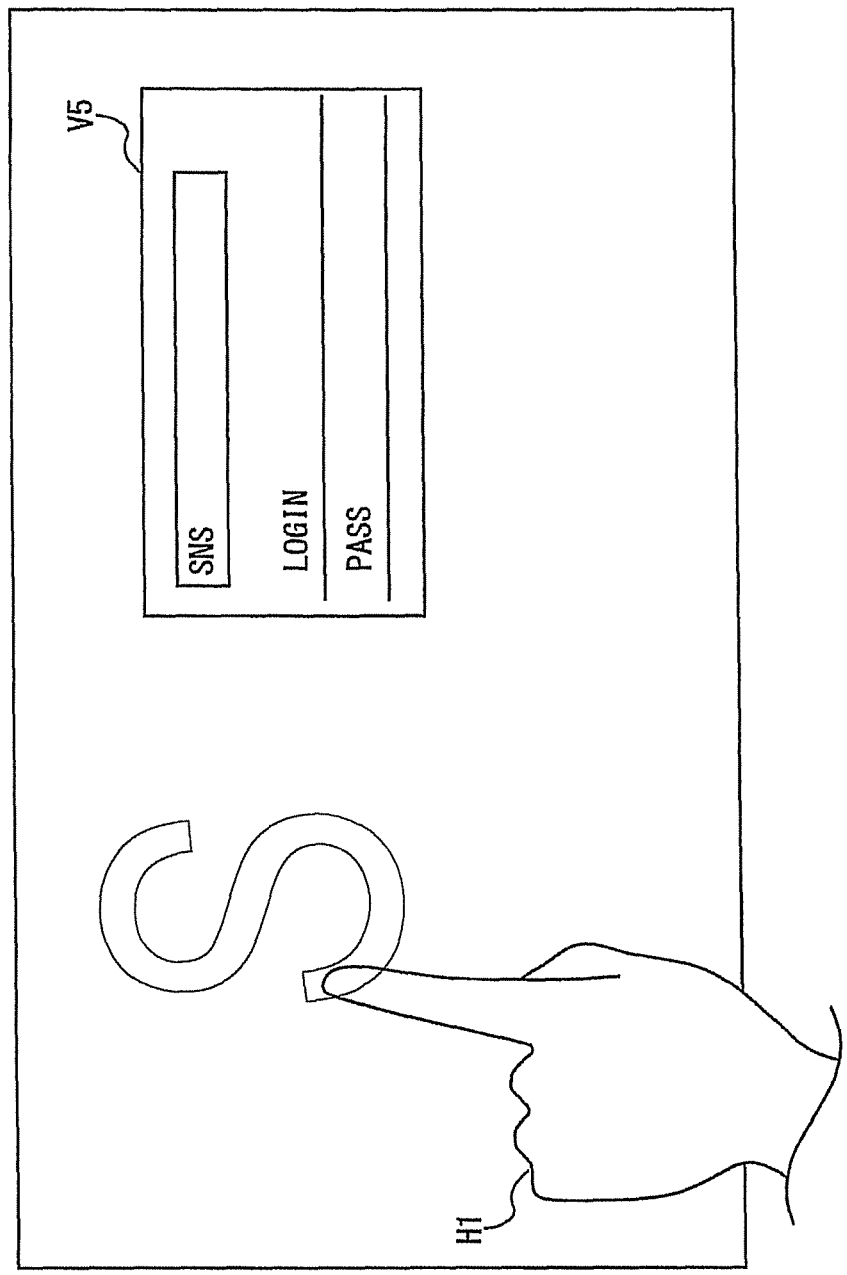
FIG. 33 is a schematic diagram illustrating another example of the gesture recognition.

Moreover, as illustrated in FIG. 33, in the case where the user draws an alphabetical letter S with a finger of the hand H1, a social networking service (SNS) application is automatically activated, and a SNS application screen V5 can be displayed.

Figure 34:
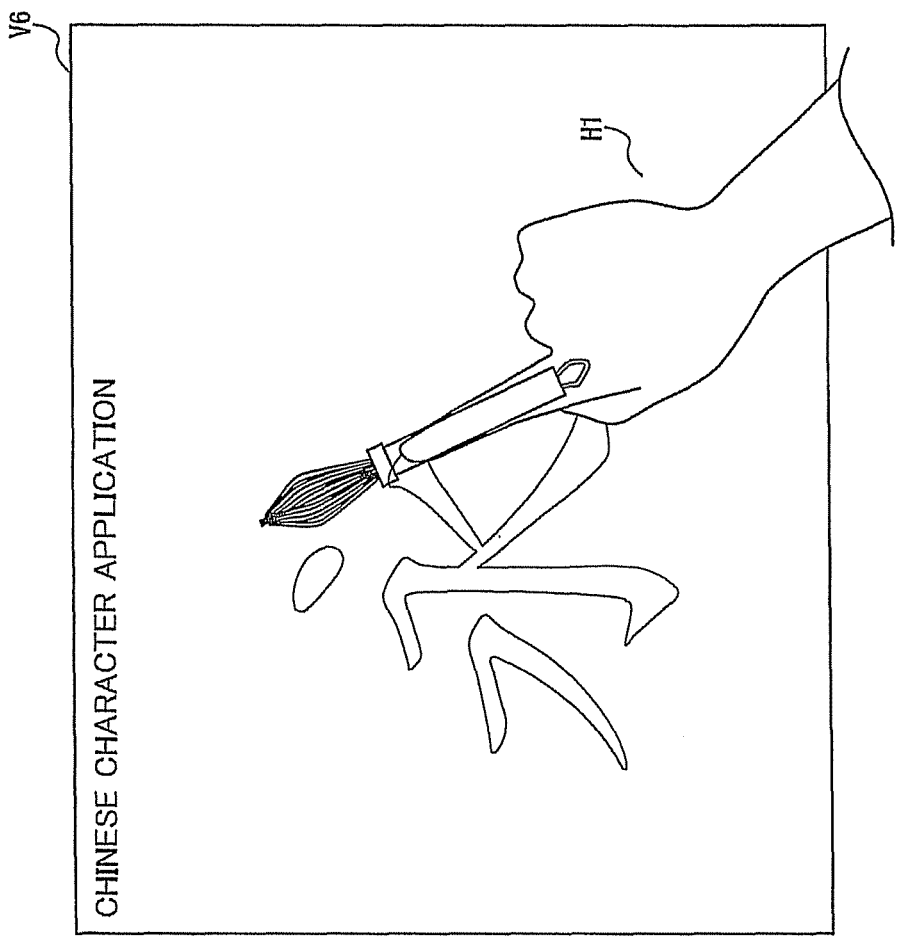
FIG. 34 is a schematic diagram illustrating another example of the gesture recognition.

Further, as illustrated in FIG. 34, in the case where the user activates a Chinese character application and causes the application to recognize the index finger of the hand H1, an image of an ink brush is further additionally displayed at the position of the index finger, and the user can practice writing Chinese characters on a Chinese character practice application screen V6.

Figure 35:
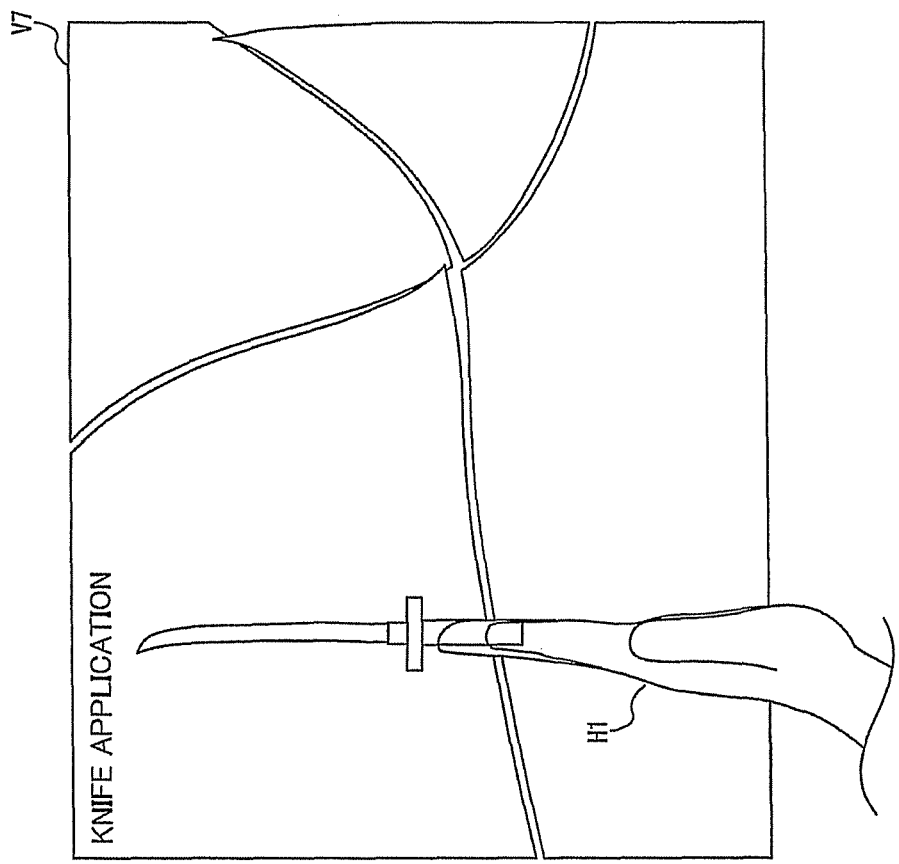
FIG. 35 is a schematic diagram illustrating another example of the gesture recognition.

Moreover, as illustrated in FIG. 35, in the case where the user makes the hand H1 into a hand-knife shape, a knife application is activated, an image of a knife is further additionally displayed at the position of the knife-shaped hand, and the user can cut a virtual image display screen V7.

Figure 36:
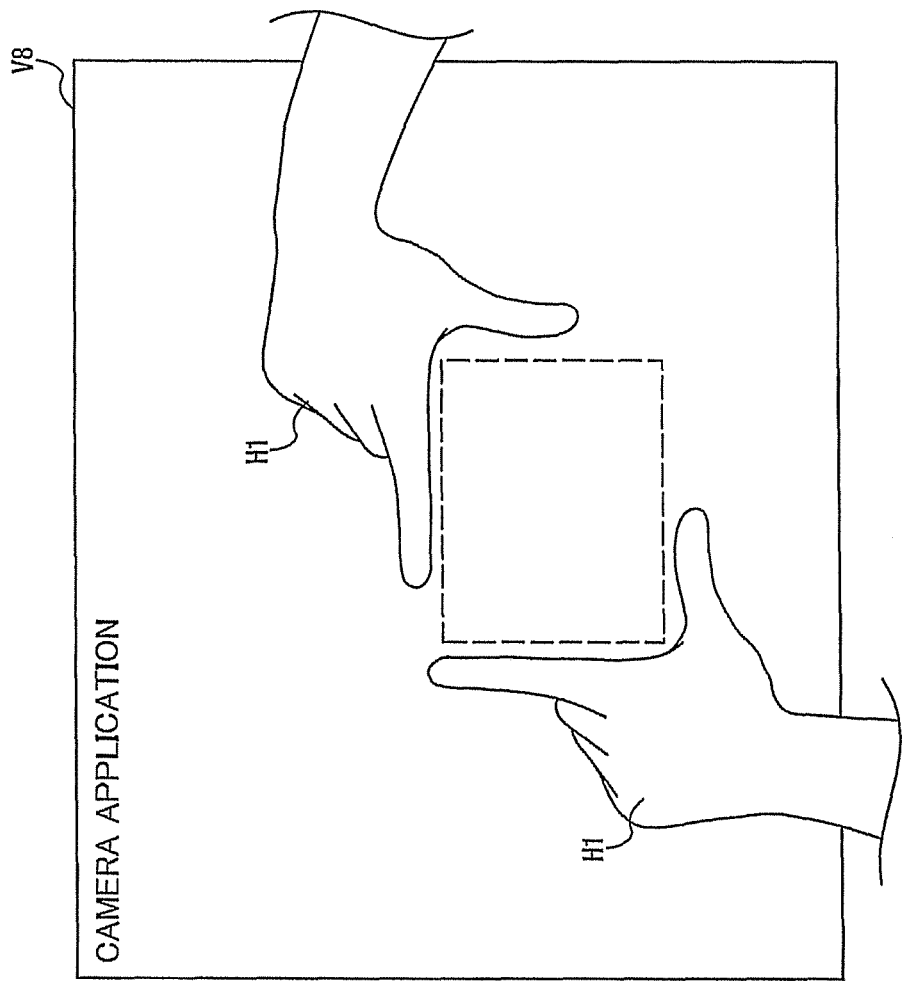
FIG. 36 is a schematic diagram illustrating another example of the gesture recognition.

Moreover, as illustrated in FIG. 36, in the case where the user forms a quadrangle with fingers of both the hands H1, a camera application is automatically activated, and an image of scenery or the like within an image taking frame extracted from the formed quadrangle may be taken on a camera application screen V8.

(Tracking Display System)

Figure 37:
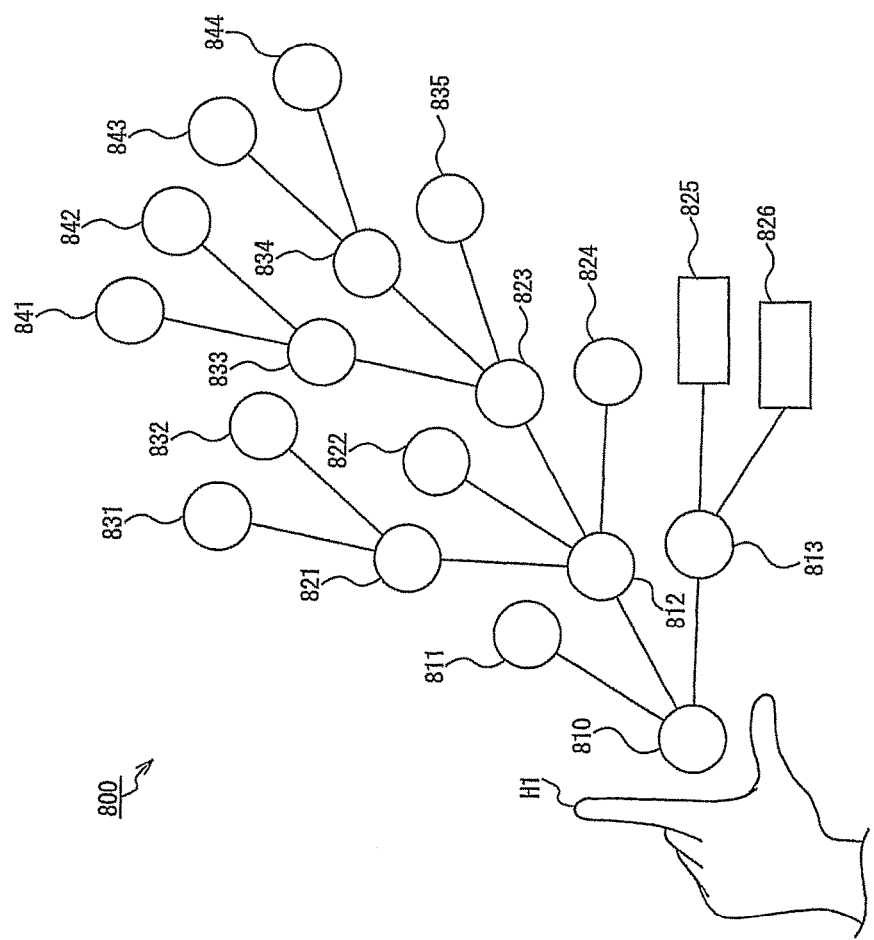
FIG. 37 is a schematic diagram illustrating an icon tree view in an example of a tracking system.

Next, a tracking display system 800 is described. FIG. 37 is a schematic diagram illustrating an icon tree view in an example of the tracking display system 800.

Figure 38:
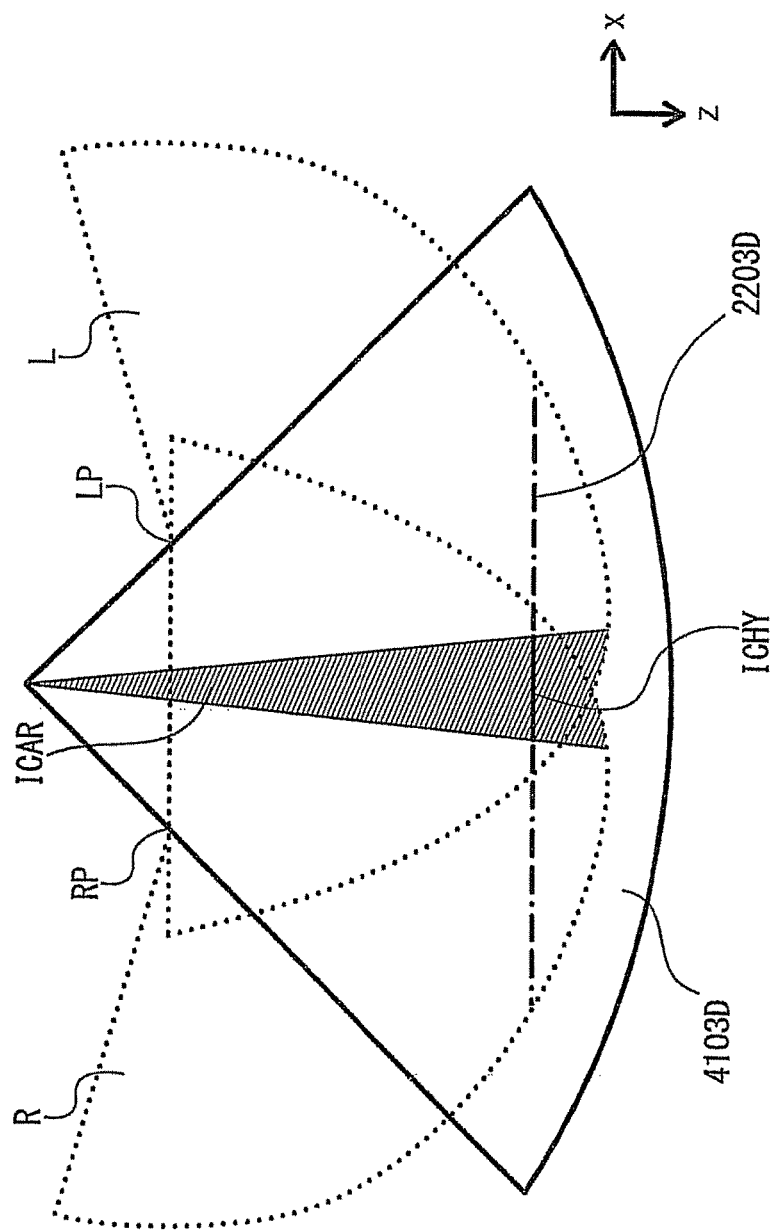
FIG. 38 is a schematic diagram illustrating an example of a virtual space for describing a positional relation between an icon view and an existence region of a hand capable of manipulating the icon.
Figure 39:
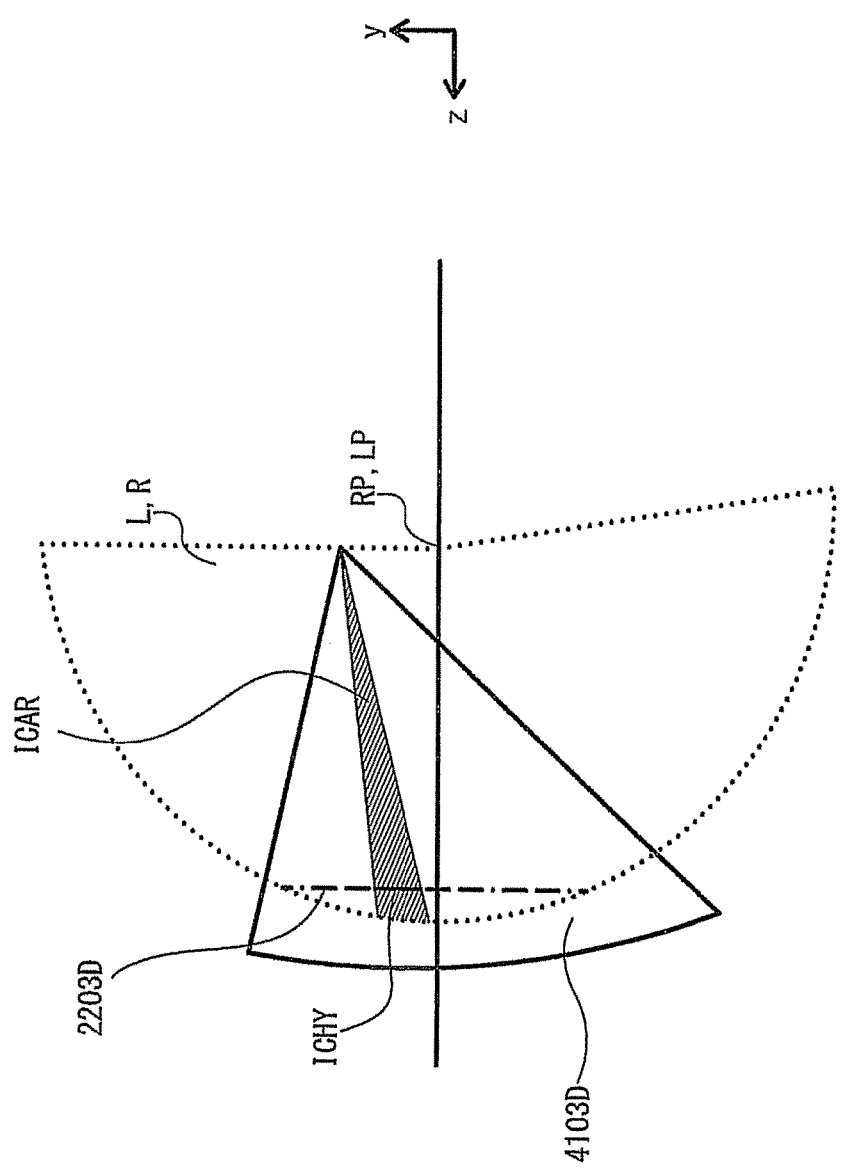
FIG. 39 is a schematic diagram illustrating the example of the virtual space for describing the positional relation between the icon view and the existence region of the hand capable of manipulating the icon.
Figure 40:
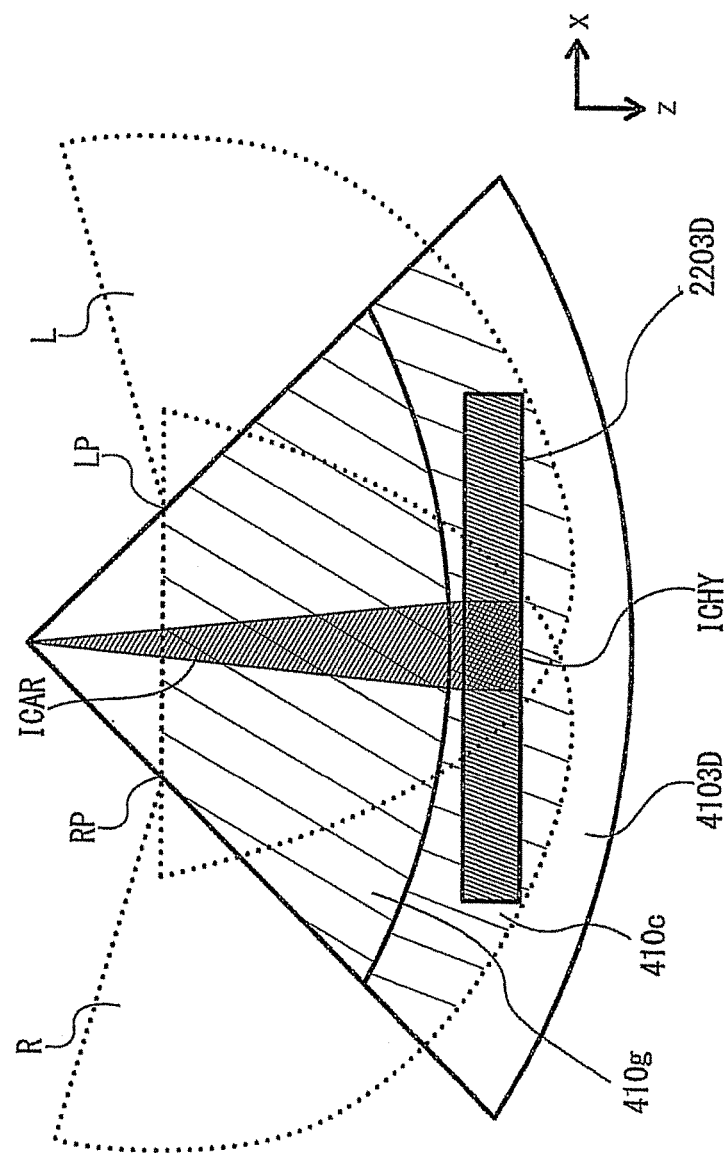
FIG. 40 is a schematic diagram illustrating another example of the virtual space for describing the positional relation between the icon view and the existence region of the hand capable of manipulating the icon.
Figure 41:
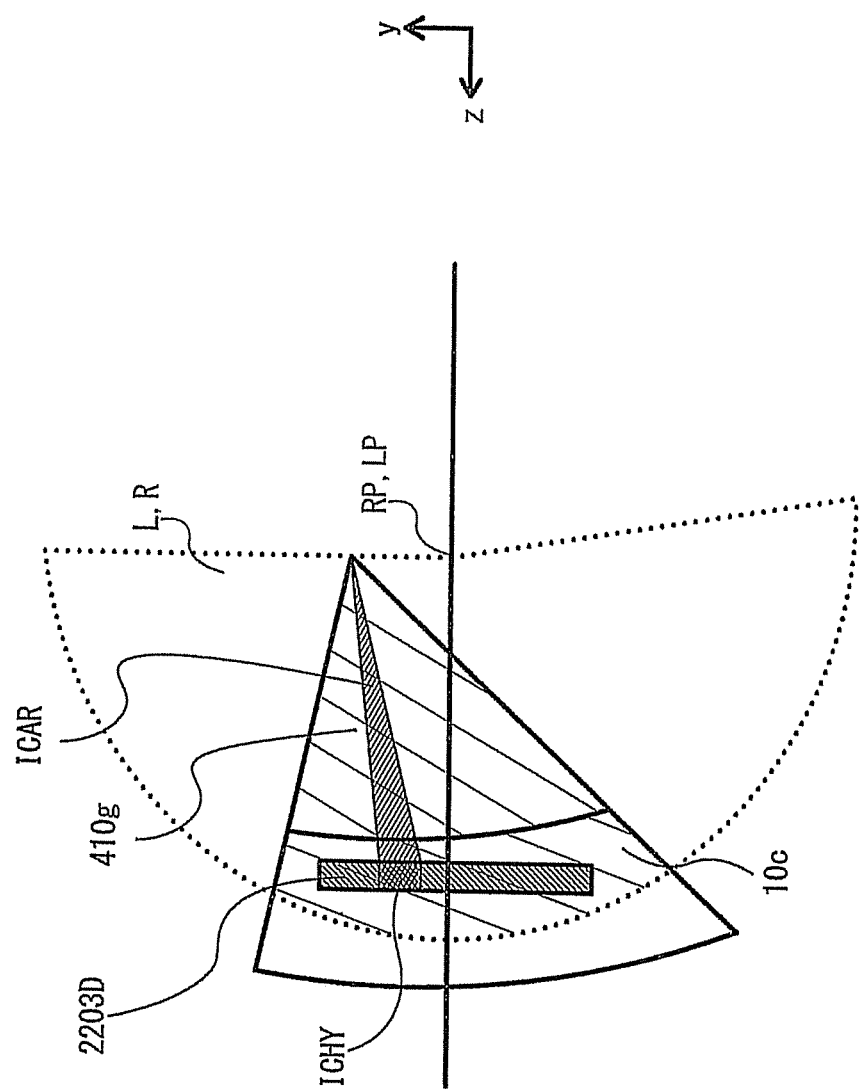
FIG. 41 is a schematic diagram illustrating the other example of the virtual space for describing the positional relation between the icon view and the existence region of the hand capable of manipulating the icon.

FIG. 38 and FIG. 39 are schematic diagrams for describing an example of a relation between an existence region of a hand capable of a selection manipulation in a real space and a position of an icon in a virtual space, in the case of manipulating the icon, and FIG. 40 and FIG. 41 are schematic diagrams for describing another example of the relation.

(Tree-Like Menu View)

As illustrated in FIG. 37, the tracking display system 800 includes: a menu 810; a plurality of selection elements 811, 812, 813, 821, 822, 823, 824, 831, 832, 833, 834, 835, 841, 842, 843, and 844; links that connect the menu 810 and the selection elements 811, 812, 813, 821, 822, 823, 824, 831, 832, 833, 834, 835, 841, 842, 843, and 844; a storage selection element 825; and an end selection element 826. Note that FIG. 37 is a diagram schematically illustrating a state displayed in the case of selecting all the selection elements 812, 813, 821, 823, 833, and 834. As illustrated in FIG. 37, the menu 810 and the selection elements 811, 812, 813, 821, 822, 823, 824, 831, 832, 833, 834, 835, 841, 842, 843, and 844 are circular icons, and the storage selection element 825 and the end selection element 826 are rectangular icons.

The menu 810 is displayed in response to detection of a gesture of the hand H1 as a trigger.

The plurality of selection elements 811, 812, 813, 821, 822, 823, 824, 831, 832, 833, 834, 835, 841, 842, 843, and 844, the links that connect the menu 810 and the selection elements 811, 812, 813, 821, 822, 823, 824, 831, 832, 833, 834, 835, 841, 842, 843, and 844, the storage selection element 825, and the end selection element 826 are directly or indirectly displayed by manipulating the menu 810.

Specifically, in the case of selecting the menu 810, the selection elements 811, 812, and 813 are displayed so as to be linked to the menu 810. Subsequently, in the case of selecting the selection element 812, the views of the selection elements 811 and 813 are deleted, and the selection elements 821, 822, 823, and 824 are newly displayed so as to be linked to the selection element 812.

For example, as illustrated in FIG. 38 and FIG. 39, these icons are virtually displayed as images without a depth on a virtual screen without a depth defined in the virtual image display region 2203D. In FIG. 38 and FIG. 39, only one icon ICHY as a manipulation target is schematically displayed.
(Icon Manipulation—in the Case of Determining on the Basis of Image Overlapping between the Finger and the Icon)

Figure 42:
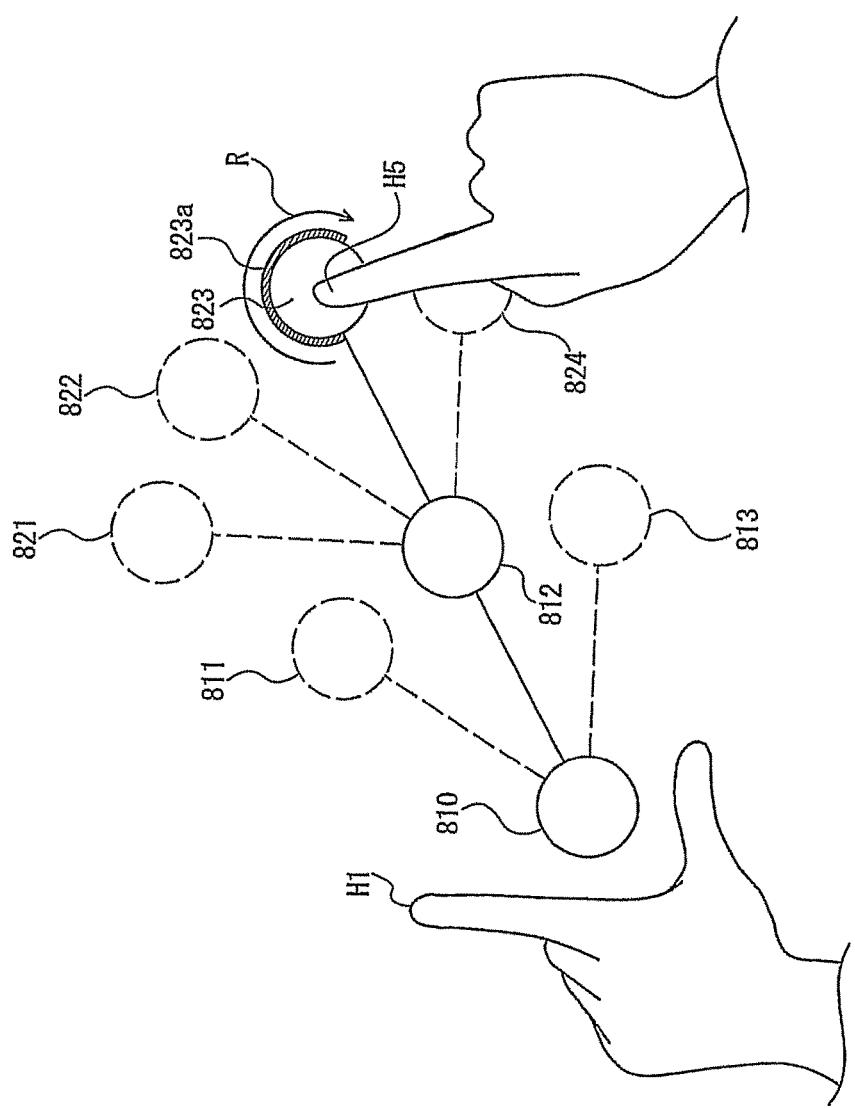
FIG. 42 is a schematic diagram illustrating a mode of manipulating the icon view.

For an icon manipulation, as illustrated in FIG. 42 to be described later, a finger H5 for the manipulation is moved to a position at which the finger H5 is visually recognized to overlap with the icon illustrated as the selection element 823.

In this case, an image of the finger H5 (for example, the outer shape of the finger H5 and the inside thereof) existing in the real space is acquired by the infrared ray detection camera 412 and the image processing unit 453 (see FIG. 3). Whether or not the acquired image of the finger H5 overlaps with the icon of the selection element. 823 two-dimensionally, that is, along the x-y plane is determined by the graphics processor unit 463 (see FIG. 3). If it is determined that the finger H5 overlaps with the icon as illustrated in FIG. 42, the icon selection by the finger H5 becomes possible.

Note that the image of the finger H5 may be displayed on the semi-transmissive displays 220 so as to be visually recognizable by a manipulator, and may not be displayed thereon so as not to be visually recognized by the manipulator.

If it is determined that the image of the finger H5 overlaps with the icon of the selection element 823, as a result, the finger H5 exists in a region illustrated as an icon manipulation region ICAR in FIG. 38 and FIG. 39. The icon manipulation region ICAR is formed by: a stereoscopic region defined by central projection from the infrared ray detection unit 410 to the icon ICHY; and a region surrounded by the extended surface of the surface constituting the stereoscopic region, the farthest surfaces of the surfaces respectively constituting the movement region L of the left hand and the movement region R of the right hand, and the surface of the virtual image display region 2203D.

Because the present embodiment is a system used for a head-mounted display, the projection line from the infrared ray detection unit 410 to the icon ICHY displayed in the virtual image display region 2203D can be substantially equated with the line of sight from the manipulator. If handling along the surface of the virtual image display region 2203D without a thickness is essential to select the icon ICHY, the position of the finger H5 needs to be accurately made coincident with the surface of the virtual image display region 2203D, and such a manipulation is extremely difficult. To solve this, if the finger H5 is at an arbitrary position at which the image of the finger H5 and the icon ICHY can be visually recognized to overlap with each other from the point of view of the manipulator, such determination that the icon ICHY is selected is made possible, whereby the manipulation can be facilitated. Accordingly, even if the finger H5 is not at the position of the surface of the virtual image display region 2203D, if the finger H5 exists in the icon manipulation region ICAR, the icon ICHY can be selected.

Note that, although the image data of the finger H5 is acquired using the infrared ray detection camera 412 in the above-mentioned example, the present invention is not limited to this mode. That is, the image data of the finger H5 to be acquired is not limited to data with depth level information such as image data acquired using the infrared ray detection camera 412, and may be data without depth level information. For example, the image data of the finger H5 may be acquired using a camera including an image sensor selected from the group consisting of a CCD image sensor and a CMOS image sensor.

Moreover, although the circular or rectangular icon is adopted as the manipulation target object in the above-mentioned example, the present invention is not limited to this mode. Other arbitrary shapes can be allowed as the shape of the icon. Moreover, for example, various objects (such as an arbitrary object that enables an interactive manipulation with the manipulator, for example, a menu item, a text link, and a determination button) can be adopted as the manipulation target object.

Further, although the icons are virtually displayed as images without a depth on a virtual screen without a depth in the above-mentioned example, the present invention is not limited to this mode. For example, as described later, the icons may be displayed as stereoscopic images with a depth in a virtual region with a depth.

Further, although the state where the image of the finger H5 and the icon view two-dimensionally overlap with each other is defined as a determination standard for the icon selection in the above-mentioned example, the present invention is not limited to this mode. For example, as described later, the state where the position of the finger H5 in the real space and the position of the icon in the virtual space satisfy a predetermined relation may be defined as a determination standard for the icon selection.
(Icon Manipulation—in the Case of Determining on the Basis of an in-Space Positional Relation between the Finger and the Icon)

As illustrated in FIG. 40 and FIG. 41, the icons may be virtually displayed as stereoscopic images with a depth in a virtual region with a depth. That is, the virtual image display region 2203D with a depth is defined in the three-dimensional space detection region 4103D as described with reference to FIG. 12 and FIG. 13, and a columnar or rectangular parallelepiped icon whose axis center extends in the Z direction may be displayed in the virtual image display region 2203D. Further, the state where the position of the finger H5 in the real space and the position of the icon in the virtual space satisfy a predetermined relation may be defined as a determination standard for the icon selection.

In this mode, in order to perform a manipulation other than the icon selection manipulation, as described with reference to FIG. 12 and FIG. 13, the state where the target (in the present embodiment, the finger H5) exists in the manipulation region 410c can be defined as a condition.

Meanwhile, in the case of performing the icon selection manipulation, as illustrated in FIG. 40 and FIG. 41, the state where the finger H5 exists in the stereoscopic region (that is, the icon manipulation region ICAR) defined by the central projection from the infrared ray detection unit 410 to the icon ICHY of the menu or the selection element displayed in the virtual image display region 2203D can be defined as a condition, and the icon ICHY of the menu or the selection element can be selected under this condition.

Because the present embodiment is a system used for a head-mounted display, the projection line from the infrared ray detection unit 410 to the icon ICHY displayed in the virtual image display region 2203D can be substantially equated with the line of sight from the manipulator. If handling inside of the virtual image display region 2203D is essential to select the icon ICHY, the position of the finger H5 needs to be accurately made coincident with the inside of the virtual image display region 2203D, and this takes practice. To solve this, even if the position of the finger H5 is outside of the virtual image display region 2203D, if the finger H5 exists in the icon manipulation region ICAR, such determination that the icon ICHY is selected is made possible, whereby the manipulation can be facilitated. Accordingly, if the finger H5 is moved to an arbitrary position at which the icon ICHY and the finger H5 can be visually recognized to overlap with each other from the point of view of the manipulator, the icon can be selected.

Although the columnar or rectangular parallelepiped icon is adopted as the manipulation target object in the above-mentioned example, not limited to this mode, a spherical shape, a conical shape, a pyramidal shape, and other arbitrary stereoscopic shapes can be allowed as the stereoscopic shape of the icon.

(Display of Timer View and Tracking)

Hereinafter, with regard to an example of a view of the tracking display system 800, a more specific mode of the icon manipulation is described with reference to FIG. 42 to FIG. 44.

For example, as illustrated in FIG. 42, in the case of selecting the selection element 823, a belt of a timer view 823a is drawn as a circular arc in a clockwise (that is, an arrow R) direction around the circular icon of the selection element 823 such that the belt area gradually increases with the passage of time.

The time for which the timer view 823a makes a circuit of the icon of the selection element 823 can be set as appropriate by those skilled in the art. For example, the time therefor is preferably 0.1 sec or more and 5.0 sec or less, is more preferably 0.2 sec or more and 1.0 sec or less, and is further preferably 0.5 sec.

Further, in the case where the selection element 823 is selected continuously for a predetermined time (in the above-mentioned examples, in the case where it is determined that the image of the finger H5 continuously overlaps with the icon or where it is determined that the finger H5 continuously exists in the icon manipulation region ICAR), the selection manipulation is determined. As a result, as illustrated in FIG. 43, the circular arc-like timer view 823a becomes a circular selection determination view 823b that completely surrounds the icon of the selection element 823. In response to the selection determination of the selection element 823, the views of the selection elements 821, 822, and 824 are deleted, and the selection elements 833, 834, and 835 are newly expanded and displayed so as to be linked to the selection element 823.

In the case where the timer view 823a completely surrounds the selection element 823 to become the selection determination view 823b, the selection of the selection element 823 by the finger H5 is determined.

Figure 43:
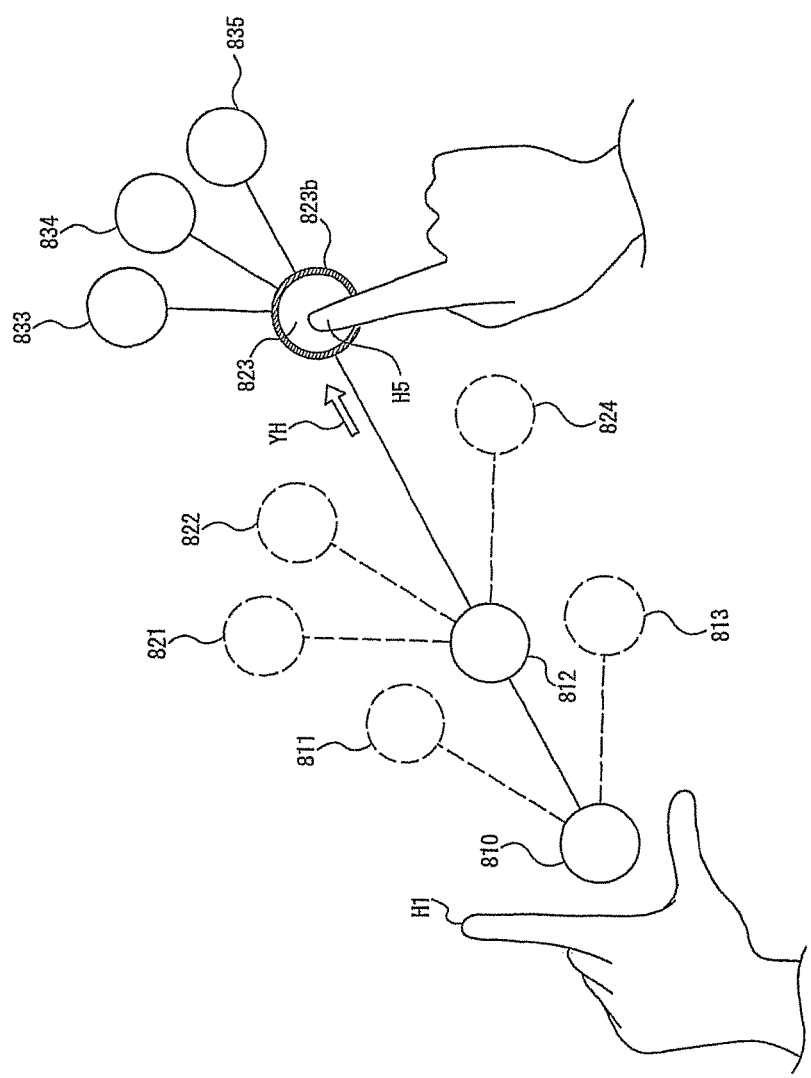
FIG. 43 is a schematic diagram illustrating a mode of tracking the icon view.

As illustrated in FIG. 43, in the case where the finger H5 moves in an arrow YH direction from the state where the selection of the selection element 823 by the finger H5 is determined, the icon of the selection element 823 also moves in the arrow YH direction while keeping a predetermined positional relation with the finger H5. Consequently, the icon of the selection element 823 is displayed so as to track the movement of the finger H5.

Figure 44:
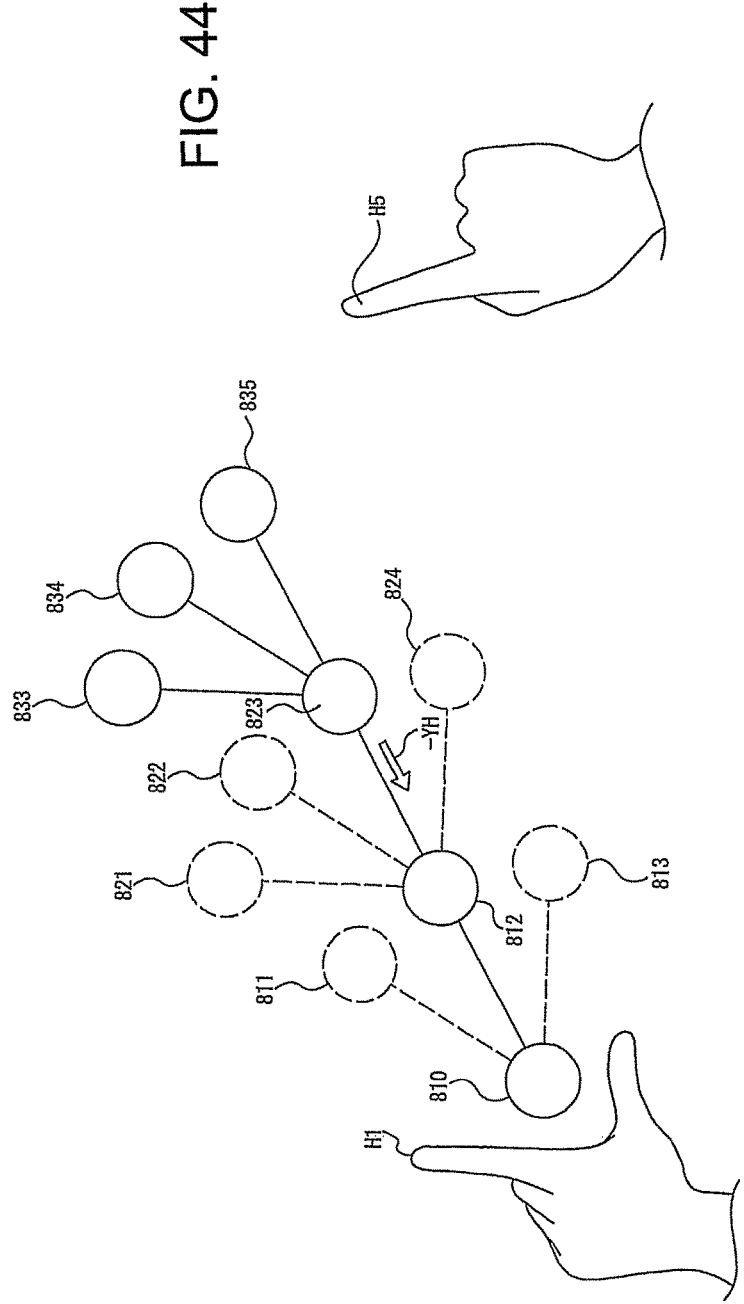
FIG. 44 is a schematic diagram illustrating a mode of tracking the icon view.

After that, in the case where the finger H5 further moves beyond a predetermined distance, as illustrated in FIG. 44, the icon of the selection element 823 is separated from the finger H5, moves in an arrow −YH direction, and returns to its original position (that is, the position at the moment at which the icon of the selection element 823 is completely surrounded by the selection determination view 823b).

In this case, the icon of the selection element 823 behaves as if the icon were fixed at the original position by a spring having maximum deflection that is a length corresponding to the predetermined distance. Such a behavior can be generated by defining a virtual spring using a physical factor including a spring constant. Note that the amount of maximum deflection of the virtual spring can be defined in accordance with the amount of displacement assumed for the finger H5. For example, when the manipulator is moving (for example, walking) (that is, in a movement mode), the amount of maximum deflection can be defined assuming that the amount of maximum deflection becomes larger than when the manipulator is not moving (that is, in a normal mode).

Note that, in the above-mentioned example, description is given of the mode in which tracking is started in response to that the selection of the icon of the selection element 823 is determined, that is, the icon of the selection element 823 is completely surrounded by the selection determination view 823b, as a trigger. This mode is preferable from the perspective of preventing an erroneous manipulation on the icon. However, the timing for starting to display the tracking is not limited to this mode. For example, the tracking may be started from the moment at which the icon of the selection element 823 is selected, that is, from the moment at which the timer view 823a is displayed around the icon of the selection element 823. This mode is preferable from the perspective of manipulability.

Further, although the mode in which the timer function is fulfilled by the circular arc-like timer view 823a that surrounds the icon is adopted in the above-mentioned example, not limited to this mode, for example, the timer function may be fulfilled by such a color change view that changes the color of the icon. In this mode, the color of the icon gradually changes from a part thereof to the entirety thereof during a predetermined time until the selection is determined. In the case where the entirety of the icon changes to a different color, the selection is determined. Alternatively, the timer function may be fulfilled by changing the shape of the icon.

(Another Example)

Figure 45:
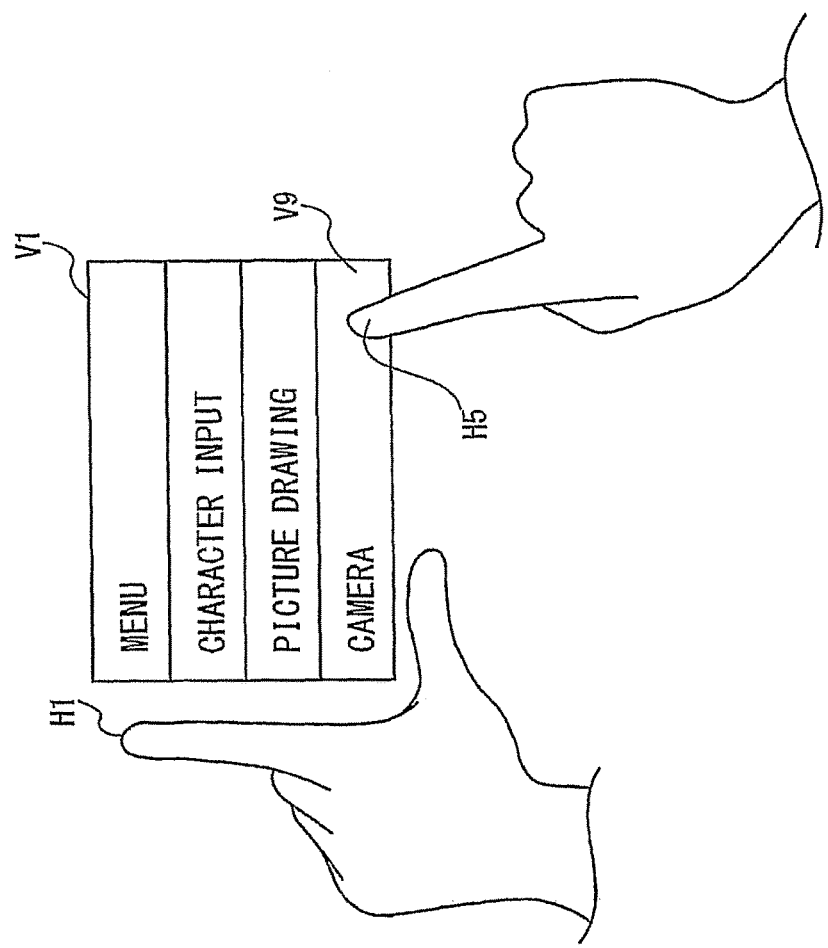
FIG. 45 is a schematic diagram illustrating a mode of manipulating the icon view in another example of the tracking system.
Figure 46:
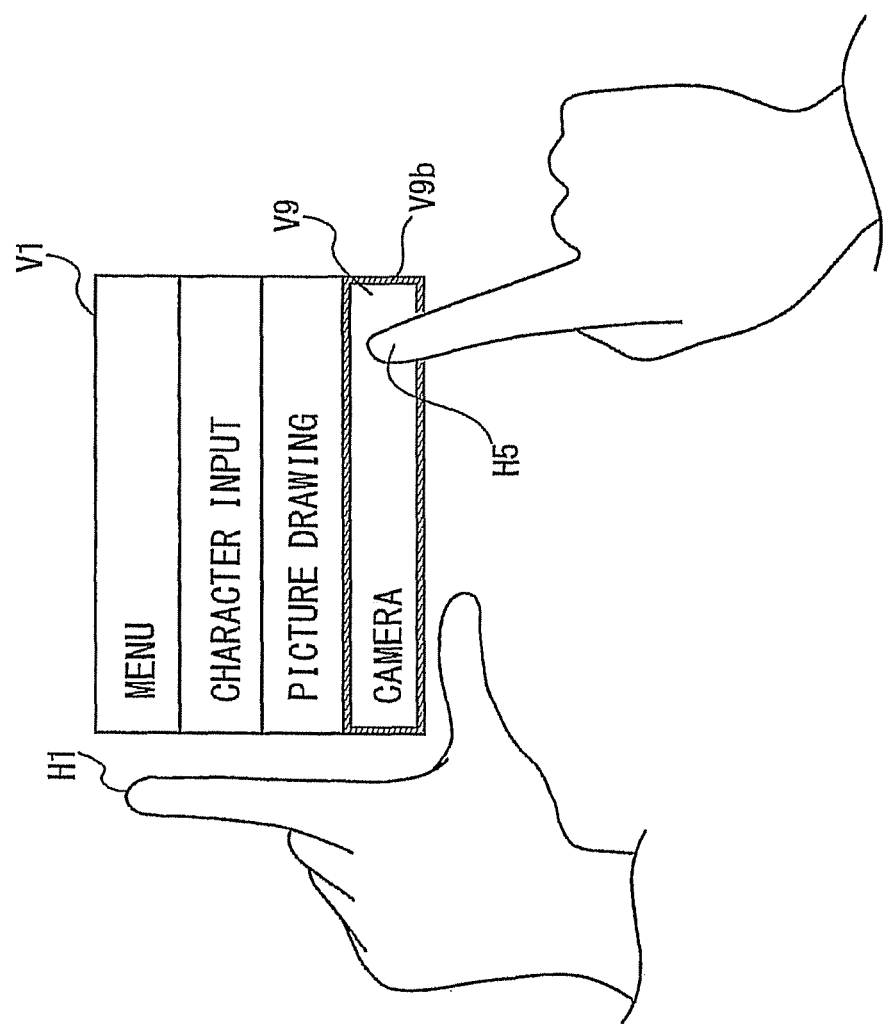
FIG. 46 is a schematic diagram illustrating a mode of manipulating the icon view in the other example of the tracking system.
Figure 47:
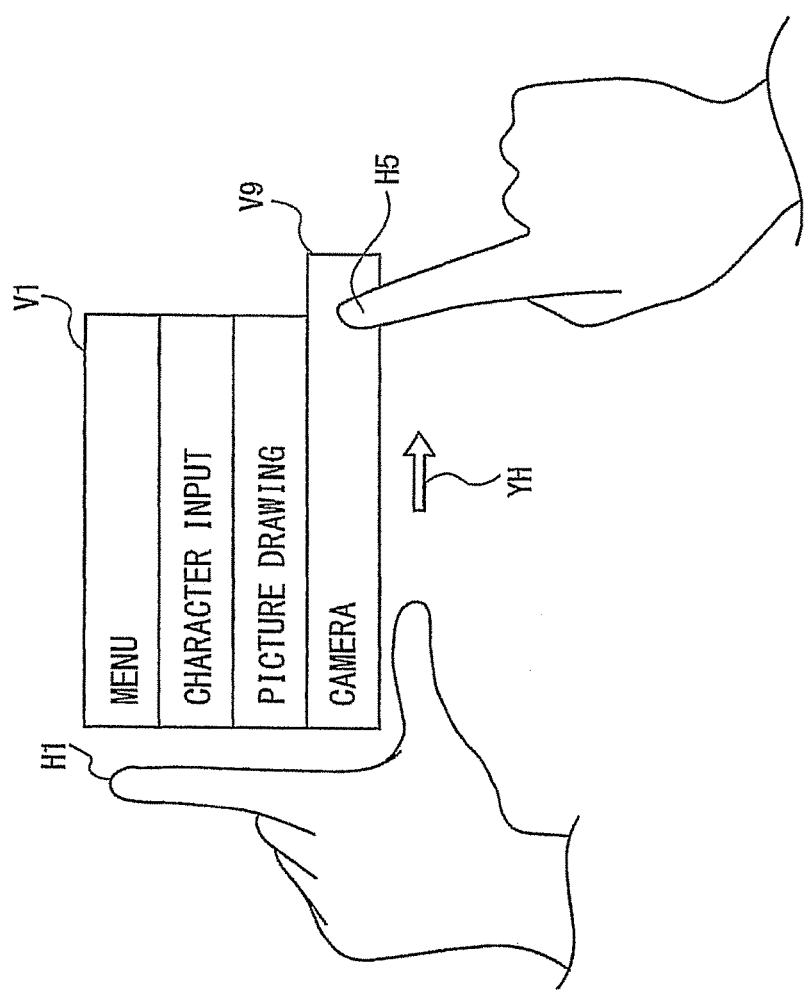
FIG. 47 is a schematic diagram illustrating a mode of tracking the icon view in the other example of the tracking system.
Figure 48:
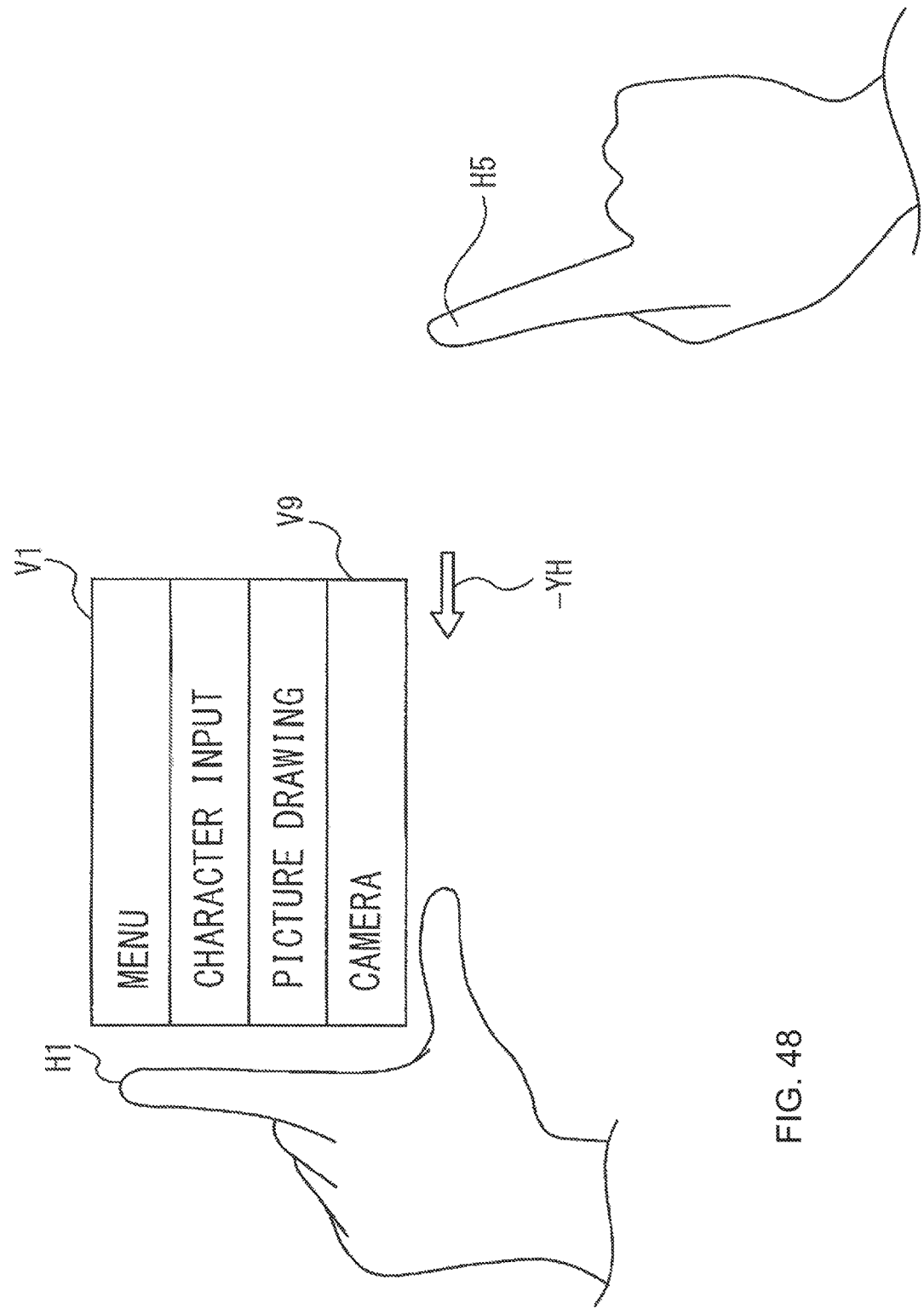
FIG. 48 is a schematic diagram illustrating a mode of tracking the icon view in the other example of the tracking system.

FIG. 45 to FIG. 48 are diagrams illustrating an example of the menu screen V1. For example, as illustrated in FIG. 45, a gesture of the hand H1 is detected, the menu screen V1 is displayed in response to the detection as a trigger, and a camera application activation item V9 that is one of the selection elements on the menu screen V1 is selected by the finger H5.

Then, in the case where the camera application activation item V9 is selected continuously for a predetermined time, a selection determination view V9b is displayed around the camera application activation item V9. If the selection determination view V9b is displayed, the camera application screen V8 (see FIG. 36) is activated.

Meanwhile, in the case where the finger H5 moves in an arrow YH direction before the selection determination view V9b is displayed, a rectangular view of the camera application activation item V9 is enlarged in the arrow YH direction.

In the case where the finger H5 further moves beyond a predetermined distance, the camera application activation item V9 is separated from the finger H5, is reduced in an arrow −YH direction as if a stretched rubber shrank and returned, and returns to its original position and size.

As described above, according to the tracking display system 800 of the present embodiment, in the case where it is determined that the image of the finger H5 and the icon view overlap with each other or where it is determined that the finger H5 exists in a predetermined three-dimensional space (icon manipulation region ICAR) defined by the central projection from the point of view of the manipulator who performs a manipulation with the finger H5 to the icon view, the icon is displayed so as to track the motion of the finger H5. Hence, even in the case where the finger H5 is not in contact with the icon ICHY virtually displayed in the virtual image display region 2203D, in the case where the finger H5 and the icon are visually recognized to overlap with each other from the point of view of the manipulator, the manipulator can manipulate the icon. Even in the case where the in-space position of the finger H5 changes during an icon manipulation, the icon tracks the displacement of the finger H5, and hence the manipulator can easily manipulate the icon.

Moreover, in the tracking display system 800, the finger H5 of the manipulator can be accurately detected by the infrared ray detection unit 410. Moreover, even in the case where the finger H5 is displaced during a manipulation and where the in-space position thereof changes, the manipulator can easily and accurately manipulate the icon.

Further, in the tracking display system 800, it is determined whether or not the finger H5 exists in the icon manipulation region ICAR continuously for a predetermined time. Hence, an erroneous manipulation on the icon due to an inadvertent motion of the finger H5 can be prevented.

Further, in the tracking display system 800, the passage of a predetermined time is displayed around the icon using the timer view 823a, and hence the manipulator can easily recognize whether or not the icon is selected.

Further, in the tracking display system 800, in the case where the tracking display of the icon is started by displaying the selection determination view 823b or starting to display the timer view 823a at a predetermined position in the icon manipulation region ICAR and where the finger H5 then moves beyond a predetermined distance from the predetermined position, the icon is displayed so as to return to the tracking start position, and hence the manipulator can easily recognize that the icon is selected.

Further, in the tracking display system 800, the icon is an application program icon or a menu item, and hence the manipulator can easily perform manipulations such as application activation and menu selection.

Further, because the tracking display system 800 is a head-mounted display device, even if a relative positional relation between the icon view and the finger H5 varies due to movement of the head of the manipulator to whom the head-mounted display device is attached, the icon is displayed so as to track the movement. Hence, a decrease in manipulability due to the movement of the head can be prevented.

In the present invention, the menu 810, the selection elements 811, 812, 813, 821, 822, 823, 824, 831, 832, 833, 834, 835, 841, 842, 843, and 844, the storage selection element 825, and the end selection element 826 each correspond to an "icon", the finger H5 corresponds to a "target", the infrared ray detection unit 410 corresponds to a "detection unit", at least any of the graphics processor unit 463, the display processor unit 464, and the composition processor unit 458 corresponds to a "control unit", the icon ICHY corresponds to a "view object", the icon manipulation region ICAR corresponds to a "predetermined three-dimensional space defined by central projection from a point of view to the view object", and the glasses display device 100 corresponds to a "wearable device".

A preferred embodiment of the present invention has been described hereinabove, but the present invention is not limited to only the embodiment. It should be understood that various other embodiments are possible without departing from the spirit and scope of the present invention. Further, operations and effects produced by the configuration of the present invention are described in the present embodiment, but these operations and effects are given as examples, and are not intended to limit the present invention.

FIG. 4
S1 PERFORM DEPTH COMPUTING
S2 PROCESS TAKEN IMAGE DATA
S3 RECOGNIZE OUTER SHAPE
S4 RECOGNIZE GESTURE
S5 CARRY OUT EVENT
S6 VIRTUALLY DISPLAY IMAGE
FIG. 14
S11 RECOGNIZE MAXIMUM REGION
S12 DETERMINE DISPLAY POSITION OF VIRTUAL IMAGE DISPLAY REGION
S13 SET MAXIMUM REGION OF GESTURE REGION
S14 PERFORM ROUNDING PROCESS
S15 DISPLAY RECTANGULAR IMAGE
S16 DISPLAY INSTRUCTION TO USER
S17 AUTOMATICALLY ADJUST CORRELATION
FIG. 16
S21 PERFORM DEVICE INITIALIZATION
S22 DETECT BY INFRARED RAY CAMERA
S23 REPLACE WITH DISTANCE
S24 CREATE DEPTH MAP
S25 BINARIZE IMAGE DATA
S26 CREATE POLYGON
S27 EXTRACT OUTER SHAPE
S28 CREATE CONVEX HULL
S29 CALCULATE TIP POINT
S30 CALCULATE BASE POINT
S31 EXTRACT SKELTON
S32 COMPARE WITH PREVIOUS SEVERAL FRAMES
S33 DELIVER EVENT
S34 BEHAVE IN ACCORDANCE WITH EVENT
S35 REQUEST DRAWING
S36 CORRECT DISPLAYED IMAGE
S37 PERFORM DISPLAY PROCESS
FIG. 19
S41 SELECT FUNCTION
S42 AWAIT PHOTOGRAPHING
S43 PHOTOGRAPH
S44 ANALYZE FEATURE PART
S45 ANALYZE POSITION AND/OR ANGLE
S46 RECORD?
S47 EXECUTE RECORDING

FIG. 20
S51 SELECT FUNCTION
S52 REFER TO COMMAND DATA
S53 SELECT COMMAND
S54 REFER TO GESTURE DATA
S55 SELECT GESTURE
S56 SET?
S57 EXECUTE SETTING
FIG. 21
S61 SELECT FUNCTION
S62 REFER TO GESTURE DATA
S63 SELECT GESTURE COMMAND
S64 CANCEL?
S65 EXECUTE CANCELLATION
S66 DELETE?
S67 EXECUTE DELETION
S68 REGISTER GESTURE DATA
S69 SET GESTURE COMMAND
FIG. 23
1 FACE RECOGNITION
FIG. 27
1 PRODUCT
2 MENU
3 REVIEW
4 PRICE RANGE
FIG. 28
1 ○○ Company
2 PARODY MODE
3 △△ Company
FIG. 29
1 MENU
2 CHARACTER INPUT
3 PICTURE DRAWING
4 CAMERA
FIG. 31
1 NAME
2 COMPANY NAME
3 POST
4 WHEN AND WHERE USER LAST MET THIS PERSON
5 HOBBIES AND FAVORITES
FIG. 32
1 ADDRESS
2 SEARCH
3 MR. A
4 MR. B
5 MR. C
6 MR. D
7 MR. E
FIG. 34
1 CHINESE CHARACTER APPLICATION
FIG. 35
1 KNIFE APPLICATION
FIG. 36
1 CAMERA APPLICATION
FIG. 45
1 MENU
2 CHARACTER INPUT
3 PICTURE DRAWING
4 CAMERA
FIG. 46
1 MENU
2 CHARACTER INPUT
3 PICTURE DRAWING
4 CAMERA
FIG. 47
1 MENU
2 CHARACTER INPUT
3 PICTURE DRAWING
4 CAMERA
FIG. 48
1 MENU
2 CHARACTER INPUT
3 PICTURE DRAWING
4 CAMERA

The invention claimed is:

1. A tracking display system comprising:
a processor that executes instructions that facilitate performance of operations, comprising:
displaying a view object in a virtual space;
detecting an image of a target in a real space, the target being for selecting the view object;
controlling at least a position of the view object, wherein the view object is displayed such that the view object tracks a motion of the target, in a case where it is determined that the view object and the image of the target overlap with each other in a display device;
determining whether or not the target overlaps with the view object continuously for a predetermined time; and
displaying passage of the predetermined time with respect to the view object.

2. The tracking display system according to claim 1, wherein
the target is at least any of fingers, palms, hands, and arms of a human body of a manipulator, and
the detecting is performed by at least any of a depth level sensor and an image sensor.

3. The tracking display system according to claim 1, wherein, in a case where the target moves beyond a predetermined distance from a tracking start position of the view object, the operations further comprise ending the tracking display, and displaying the view object such that the view object returns to the tracking start position.

4. The tracking display system according to claim 1, wherein the view object is at least any of an icon, a menu item, a text link, and a determination button.

5. A tracking display system comprising:
a view object displayed in a virtual space;
a target in a real space, for selecting the view object by a manipulator;
a processor that executes instructions to perform operations, comprising:
detecting a position of the target in the real space;
controlling at least a position of the view object in the virtual space, wherein
the view object is displayed such that the view object tracks a motion of the target, in a case where it is determined that the target exists in a predetermined space defined by a central projection from a point of view of the manipulator to the view object;
determining whether or not the target overlaps with the view object continuously for a predetermined time; and
displaying passage of the predetermined time with respect to the view object.

6. A wearable device comprising the tracking display system according to claim 1.

7. A computer program product comprising a non-transitory computer-readable medium comprising a tracking display program that causes a processor to execute operations, comprising:
displaying a view object in a virtual space;
detecting an image of a target in a real space, the target being for selecting the view object;

controlling at least a position of the view object, wherein
the displaying of the view object is such that the view object tracks a motion of the target, in a case where it is determined that the view object and the image of the target overlap with each other;
determining whether or not the target overlaps with the view object continuously for a predetermined time; and
displaying passage of the predetermined time with respect to the view object.

8. A computer program product comprising a non-transitory computer-readable medium comprising tracking display program that causes a device coupled to a processor to execute operations, comprising:
displaying a view object in a virtual space;
selecting the view object by a manipulator using a target in a real space;
detecting a position in the real space;
controlling at least a position of the view object in the virtual space, wherein
the displaying the view object is performed such that the view object tracks a motion of the target, in a case where it is determined that the target exists in a predetermined space defined by a central projection from a point of view of the manipulator to the view object;
determining whether or not the target overlaps with the view object continuously for a predetermined time; and
displaying passage of the predetermined time with respect to the view object.

9. A tracking display program for a wearable device, comprising the tracking display program according to claim 7.

10. A tracking display method, comprising:
displaying, by a device comprising a processor, a view object in a virtual space;
detecting, by the device, an image of a target in a real space, the target being for selecting the view object;
controlling, by the device, at least a position of the view object, wherein
the displaying of the view object is performed such that the view object tracks a motion of the target, in a case where it is determined that the view object and the image of the target overlap with each other;
determining, by the device whether or not the target overlaps with the view object continuously for a predetermined time; and
displaying, by the device, passage of the predetermined time with respect to the view object.

11. A tracking display method, comprising:
displaying, by a system comprising a processor, a view object in a virtual space;
selecting, by the system, the view object by a manipulator using a target in a real space;
detecting, by the system, a position in the real space;
controlling at least a position of the view object in the virtual space, wherein
the displaying of the view object is performed such that the view object tracks a motion of the target, in a case where it is determined that the target exists in a predetermined space defined by a central projection from a point of view of the manipulator to the view object;
determining, by the system whether or not the target overlaps with the view object continuously for a predetermined time; and
displaying, by the system, passage of the predetermined time with respect to the view object.

12. A manipulation method for a wearable device, comprising the tracking display method according to claim 10.

* * * * *